US005715237A

United States Patent [19]
Akiyoshi

[11] Patent Number: 5,715,237
[45] Date of Patent: Feb. 3, 1998

[54] INTER DIGITAL SWITCHING EQUIPMENT RELAY SYSTEM AND DIGITAL SWITCHING EQUIPMENT

[75] Inventor: Hitomi Akiyoshi, Kawasaki, Japan

[73] Assignee: Fujitsu Limited, Kanagawa, Japan

[21] Appl. No.: 532,119

[22] Filed: Sep. 22, 1995

[30] Foreign Application Priority Data

Dec. 28, 1994 [JP] Japan ................... 6-329169

[51] Int. Cl.$^6$ ................................. H04L 12/26
[52] U.S. Cl. ................. 370/228; 370/229; 370/232
[58] Field of Search ................... 370/228, 229, 370/230, 232, 234, 237, 536; 375/260, 257

[56] References Cited

U.S. PATENT DOCUMENTS

| | | | |
|---|---|---|---|
| 5,239,537 | 8/1993 | Sakauchi | 370/218 |
| 5,285,441 | 2/1994 | Bansal et al. | 370/218 |
| 5,343,462 | 8/1994 | Sakihata et al. | 370/244 |
| 5,367,562 | 11/1994 | Tourbah et al. | 379/93 |
| 5,420,861 | 5/1995 | De la Bourdonnye | 370/229 |
| 5,436,886 | 7/1995 | McGill | 370/219 |

FOREIGN PATENT DOCUMENTS

| | | |
|---|---|---|
| 4-98917 | 3/1992 | Japan . |
| 4-222138 | 8/1992 | Japan . |
| 5-160851 | 6/1993 | Japan . |

Primary Examiner—Wellington Chin
Assistant Examiner—Soon-Dong Hyun
Attorney, Agent, or Firm—Helfgott & Karas, P.C.

[57] ABSTRACT

An ATM cell transferred from a first ATM node to a second ATM node is, in a normal state, transmitted to a line control unit from an ATM cell switch within the first ATM node and sent to a trunk line therefrom. when a usage of a buffer connected within this line control unit comes to a fixed threshold value or larger, in the line control unit for sending the ATM cell to the ATM cell switch, routing (TAG) data added to a header part of the ATM cell belonging to a low-quality connection among connections directed to the second ATM node is so rewritten as to be directed to the line control unit. The relevant cell is sent forward to the line control unit and transferred to the second ATM node via a backup line.

22 Claims, 54 Drawing Sheets

FIG. 10

| TAGA DATA | | | OUTPUT ROUTE | | | | | | | |
|---|---|---|---|---|---|---|---|---|---|---|
| a2 | a1 | a0 | #0 | #1 | #2 | #3 | #4 | #5 | #6 | #7 |
| 0 | 0 | 0 | ● | — | — | — | — | — | — | — |
| 0 | 0 | 1 | — | ● | — | — | — | — | — | — |
| 0 | 1 | 0 | — | — | ● | — | — | — | — | — |
| 0 | 1 | 1 | — | — | — | ● | — | — | — | — |
| 1 | 0 | 0 | — | — | — | — | ● | — | — | — |
| 1 | 0 | 1 | — | — | — | — | — | ● | — | — |
| 1 | 1 | 0 | — | — | — | — | — | — | ● | — |
| 1 | 1 | 1 | — | — | — | — | — | — | — | ● |

FIG. 11

| TAGA DATA | | | TAGB DATA | | | OUTPUT LINE | | | | | | | | | | | | | | | | |
|---|---|---|---|---|---|---|---|---|---|---|---|---|---|---|---|---|---|---|---|---|---|---|
| a2 | a1 | a0 | COM | b1 | b0 | #0 | #1 | #2 | #3 | #4 | #5 | #6 | #7 | #8 | #9 | #10 | #11 | #12 | #13 | #14 | #15 | COM |
| 0 | 0 | 0 | 0 | 0 | 0 | ● | — | — | — | — | — | — | — | — | — | — | — | — | — | — | — | — |
| 0 | 0 | 0 | 0 | 0 | 1 | — | ● | — | — | — | — | — | — | — | — | — | — | — | — | — | — | — |
| 0 | 0 | 0 | 0 | 1 | 0 | — | — | ● | — | — | — | — | — | — | — | — | — | — | — | — | — | — |
| 0 | 0 | 0 | 0 | 1 | 1 | — | — | — | ● | — | — | — | — | — | — | — | — | — | — | — | — | — |
| 0 | 0 | 1 | 0 | 0 | 0 | — | — | — | — | ● | — | — | — | — | — | — | — | — | — | — | — | — |
| 0 | 0 | 1 | 0 | 0 | 1 | — | — | — | — | — | ● | — | — | — | — | — | — | — | — | — | — | — |
| 0 | 0 | 1 | 0 | 1 | 0 | — | — | — | — | — | — | ● | — | — | — | — | — | — | — | — | — | — |
| 0 | 0 | 1 | 0 | 1 | 1 | — | — | — | — | — | — | — | ● | — | — | — | — | — | — | — | — | — |
| 0 | 1 | 0 | 0 | 0 | 0 | — | — | — | — | — | — | — | — | ● | — | — | — | — | — | — | — | — |
| 0 | 1 | 0 | 0 | 0 | 1 | — | — | — | — | — | — | — | — | — | ● | — | — | — | — | — | — | — |
| 0 | 1 | 0 | 0 | 1 | 0 | — | — | — | — | — | — | — | — | — | — | ● | — | — | — | — | — | — |
| 0 | 1 | 0 | 0 | 1 | 1 | — | — | — | — | — | — | — | — | — | — | — | ● | — | — | — | — | — |
| 0 | 1 | 1 | 0 | 0 | 0 | — | — | — | — | — | — | — | — | — | — | — | — | ● | — | — | — | — |
| 0 | 1 | 1 | 0 | 0 | 1 | — | — | — | — | — | — | — | — | — | — | — | — | — | ● | — | — | — |
| 0 | 1 | 1 | 0 | 1 | 0 | — | — | — | — | — | — | — | — | — | — | — | — | — | — | ● | — | — |
| 0 | 1 | 1 | 0 | 1 | 1 | — | — | — | — | — | — | — | — | — | — | — | — | — | — | — | ● | — |
| 0 | 1 | 1 | 1 | 1 | 1 | — | — | — | — | — | — | — | — | — | — | — | — | — | — | — | — | ● |

FIG. 15

| TAGA DATA | SW ROUTE SELECTION | | | | | | | |
|---|---|---|---|---|---|---|---|---|
| | SW OUTPUT ROUTE (●: OUTPUT DESTINATION) | | | | | | | |
| | #0 | #1 | #2 | #3 | #4 | #5 | #6 | #7 |
| a0 = 1 | ● | — | — | — | — | — | — | — |
| a1 = 1 | — | ● | — | — | — | — | — | — |
| a2 = 1 | — | — | ● | — | — | — | — | — |
| a3 = 1 | — | — | — | ● | — | — | — | — |
| a4 = 1 | — | — | — | — | ● | — | — | — |
| a5 = 1 | — | — | — | — | — | ● | — | — |
| a6 = 1 | — | — | — | — | — | — | ● | — |
| a7 = 1 | — | — | — | — | — | — | — | ● |

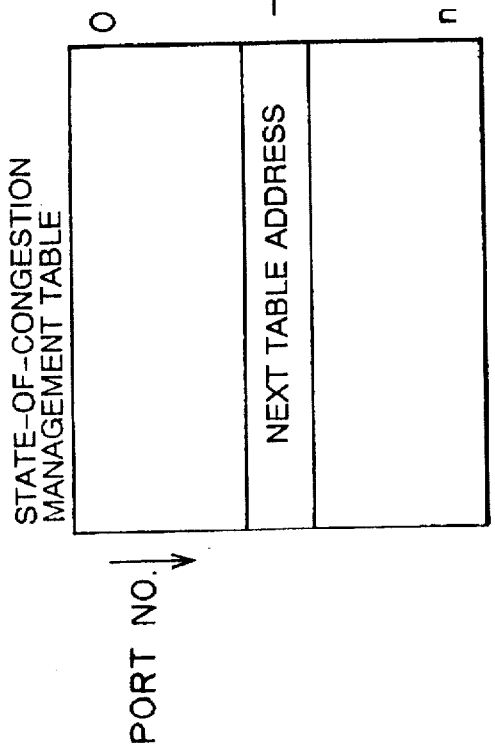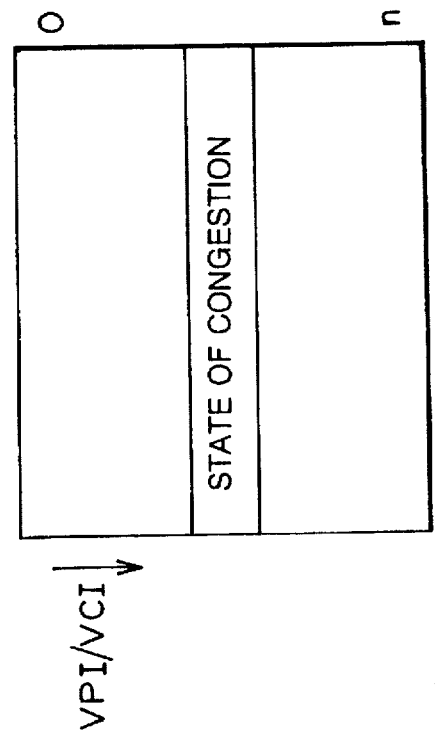
FIG. 17(a)
STATE-OF-CONGESTION MANAGEMENT TABLE
PORT NO.
NEXT TABLE ADDRESS
FIG. 17(b)
VPI/VCI
STATE OF CONGESTION
STATE OF CONGESTION: INDICATION WHETHER IN CONGESTED STATE OR IN NORMAL STATE

FIG. 24

| 5 OCTETS | 4 BITS | 4 BITS | 45 OCTETS | 6 BITS | 10 BITS |
|---|---|---|---|---|---|
| Cell Header | OAM Cell Type | Function Type | Function specific field | Reserve (all "0") | EDC (CRC-10) |

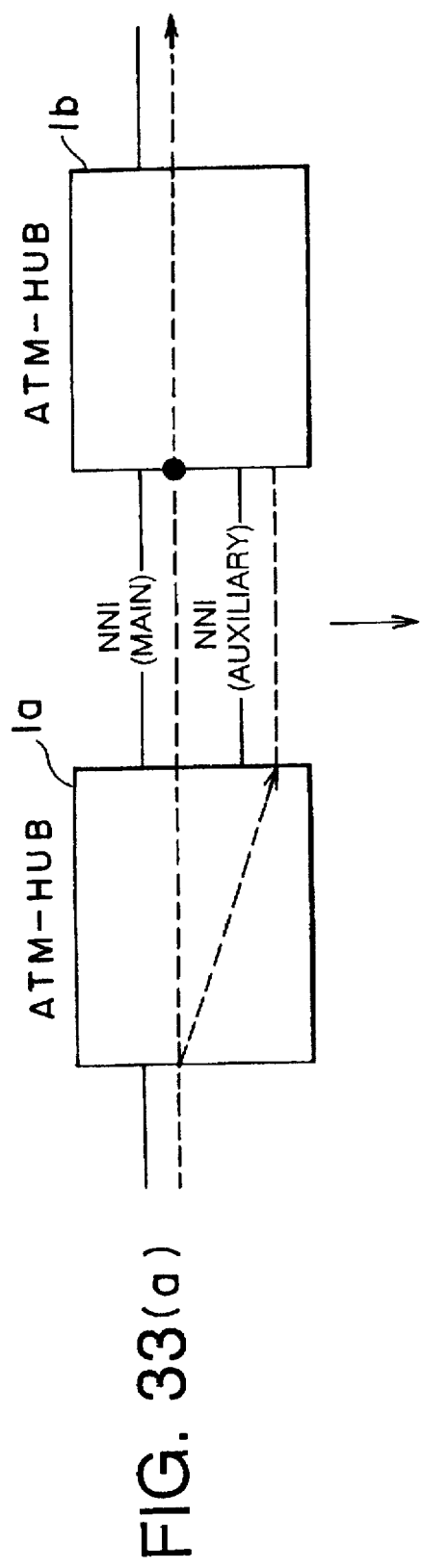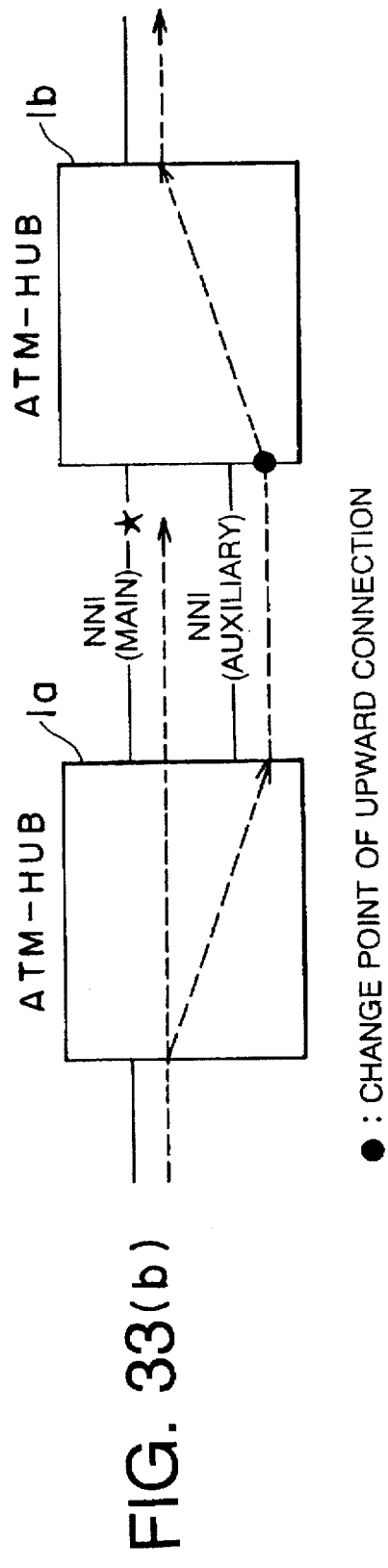
FIG. 33(a) → FIG. 33(b)
● : CHANGE POINT OF UPWARD CONNECTION

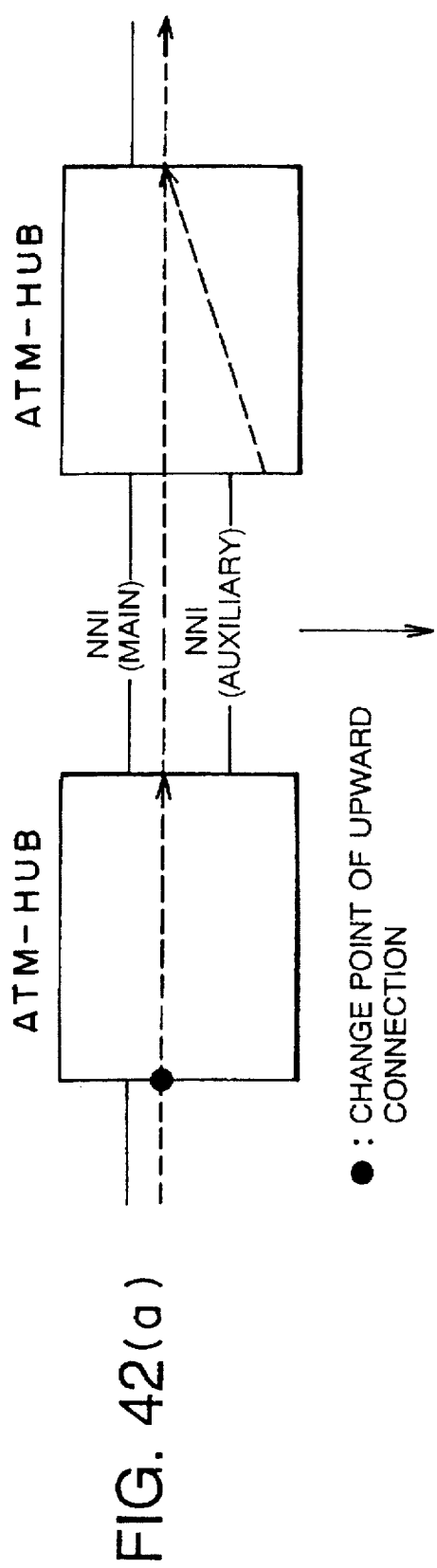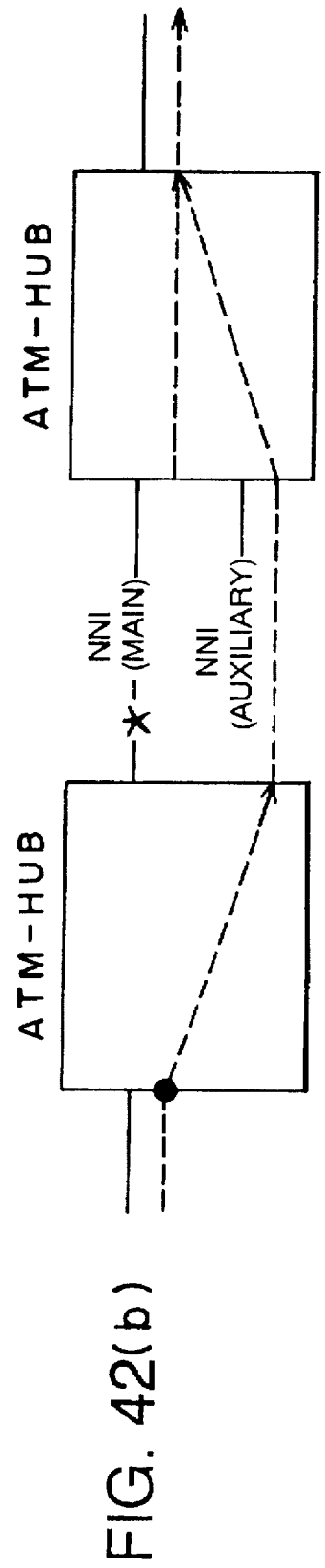
FIG. 42(a)
FIG. 42(b)
● : CHANGE POINT OF UPWARD CONNECTION

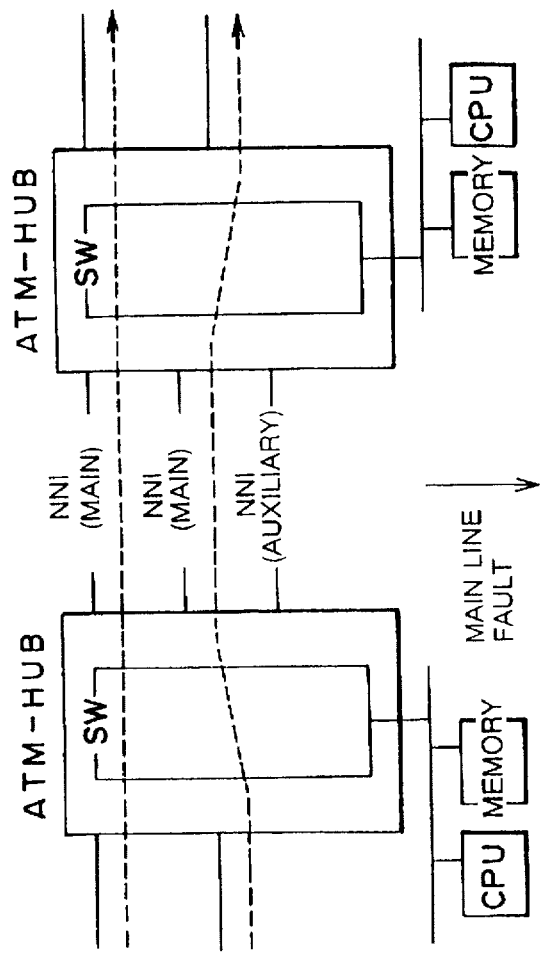
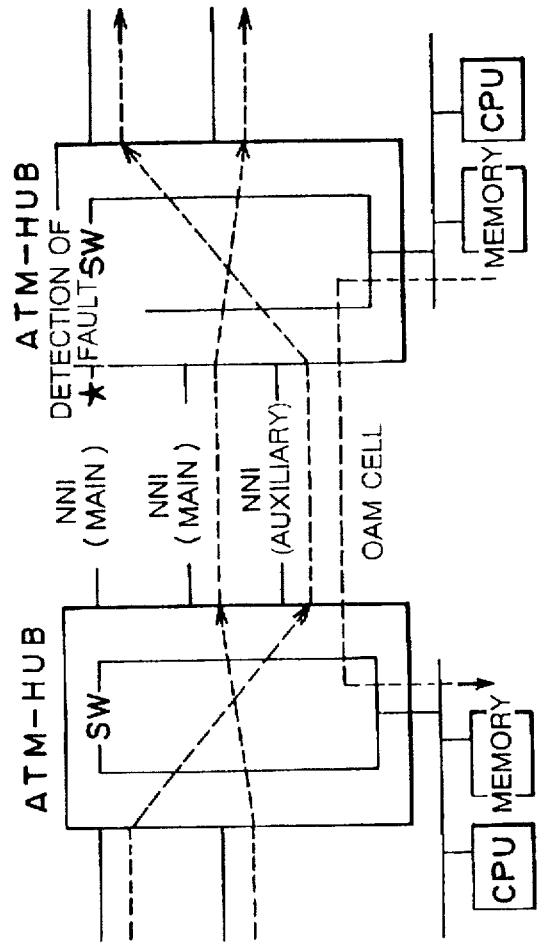
FIG. 55(a)
FIG. 55(b)

INTER DIGITAL SWITCHING EQUIPMENT RELAY SYSTEM AND DIGITAL SWITCHING EQUIPMENT

BACKGROUND OF THE INVENTION

1. Field of the Invention

The present invention relates Generally to a relay system of a block (packet, frame or ATM cell) of digital data between digital switching equipments in a digital switching network such as, e.g., B-ISDN (Broadband-Integrated Services Digital Network) and also to a digital switching equipment. The present invention relates more particularly to a relay system and a digital switching equipment that are capable of preventing a discard the block (packet, frame or ATM cell) of the digital data when relayed.

2. Description of the Related Art

In recent years, with a spread of data communications, there have been conducted multimedia communications for transmitting voices, images and data via public lines. Therefore, the B-ISDN capable of actualizing multimedia communications that are as high as 150-600 Mbps is Going to be utilized. In this B-ISDN, an ATM (Asynchronous Transfer Mode) system is adopted as a basic system for switching of transmission. According to this ATM system, all items of communications data having different bandwidths are divided into cells having a fixed length (53 octets); these cells are transferred while existing in mixture throughout transmission paths; and, besides, switching is performed by hardware.

Based on such an ATM system, the cells are typically transferred through a plurality of switching equipments and reach a terminal of a destination party. Interconnections between those switching equipments are made through trunk lines. The cell is transmitted through this trunk line normally at a speed of 156 M[bps]. That is, a capacity per trunk line (the number of cells transmissible in a fixed time) is restricted by this transmission speed. Accordingly, if the cell is forced to be transmitted in excess of the capacity determined in this way, it happens that cells are to be discarded. In this case, the cells sent from different transmitting terminals are transmitted while existing in mixture throughout the trunk line. Hence, it may happen that an increase in the number of cells used by one subscriber results in a discard cells of other subscribers. This problem is serious.

For this reason, the user has hitherto been made to declare a call necessary bandwidth and quality to the switching network side when requesting the communications. Then, when receiving this call, the cell transmission is carried out to the switching network from a subscriber terminal in accordance with a data quantity of this call. There have been, however, taken measures against the illegally inputted cells, wherein those cells are checked by the switching network under usage parameter control (UPC) and then disposed of. The usage parameter control (UPC) aims mainly at protecting switching network resources from an illegal call enough to deteriorate qualities of other connections that have already been set and involves a series of operations taken by the communications network in order to monitor and control statuses of a received traffic and of an ATM connection. Specifically, the UPC is defined as control for monitoring whether or not a traffic density with which the cells flow into the switching network from a VC in use violates agreed parameters (peak bandwidth, average bandwidth) by checking if a VP (virtual path) and the VC (virtual channel) are being used with respect to an active VCC (virtual channel connection) (this corresponds to checking whether or not an effective value is put into VPI (virtual path identifier)/VCI (virtual channel identifier)). The UPC is also defined as control for monitoring whether the traffic density with which the cells flow into the switching network from the VP in use violates the agreed parameters by checking if the VP (virtual path) is being used with respect to the active VPC (virtual path connection).

Further, the following practice has hitherto been conducted, wherein the LANs constructed in remote places are connected by employing the B-ISDN based on the ATM system as a backbone system for an existing high-speed LAN (Local Area Network) interface (e.g., FDDI (Fiber Distributed Data Interface), etc.). In the case of such a LAN-to-LAN connection, the traffic density when flowing into the network from the LAN typically exhibits a burst characteristic. Further, in the course of digitizing the network resources, there is no alternative but to employ a low-speed existing line (e.g., line on the order of 1.5 Mbps, 6.3 Mbps and so on) such as a coaxial cable, etc. in the form of a trunk line for connecting the ATM switching equipments in some cases.

Moreover, it is a general practice in the B-ISDN based on the ATM system that a trunk line for backup is extended in parallel to an active system trunk line through which the cells are actually transmitted in preparation against a system-down (disconnection of the trunk line, a defect of connection of the trunk line, occurrence of congestion, error in hardware of line control unit, etc.) of the trunk line. Then, if the active system trunk line encounters the system-down, respective switches provided in two switching equipments connected back and forth to this trunk line are changed over to halt the use of the active system trunk line but to start the cell transmission through the backup trunk line.

A problem common to the present invention is that the cells are to be discarded when adopting the above ATM system. The following are specific problems.

(First Problem)

As described above, the usage parameter control method may be given as a conventional traffic control method.

The above usage parameter control (UPC) is not yet, however, popularized. Therefore, if the switching equipment is not mounted with the usage parameter control (UPC), it follows that the switching equipment receives the cells even when over a allocated bandwidth. Further, even if mounted with the usage parameter control (UPC), the usage parameter is not intended to monitor whether over the capacity on the side of the trunk line or not. Consequently, there arises a problem in which the cells are disposed of in the trunk line if over the capacity on the side of the trunk line.

Moreover, the usage parameter control (UPC) is the control under when the cells are to be discarede even in the case of a violation of declaration and therefore presents a problem in terms of a reliability on the switching network.

Note that there exists the same problem inherent in a packet switching method and a frame switching method that are used in the B-ISDN.

(Second Problem)

Further, according to the conventional ATM method, if congested in the network, a notification of congestion is given only in a forward direction (toward a receiving party of the cells discarded). That is, in the B-ISDN, the network is not provided with a traffic flow regulating function into the network when congested. For this reason, an indication of congestion is set in a header part of the cell transmitted to the terminal on the receiving side, thereby temporarily informing the communication cell receiving side of the congestion (explicit forward congestion indication: EFCI). With the explicit forward congestion indication given in thus way, an end user receiving this indication communicates with the terminal on the transmitting side about an occurrence of congestion, and the transmitting-side terminal itself is expected to regulate a traffic flow density into the network.

By the way, as stated above, when making use of the B-ISDN based on the ATM method as a high-speed LAN interface, there is no alternative but to use an allocation of average value by way of a bandwidth management in order to prevent the occurrence of congestion when at a peak traffic. Similarly, when making use of the existing low-speed line as an inter ATM switching equipment trunk line, there is a limit in terms of the capacity of the trunk line, and hence there is nothing but to use the allocation of average value as the bandwidth management.

According to the conventional ATM method, however, as explained above, it is impossible to directly inform the transmitting side of the congestion. Hence, there arises a problem, wherein the transmitting side (router in LAN-to-LAN connection, and switching equipment on the transmitting side when connected through low-speed trunk line) is notified immediately when congested, and it is thus impossible to perform the control of delaying an inflow timing of the cells (or synchronous digital hierarchy (SDH) frame stored with cells) into the network.

(Third Problem)

Further, as described above, in the B-ISDN based on the conventional ATM method, the active system trunk line and the backup trunk line are switched over.

This switching is, however, conducted by an indication given from a maintenance console connected to each of ATM nodes connected to each other via the trunk line or a network manager. That is, when detecting the system-down of the trunk line in the switching equipment, this effect is displayed on the maintenance console or the network manager. When an operator input a command for switching in accordance with this display, the trunk line is switched. Accordingly, a completion of switching the trunk line since the system-down has been occurred is time-consuming, and there is a large possibility in which the cells will be discarded during such a time lag.

Further, according to the conventional trunk line switching method, since the switch is changed over in each of ATM nodes arranged in front and in rear of the trunk line, there is a high possibility of causing the discard of cells with the changeover of the switch. Note that the discard of the cells with the changeover of the switch is also caused when switching back the trunk line to the active system line from the backup line after repairing the trunk line that was originally of the active system, and, therefore, the problem of the cell discard is serious when the switches are changed over at two places.

SUMMARY OF THE INVENTION (First Mode of the Present Invention)

A first mode of the present invention is intended to obviate the first problem given above, wherein the attention is paid to such a configuration that a backup trunk line having substantially the same capacity as that of a trunk line is arranged in parallel to this trunk line for connecting ATM switching equipments. That is, the first mode of the present invention is contrived based on such an assumption that a cell discard can be avoided by detouring some of the cells to the backup trunk line if an active system trunk line is likely to exceed its capacity.

An inter digital switching equipment relay system according to the first mode of the present invention is having a plurality of digital switching equipments connected each other through a trunk line and transfers a block of digital data containing an item of destination data from the one digital switching equipment to the other digital switching equipment via the trunk line. This relay system comprises a backup trunk line arranged in parallel to the trunk line between the plurality of digital switching equipments and having substantially the same capacity as that of the trunk line. The relay system also comprises a transferring element, provided in one digital switching equipment, for transferring, when a data quantity of the block of the digital data passing though the trunk line becomes a fixed threshold value or larger, part of the block of the digital data passing through the trunk line to the other digital switching equipment via the backup trunk line.

(Second Mode of the Present Invention)

A second mode of the present invention is contrived to obviate the second problem given above, wherein the attention is paid to such a configuration that lines extending in up-and-down directions are prepared for a subscriber line for connecting the switching equipment to a terminal as well as for the trunk line for connecting the switching equipments. Namely, the second mode of the present invention is contrived based on such an assumption that if a congestion is caused due to the cells transmitted in an inflow-direction into the relevant switching equipment from other switching equipment or from the terminal (including cases where the congestion is produced within the relevant switching equipment and where the congestion is caused before and after it), the cells transmitted toward other switching equipment or the terminal from the relevant switching equipment undergo no influence of the congestion.

A digital switching equipment according to the second mode of the present invention, to which a plurality of lines are connected, receives a block of digital data containing an item of destination data from an input line and outputs the data block to an output line. This digital switching equipment comprises a detection unit for detecting that a data quantity of the block of the digital data passing through the output line exceeds a fixed threshold value and a notifying unit for notifying, when the detecting unit detects that the data quantity of the block of the digital data passing through the output line exceeds the fixed threshold value, an occurrence of congestion to a transmitting party of the block of the digital data.

(Third Mode of the Present Invention)

A third mode of the present invention is contrived to obviate the third problem described above, wherein the attention is paid to the fact that even if a 1-to-N connection (N indicates the active trunk line and the backup trunk line) is performed within one of the switching equipments connected to each other through the trunk line in a state where the active system trunk line is used as usual, the cells are not transmitted via the backup trunk line unless the backup trunk line is connected within other switching equipment.

An inter digital switching equipment relay system according to the third mode of the present invention is having at least two sets of digital switching equipments connected through a trunk line. This relay system inputs a block of digital data containing an item of destination data from an input line of the first digital switching equipment, transfers the data block to the second digital switching equipment via the trunk line and outputs the data block from an output line of the second digital switching equipment. This relay system comprises a backup trunk line arranged in parallel to the trunk line between the two sets of digital switching equipments and having substantially the same capacity as that of the trunk line and a copying element, provided in the first digital switching equipment, for copying the block of the digital data,. This relay system also comprises a transmitting element, provided in the first digital switching equipment, for transmitting one of the copied blocks to the trunk line and also transmitting one other copied block to the backup trunk line and an outputting element, provided in the second digital switching equipment, for outputting, in a state where no fault happens in the trunk line, only the block of the digital data transferred via the trunk line and outputting, in a state where the fault happens in the trunk line, only the block of the digital data transferred via the backup trunk line from the output line.

(Fourth Mode of the Present Invention)

A fourth mode of the present invention is contrived to obviate the third problem described above, wherein the attention is paid to the fact that even if the 1-to-N connection (N indicates the active trunk line and the backup trunk line) is performed within one of the switching equipments connected to each other through the trunk line in the state where the active system trunk line is used as usual, the cells are not transmitted via the backup trunk line unless the backup trunk line is connected within other switching equipment.

An inter digital switching equipment relay system according to the fourth mode of the present invention is having at least two sets of digital switching equipments connected through a trunk line. This relay system inputs a block of digital data containing an item of destination data from an input line of the first digital switching equipment, transfers the data block to the second digital switching equipment via the trunk line and outputs the data block from an output line of the second digital switching equipment. This relay system comprises a backup trunk line arranged in parallel to the trunk line between the two sets of digital switching equipments and having substantially the same capacity as that of the trunk line and an outputting element, provided in the second digital switching equipment, for outputting, to the output line, the block of the digital data transferred from the first digital switching equipment via the trunk line and the block of the digital data transferred from the first digital switching equipment via the backup trunk line. This relay system also comprises a transferring element, provided in the first digital switching equipment, for transferring, in a state where no fault happens in the trunk line, the block of the digital data transferred via the input line only to the trunk line and transferring, in a state where the fault happens in the trunk line, the block of the digital data transferred via the input line to only the backup trunk line.

An outline and a point of the constructive elements of the present invention will be briefly summarized.

The block of the digital data according to the present invention includes a header part containing an item of destination data and a user data part. The digital data block corresponds to a frame or the like in a packet/frame switching system based on a packet switching system in addition to the ATM cells in the B-ISDN.

The trunk line (inclusive of a trunk line as part of a trunk circuit) and the backup trunk line (inclusive of a backup trunk line as part of a backup trunk line) may be electric wires or optical fibers or wave guides for microwaves. In short, the trunk line and the backup trunk line may be those capable of transmitting the digital signals through a medium confined in a fixed spatial range by an electrical or optical element.

The trunk line and the backup trunk line preferably have substantially the same capacity but may be slightly different in their capacities. If the trunk line itself is damaged, or if the system-down happens in the line unit within the switching equipment connected to this trunk line due to a breakdown, etc., the backup trunk line functions as a trunk line in place of this broken-down trunk line.

In the case of the first and second modes, determining whether or not the data quantity of the digital data becomes the fixed threshold value or larger implies a determination about whether or not a rate of the data quantity to the capacity of the trunk line exceeds the fixed threshold value. Accordingly, this determination can be grasped as a data density or as a frequency at which the block of digital data passes. Particularly, the data length of the ATM cell is a fixed length and can be therefore grasped as the number of passages of the ATM cell. In this case, if a buffer is provided in the line unit, this data quantity can be detected as the number of unread cells accumulated in this buffer.

The element for detouring the block of the digital data to the backup trunk line may work to rewrite the item of destination data of the digital data or change over a mechanical switch or a physical switch such as a semiconductor switch, etc. Especially, in the case of the ATM switching equipment, taking the former element may be more effective. For example, setting the routing data added to the header part of the ATM cell may be switched. If these items of destination data are employed, higher processing than by using the physical switch can be attained.

Further, the element for sorting out what kind of data to detour to the backup trunk line can be considered in many forms. For instance, there is provided a connection set through the trunk line, and a distinction is made based on a quality of the connection to which the relevant digital data block belongs. In the case of a low-quality connection, it is possible to make a detour to the backup trunk line in advance of a high-quality connection. The term "high-quality" connoted herein is a connection for control or connection containing video data. In the case of these connections, any kind of missing of the data can not be permitted. Accordingly, these connections can be protected from a data discard produced when switching to the detour path. Note that the distinction is made depending on high priority data or low priority data contained in the header part of the ATM cell, and the low-priority ATM cell may be detoured in advance of the high-priority ATM cell in the case of the ATM switching equipment.

According to the second mode, an occurrence notification about state of congestion may be executed in the trunk unit where the congestion is caused or may be executed in the trunk unit which accommodates the line extending from the transmitting party of the digital data block. This notification may be written to a user cell transferred to this place where the congestion is caused or may be, after generating an ATM-OAM cell, written to this cell.

According to the third mode, when the first digital switching equipment detects the fault in the trunk line, the second digital switching equipment for switching the line may be notified of the occurrence of fault.

Further, according to the fourth mode, when the second digital switching equipment detects the fault in the trunk line, the first digital switching equipment for switching the line may be notified of the occurrence of fault.

In those cases, if each digital switching equipment is an ATM switching equipment, this notification of the occurrence of fault may be done through an ATM-OAM cell.

The digital switching equipment used in the present invention is connectable to other switching equipment via the trunk line and capable of transferring the digital data block containing the item of destination data to relevant other switching equipment via this trunk line. This digital switching equipment includes a first trunk unit for transmitting the block of the digital data to the trunk line and a second trunk unit, to which a backup trunk line having substantially the same capacity as that of the trunk line is connectable, capable of transferring the block of the digital data to the backup trunk line. This digital switching equipment also includes a switch unit for transmitting the block of digital data to the first trunk unit and a transmitting element for transmitting, when a data quantity of the block of the digital data passing through the first line unit exceeds a fixed threshold value, a part of the block of the digital data to be transmitted to the first line unit from the switch unit to the second trunk unit.

When this digital switching equipment is applied to the ATM switching equipment, in addition to the above construction, the digital switching equipment may further comprise a monitoring element for monitoring the number of ATM cells outputted from the first trunk unit. In this case, the transmitting element transmits, when the monitoring element determines that the number of ATM cells exceeds the fixed threshold, the part of the ATM cell to be transmitted to the first trunk unit from the switch unit to the second trunk unit. If constructed in this way, a measurement of whether to exceed the fixed threshold value can be effected directly with respect to the first trunk unit. Hence, there can be obtained a more accurate result of the measurement than in the case of an indirect measurement, and the cell discard can be thereby further reduced.

Note that this monitoring element may measure the frequency at which the ATM cell passes through the first line unit within a unit time. In contrast with this, the monitoring element may be constructed as a buffer provided in the first line unit. With this construction, the frequency of passage of the ATM cell can be converted into the number of ATM cells accumulated in the buffer. Therefore, monitoring this can be facilitated.

If the monitoring element is constructed as the buffer, this buffer may have a first threshold value that is comparatively large and a second threshold value that is comparatively small. Then, the transmitting element may be constructed to transmit, when the number of ATM cells exceeds the first threshold value, the part of the ATM cell to be transmitted to the first line unit from the switch unit to the second trunk unit and transmits, when the number of ATM cells is the second threshold value or under, the ATM cells transmitted to the second trunk unit back to the first trunk unit. With this construction, when a hysteresis is given to the switch-over and the switch-back, a switch-over/switch-back frequency can be decreased. It is therefore possible to reduce a possibility of the cell discard inevitably caused when performing the switch-over and the switch-back described above.

Note that the construction applied to this switching equipment has the following meanings.

The trunk unit may incorporate a function of the line terminal portion for accommodating the line. This trunk unit accommodates a plurality of lines and may incorporate functions to multiplex the ATM cells transmitted from the plurality of lines to transmit the cells to the switch unit and also demultiplex the multiplexed cell transmitted from the switch unit to the respective lines.

The switch unit may be the one having a plurality of I/O ports and capable of outputting the ATM cell inputted from one of the input ports from one of the output ports in accordance with the routing data written to the ATM cell.

Routing within this switch may be mechanically performed or theoretically performed by software.

In the digital switching equipment according to the first mode of the present invention, the digital data block transferred from one digital switching equipment to other digital switching equipment is transferred via the trunk line in the normal status. Then, when the data quantity of the digital data passing through the trunk line becomes the fixed threshold value or larger, a part of the digital data block that is to pass through this trunk line is detoured and transferred via the backup trunk line. As a result, it is possible to prevent a further increase in the quantity of the digital data passing through the trunk line, and the possibility of causing the data discard due to an overcapacity is reduced.

Further, when the ATM switching equipment is used as the digital switching equipment, the digital data block transferred from one ATM switching equipment to other ATM switching equipment is transferred via the trunk line in the normal status. Then, when the number of the ATM cells passing through the trunk line becomes the threshold value or larger, some of the ATM cells that are to pass through this trunk line are detoured and transferred via the backup trunk line. As a consequence, it is feasible to prevent the number of ATM cells passing through the trunk line from further increasing, and the possibility of causing the cell discard due to the overcapacity is reduced.

Further, in one ATM switching equipment, if the number of ATM cells transmitted to the trunk line becomes the fixed threshold value or larger, a maintenance OAM cell for notifying that the ATM cells are transmitted from the backup trunk line is transmitted to other ATM switching equipment from one ATM switching equipment. The lines can be thereby switched simultaneously in both ATM switching equipments, and, hence, it is possible to reduce the possibility of the cell discard caused with the switching of the line. On this occasion, when other ATM switching equipment receiving the maintenance OAM cell sends the maintenance OAM cell for a response back to one ATM switching equipment, some of the ATM cells passing through the trunk line are transferred to other ATM switching equipment via the backup trunk line. If constructed in this way, the cells can be transferred via the backup trunk line from one ATM switching equipment under such a state that the switching to the backup trunk line is completed within other ATM switching equipment. It is therefore feasible to further reduce the possibility of causing the cell discard in the backup trunk line.

Further, according to the digital switching equipment of the present invention, in the normal status, the digital data block transferred to other switching equipment is transmitted to the first trunk unit from the switch unit and sent to trunk line therefrom. Then, when the data quantity of the digital data passing through the first trunk unit becomes the fixed threshold value or larger, the switching element operates the switch unit to switch the transmitting destination as part of the digital data block to be transmitted to the first trunk unit. Hereupon, part of the digital data block is transmitted to the second trunk unit and sent to the backup trunk line therefrom. As a consequence, the data quantity of the digital data passing through the trunk line can be prevented from further increasing, and the possibility of causing the data discard due to the overcapacity is reduced.

When the digital switching equipment of the present invention is constructed as the ATM switching equipment, in the normal status, the ATM cells transferred to other ATM switching equipment are transmitted to the first trunk unit from the switch unit and sent to the trunk line therefrom. Then, when the number of ATM cells passing through the first trunk unit becomes the fixed threshold value or larger, the switching element operates the switch unit to switch the transmitting destination as part of the ATM cell to be transmitted to the first trunk unit. Hereupon, part of the ATM cell is transmitted to the second trunk unit and sent to the backup trunk line therefrom. As a result, the number of ATM cells passing through the trunk line can be prevented from further increasing, and the possibility of causing the data discard due to the overcapacity is reduced.

If the detection unit counts the number of ATM cells is counted from a usage of the buffer provided in the first trunk unit, counting the number of ATM cells is facilitated. This buffer has the first threshold value that is comparatively large and the second threshold value that is comparatively small. The switching element may be constructed to switch and transmit, when the number of ATM cells exceeds the first threshold value, the part of the ATM cells to be transmitted to the first trunk unit from the switch unit to the second trunk unit, and transmits, when the number of ATM cells is the second threshold value or under, the ATM cells transmitted to the second trunk unit back to the first trunk unit. With this construction, the use of the backup trunk line that is originally used for backup can be minimized.

In the digital switching equipment according to the second mode of the present invention, when the detection unit detects that the data quantity of the digital data block passing through the output line exceeds the fixed threshold value, the notifying element is capable of notifying the occurrence of congestion to the transmitting party of the digital data block, and hence a transmission timing of the digital data block can be delayed in the transmitting party of the digital data block. For example, till there is no occurrence data about the state of congestion, or till the state of congestion is eliminated, the transmission timing of the digital data block can be delayed. Accordingly, the bandwidth management based on the allocation of average value can be effectively conducted, and an output quantity of the digital data block can be adjusted in accordance with the state of congestion. It is therefore possible to reduce the possibility in which the digital data block will be discarded.

This digital switching equipment is constructed of the input trunk unit for accommodating the input line, an output trunk unit for accommodating the output line and a switch unit, connected to the input trunk unit and the output trunk unit, for selectively transferring the block of the digital data by connecting or disconnecting the respective trunk units from each other. If the detection unit is constructed to detect a data quantity of the block of the digital data passing through within the output line, this state of congestion can be detected in such a switching equipment that the output trunk unit accommodates the trunk line.

In this case, the notifying element is provided in the input trunk unit and writes an occurrence data about the state of congestion to the block of the digital data transmitted toward the transmitting party of the block of the digital data from the input trunk unit via the input line. With this construction, even if there is not digital data block transferred to the transmitting party from the output trunk unit, the transmitting party can be notified of the occurrence data about the state of congestion so far as there is the digital data block transferred to the transmitting party from other trunk unit.

In contrast with this, the notifying element is provided in the output trunk unit, and the occurrence data about the state of congestion is written to the digital data block transmitted toward the transmitting party of the digital data block via the switch unit and the input trunk unit from the input trunk unit. With this arrangement, the detection and the notification can be performed within the same trunk unit, and, therefore the control is facilitated.

If the notifying element is constructed to generate the digital data block to which the occurrence data about the state of congestion is written, even in such a case that there is absolutely no digital data block transferred to the transmitting party, it is feasible to surely give the notification of the occurrence data about the state congestion.

Where the digital switching equipment of the present invention is constructed as the ATM switching equipment, when the detection unit detects that the number of ATM cells passing through the output line exceeds the fixed threshold value, the notifying element is capable of transmitting the occurrence data about the state of congestion to the transmitting party of the ATM cells, and hence a transmission timing of the ATM cells can be delayed in the transmitting party of the ATM cells. For example, till there is no occurrence data about the state of congestion, or till the state of congestion is eliminated, the transmission timing of the ATM cells can be delayed. Accordingly, the bandwidth management based on the allocation of average value can be effectively conducted, and the output quantity of the ATM cells can be adjusted in accordance with the state of congestion. It is therefore possible to reduce the possibility in which the ATM cells will be discarded.

In this case, the detection unit includes a buffer to which the ATM cell transferred from the switch unit is temporarily written and from which the ATM cell is read for outputting to the output line. If constructed to recognize that the number of ATM cells passing through the output trunk unit exceeds the fixed threshold value when the number of unread ATM cells accumulated in the buffer reaches the fixed threshold value, counting the number of ATM cells can be facilitated.

If the notifying element is constructed to write the occurrence data about the state of congestion to the ATM cell transmitted to the transmitting party of the ATM cells via the input trunk unit from the output trunk unit, it is possible to give the notification of the occurrence of state of congestion even by preparing no special communication line for the notification.

If constructed to write the occurrence data about the state of congestion to the ATM-OAM cell generated within the ATM switching equipment, the notification of the occurrence of state of congestion can be quickly given.

In the inter digital switching equipment relay system according to the third mode of the present invention, the digital data block inputted to the first digital switching equipment is copied in the first digital switching equipment, and one of the copied blocks is transferred to the trunk line, and one other copied block is transferred to the backup trunk line. Then, during the normal state where no fault happens in the trunk line, the second digital switching equipment outputs only the digital data block transferred via the trunk line to the output line but discards the digital data block transferred via the backup trunk line. Contrastingly when the fault happens in the trunk line, the second digital switching equipment discards the digital data transferred via the trunk line but outputs only the digital data block transferred via the backup trunk line to the output line. Accordingly, switching from the trunk line to the backup trunk line can be done only by switching the transfer path within the second digital switching equipment. Hence, the switching is effected at one place, and this makes it possible to reduce the possibility of causing the discard the digital data block with the switching operation. In this case, when the first digital switching equipment detects the fault in the trunk line, the first digital switching equipment notifies the second digital switching equipment of the occurrence of the fault. The second digital switching equipment for switching the transfer path can know the occurrence of the fault.

If the digital switching equipment of the present invention is constructed as the ATM switching equipment, the ATM cell inputted to the first ATM switching equipment is copied in the first ATM switching equipment, and one of the copied ATM cells is transferred to the trunk line, and one other copied ATM cell is transferred to the backup trunk line. Then, during the normal state where no fault happens in the trunk line, the second ATM switching equipment outputs only the ATM cells transferred via the trunk line to the output line but discards the ATM cells transferred via the backup trunk line. Contrastingly when the fault happens in the trunk line, the second ATM switching equipment discards the ATM cells transferred via the trunk line but outputs only the ATM cells transferred via the backup trunk line to the output line. Accordingly, switching from the trunk line to the backup trunk line can be done only by switching the transfer path within the second ATM switching equipment. Hence, the switching is effected at one place, and this makes it possible to reduce the possibility of causing the discard of the ATM cells with the switching operation. In this case, when the first ATM switching equipment detects the fault in the trunk line, the first ATM switching equipment transmits the ATM-OAM cell for notifying the second ATM switching equipment of the occurrence of the fault. The second ATM switching equipment for switching the transfer path can quickly know the occurrence of the fault.

In this case, the ATM cells copied in the first ATM switching equipment are only some preselected ATM cells, and, with respect to the ATM cells exclusive of these some ATM cells, even when the fault happens in the trunk line, only the cells transferred from the trunk line are outputted from the output line. With this operation, the number of ATM cells detoured to the backup trunk line can be reduced, and hence the single backup trunk line can be used in common to the plurality of trunk line.

In the inter digital switching equipment relay system according to the fourth mode of the present invention, whether the digital data block transferred via the trunk line or the digital data block transferred via the backup trunk line, both of the data blocks are so set beforehand as to be outputted from the output line within the second digital switching equipment. Then, during the normal state where no fault happens in the trunk line, the first digital switching equipment transfers the digital data block inputted from the input line to only the trunk line. Accordingly, the digital data block is inputted to the second digital switching equipment only from the trunk line, but no digital data block is inputted from the backup trunk line. Contrastingly when the fault happens in the trunk line, the first digital switching equipment transfers the digital data block inputted from the input line to only the backup trunk line. Hence, the digital data block is inputted to the second digital switching equipment only from the backup trunk line, but no relevant digital data block is inputted from the trunk line. Accordingly, the switching from the trunk line to the backup trunk line can be done only by switching the transfer path within the first digital switching equipment. Hence, the switching is effected at one place, and this makes it possible to reduce the possibility of causing the discard of the digital data block with the switching operation. In this case, when the second digital switching equipment detects the fault in the trunk line, the second digital switching equipment notifies the first digital switching equipment of the occurrence of the fault. The first digital switching equipment for switching the transfer path can know the occurrence of the fault.

If the digital switching equipment of the present invention is constructed as the ATM switching equipment, whether the ATM cell transferred via the trunk line or the ATM cell transferred via the backup trunk line, both of the ATM cells are so set beforehand as to be outputted from the output line within the second ATM switching equipment. Then, during the normal state where no fault happens in the trunk line, the first ATM switching equipment transfers the ATM cell inputted from the input line to only the trunk line. Accordingly, the ATM cells are inputted to the second ATM switching equipment only from the trunk line, but no ATM cell is inputted at all from the backup trunk line. Contrastingly when the fault happens in the trunk line, the first ATM switching equipment transfers the ATM cells inputted from the input line to only the backup trunk line. Hence, the ATM cells are inputted to the second ATM switching equipment only from the backup trunk line, but no ATM cell is inputted from the trunk line. Accordingly, the switching from the trunk line to the backup trunk line can be done only by switching the transfer path within the first ATM switching equipment. Hence, the switching is effected at one place, and this makes it possible to reduce the possibility of causing the discard of the ATM cells with the switching operation. In this case, when the second ATM switching equipment detects the fault in the trunk line, the second ATM switching equipment notifies the first ATM switching equipment of the occurrence of the fault. With this notification, the first ATM switching equipment for switching the transfer path can know the occurrence of the fault.

In this instance, the preset ATM cells are only some preselected ATM cells so as to be outputted to the output line even if transferred from the backup trunk line within the second ATM switching equipment. With respect to the ATM cells exclusive of these some ATM cells, even when the fault happens in the trunk line, the cells are transferred only to the output line within the first ATM switching equipment. With this operation, the number of ATM cells detoured to the backup trunk line can be reduced, and, therefore, the single backup trunk line can be used in common to the plurality of trunk line.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is an explanatory diagram showing the routing (TAG) data when in the 1-to-1 connection;

FIG. 11 is an explanatory diagram showing the routing (TAG) data when in the 1-to-1 connection;

FIG. 15 is an explanatory diagram showing the routing (TAG) data when in the 1-to-N connection;

FIG. 17 is a diagram showing a state-of-congestion management table;

FIG. 24 is a diagram illustrating a structure of an ATM-OAM cell;

FIG. 33 is a diagram illustrating how a trunk line is switched in the third embodiment of the present invention;

FIG. 42 is a diagram showing how the trunk line is switched in the fourth embodiment of the present invention;

FIG. 55 is a diagram showing how the transmitting-side ATM node is notified of the fault in the sixth embodiment of the present invention.

DESCRIPTION OF THE PREFERRED EMBODIMENTS

Embodiments of the present invention will hereinafter be discussed with reference to the drawings. In the embodiments thereof, an inter digital switching equipment relay system according to the present invention is applied to a B-ISDN (Broadband-Integrated Services Digital Network).

<Construction of B-ISDN>

Figure 1:
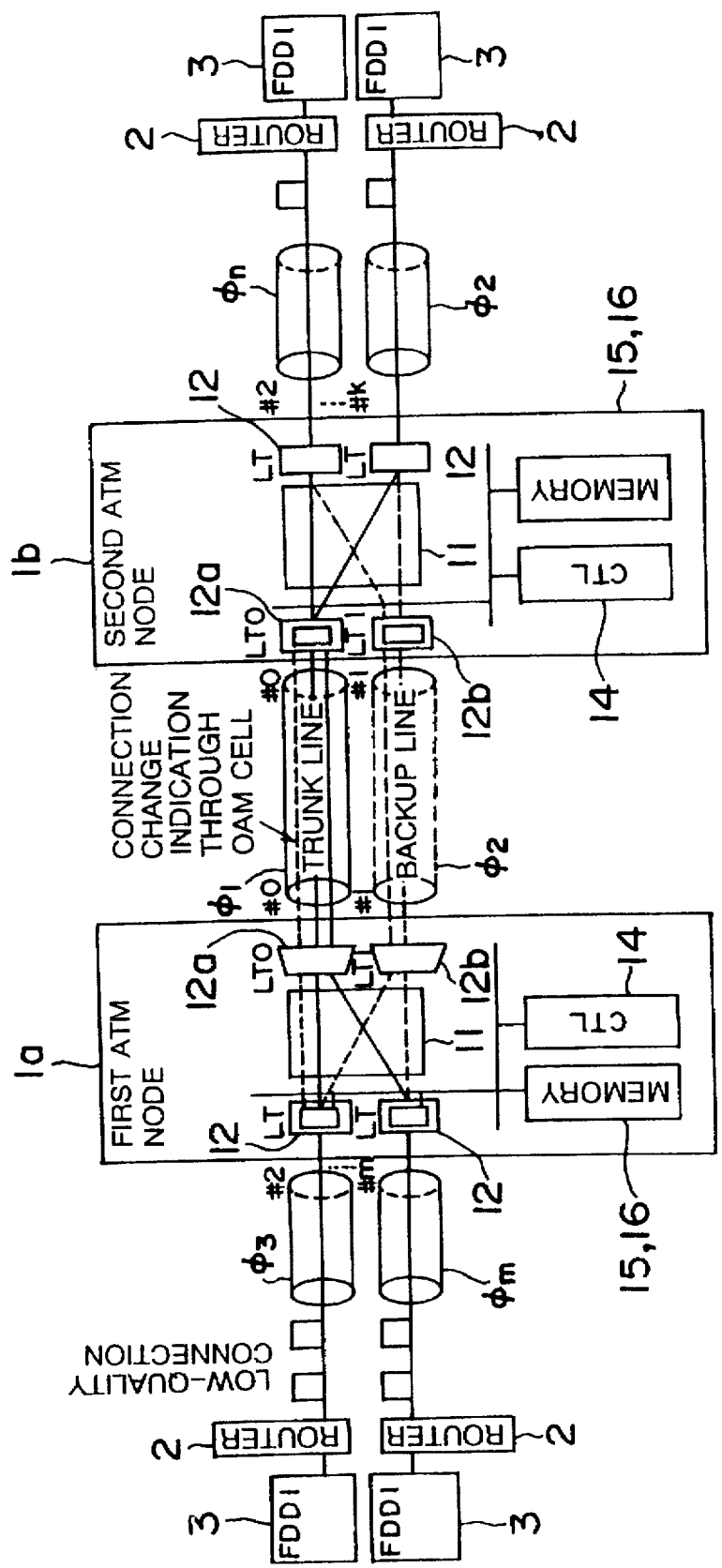
FIG. 1 is a diagram schematically illustrating a B-ISDN to which an ATM relay system in one embodiment of the present invention is applied.

At first, FIG. 1 is a schematic diagram illustrating the B-ISDN to which one embodiment of the present invention is applied. This B-ISDN includes two sets of ATM nodes (a first ATM node 1a and a second ATM node 1b) defined as digital switching equipments, which are connected to each other.

The two ATM nodes are connected through an ATM trunk line φ1 having its two terminals connected to specified ports #0 of the respective ATM nodes 1. Connecting these ATM nodes 1 to each other is known as a network node interface (NNI). Further, a backup line φ2 serving as a standby trunk line having the same capacity and the same function as those of the trunk line φ1 is arranged in parallel to the trunk line φ1 between these two ATM nodes. Two terminals of this backup line φ2 are connected to ports (#1) different from the ports #0 of the respective ATM nodes.

Note that other ports (#2–#m) of the first ATM node 1a are connected to a user terminal (unillustrated) or another ATM node (unillustrated) via an ATM subscriber line or other trunk line. Similarly, other ports (#n–#z) of the second ATM node 2a are connected to a user terminal (unillustrated) or other ATM node (unillustrated) via an ATM subscriber line or other trunk line. FIG. 1 illustrates that the respective ATM nodes 1 are connected via routers 2 to FDDIs 3. It is assumed that a plurality of unillustrated terminals are connected through these FDDIs 3. Such a connection between the ATM node 1 and the terminal (including the router) is termed a user node interface (UNI).

Note that the individual lines φ1–φm are prepared by ones in up-and-down directions of communications. Herein, the upward direction is a direction in which the data enters the first ATM node 1a from each terminal and is transferred to the second ATM node 1b, while the downward direction is a direction reversal to the former.

<Structure of Cell>

Figure 6:
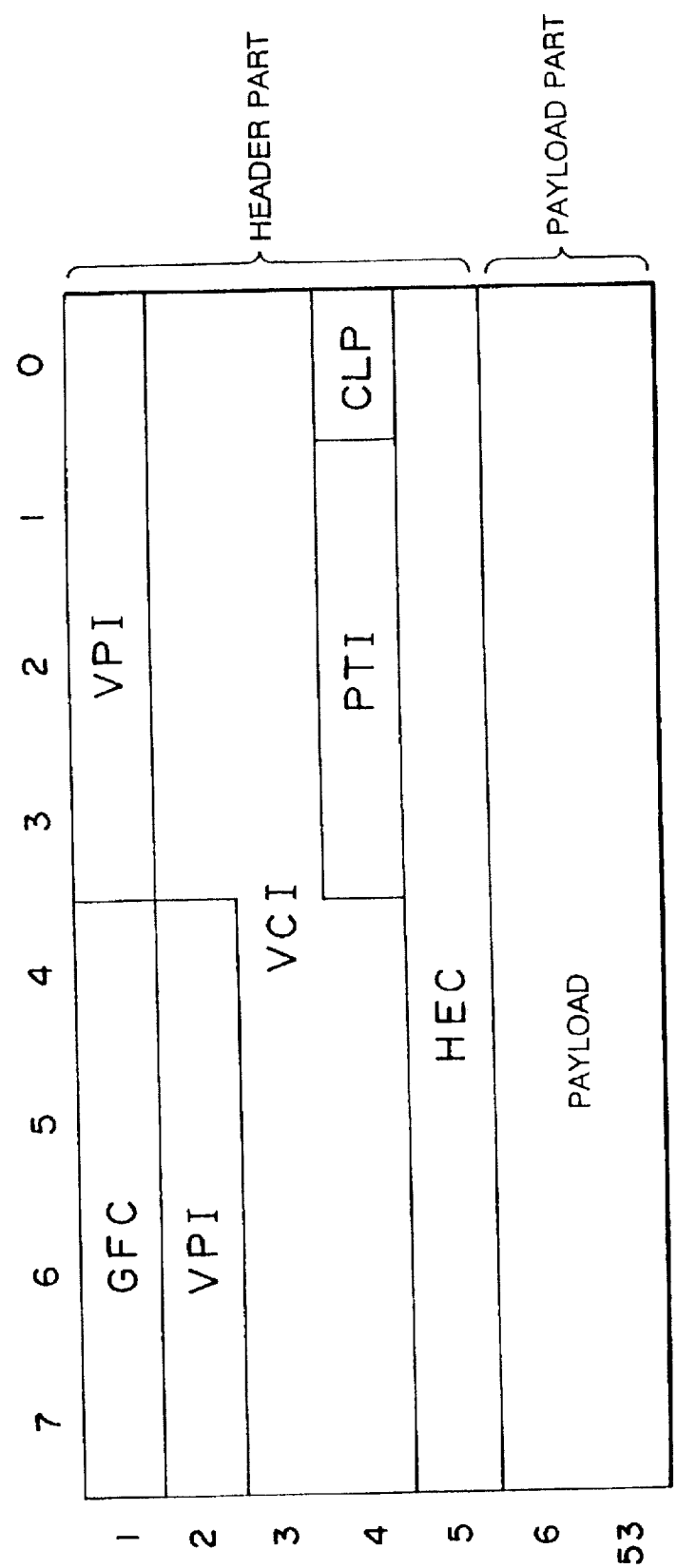
FIG. 6 is a diagram illustrating a structure of an ATM cell transmitted within UNI.

Next, FIG. 6 illustrates a structure of the cell transferred within this UNI. As shown in FIG. 6, the cell is composed of a 5-octet header part and a 48-octet payload part. The header part is a field for indicating which communication the relevant cell belongs to. Further, the payload part is a field for storing user data.

First-half 4 bits of the first octet of the header part correspond to a generic flow control (GFC) part. Last-half 4 bits of the first octet of the header part and first-half 4 bits of the second octet correspond to a virtual path identifier (VPI). A virtual channel identifier (VCI) ranges from last-half 4 bits of the second octet to first-half 4 bits of the fourth octet.

The virtual path identifier (VPI) and the virtual channel identifier (VCI) are routing-bits for specifying a relevant-cell transfer path, i.e., a specific virtual channel (VC) and a specific virtual path (VP).

A payload type identifier (PTI) consists of 3 bits from the 5th bit of the fourth octet of the header part. This payload type identifier (PTI) indicates types of contents of the payload part. The term "type" indicates user data, OAM data, a resource data, etc. The payload type identifier (PTI) also represents an item of data showing whether a connection that the relevant user cell belongs to encounters a congestion or not.

The last bit of the fourth octet of the header part is a cell loss priority (CLP) indication. This cell loss priority (CLP) indication shows whether the priority is low ("1") or high ("0").

The fifth octet of the header part corresponds to a header error control (HEC) part.

When the cell is transferred within the NNI, the generic flow control (GFC) part is deleted, and, instead, the virtual path identifier comes to totally 12 bits.

<Structure of SDH Frame>

Figure 7:
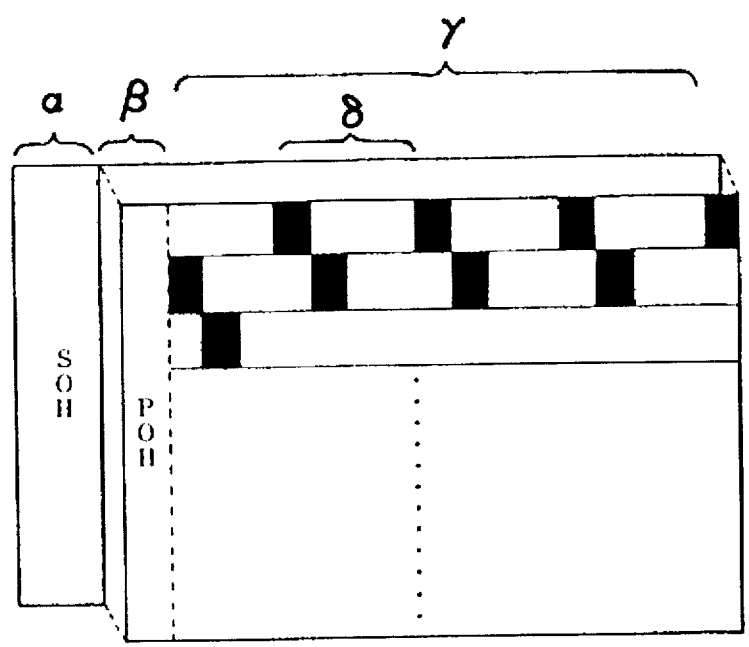
FIG. 7 is a diagram showing a structure of an SDH frame.

The thus structured cell is multiplexed in order to be transferred within the UNI as well as within the NNI and then mapped to a frame of a synchronous digital hierarchy (SDH). FIG. 7 illustrates a format of this SDH frame. As depicted in FIG. 7, this frame is composed of a section overhead α, a path overhead β and a payload γ.

The section overhead α and the path overhead β are pieces of data for monitoring and maintaining a status of a connection to which the cell stored in this frame belongs. Specifically, this incorporates functions such as framing, an error detection and a maintenance.

Note that this SDH frame is periodically transmitted even if not full of an ATM frame δ stored in the payload γ.

<Construction of ATM Node>

An internal construction of the ATM node will be next explained in detail with reference to FIGS. 2 and 3. Note that the constructions of the first and second ATM nodes 1 are absolutely the same.

Figure 2:
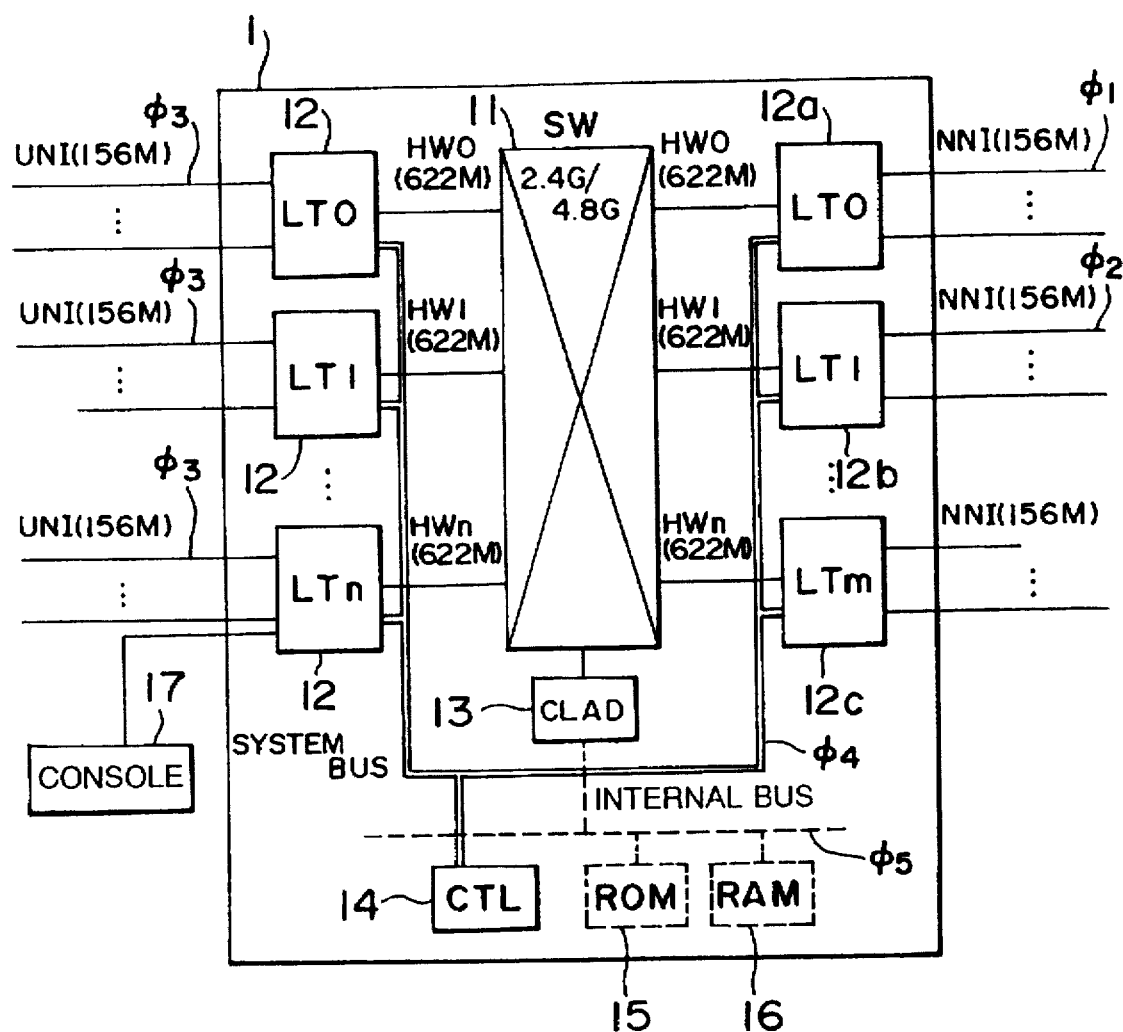
FIG. 2 is a block diagram showing a construction of each ATM node.
Figure 3:
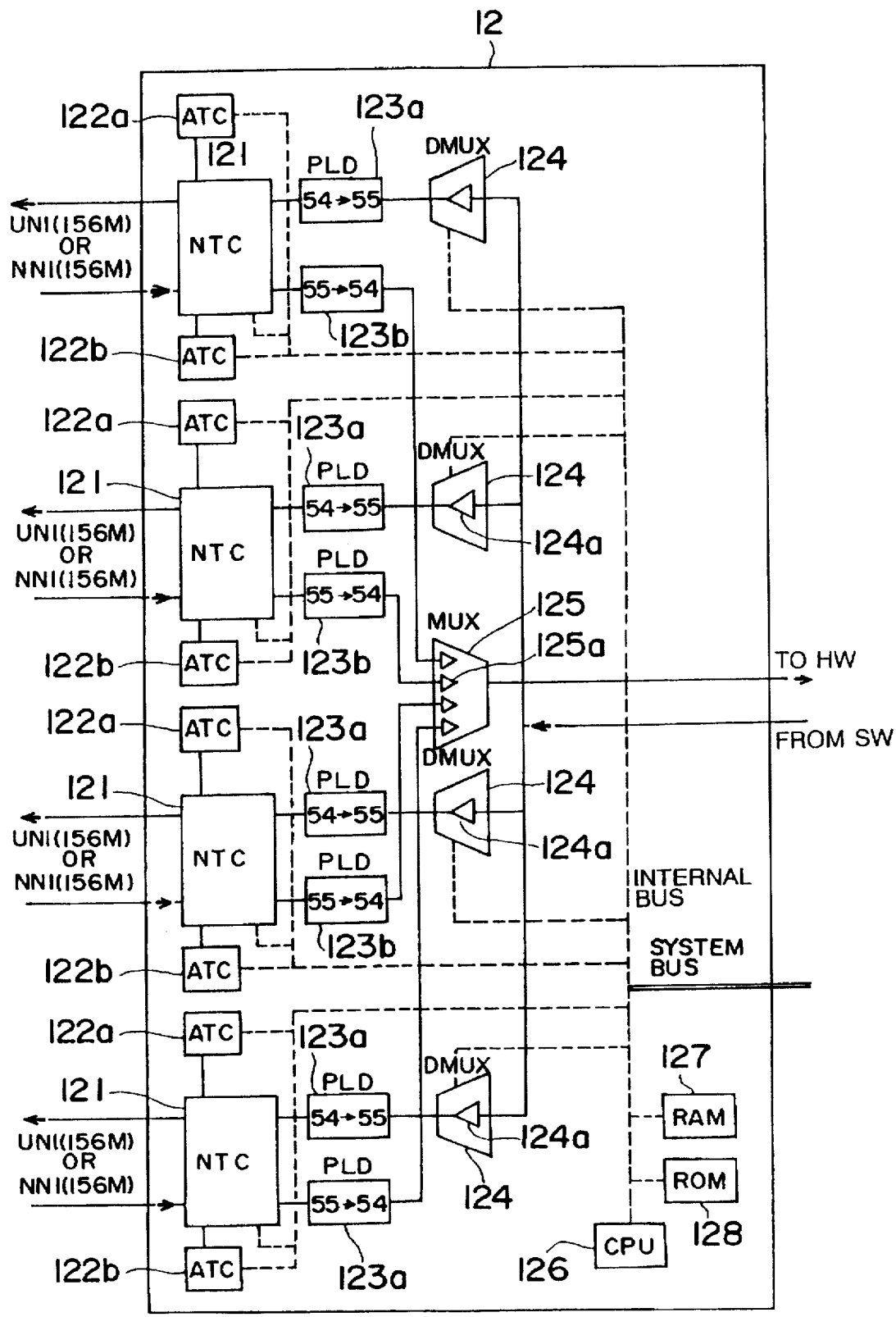
FIG. 3 is a block diagram showing a construction of a line control unit.

As illustrated in FIG. 2, each ATM node 1 is constructed of a plurality of line control units (LT) 12 connected respectively to a plurality of ATM trunk line φ1 or a plurality of ATM subscriber line φ3 and a single ATM cell switch (SW) 11 connected via individual highways (HW) to all the line control units (LT) 12. The ATM node 1 is further constructed of a control signal transmitting/receiving unit (CLAD) 13 connected to this ATM cell switch (SW) 11, a main control unit (CTL) 14 connected via an internal bus to the control signal transmitting/receiving unit (CLAD) 13 as well as being connected to all the line control units (LT) 12 via a system bus φ4, a ROM (read only memory) 15 and a RAM (random access memory) 16, these memories being respectively connected via an internal bus φ5 to the main control unit (CTL) 14.

[Configuration of Line Control Unit (LT)]

The line control unit (LT) 12 serving as a trunk unit has a function to perform time-division multiplexing of the cells from the plurality of ATM trunk lines φ1 or the ATM subscriber lines φ3 and send the cells through the highways (HW). The line control unit (LT) 12 also incorporates a function to demultiplex the cells received from the highways (HW) and transmit the demultiplexed cells to any proper signal line among the plurality of ATM trunk lines φ1 or the ATM subscriber lines φ3. Referring to FIG. 2, the ATM node is equipped with m-sets of line control units (LT) 12 connected to the ATM trunk lines φ1 or the backup lines φ2 and also n-sets of line control units (LT) 12 connected to the ATM subscriber lines φ3. Herein, it is assumed that the trunk line φ1 is connected to the line control unit (LT0) 12a, while the backup line φ2 is connected to the line control unit (LT1).

The configuration of the line control unit (LT) 12 will be explained in greater detail with reference to FIG. 3. As illustrated in FIG. 3, the line control unit (LT) 12 comprises: four ATM network terminal circuits (NTC) 121 each connected to two input-output ATM trunk lines φ1 or two input-output ATM subscriber lines φ3; four ATM cell header high-speed converting circuits (ATC) 122a for the input direction (directed toward the SW unit 11 from the line), these circuits (ATC) 112a being connected to the ATM network terminal circuits (NTC) 121; four ATM cell header high-speed converting circuit (ATC) 122b for the output direction (directed toward the line from the SW unit 11).

these circuits (ATC) 122b being similarly connected to the ATM network terminal circuits (NTC) 121; four HEC additional circuits (PLD) 123a connected respectively to highway-side input terminals of the ATM network terminal circuits (NTC) 121; four HEC deletion circuits (PLD) 123b connected respectively to highway-side output terminals of the ATM network terminal circuits (NTC) 121; four cell demultiplexing circuits (DMUX) 124 connected respectively to input terminals of the HEC additional circuits (PLD) 123a; one cell multiplexing circuit (MUX) 125 connected to an output terminals of all the HEC deletion circuits (PLD) 123b; a CPU (central processing unit) 126 connected via an internal bus to the circuits NTC 121, the circuits ATC 122, the circuits DMUX 124 and the circuit MUX 125; a RAM (random access memory) 127 connected via the internal bus to this CPU 126; and a ROM (read only memory) 128 connected thereto via the same bus.

[Configuration of CPU]

This CPU 126 is controlled by the main control unit (CTL) 14 through the system bus. Then, the CPU 126 executes a program stored in the ROM 128 referring data stored in the RAM 127, thereby controls the respective constructive elements connected via the internal bus.

[Configuration of ATM network terminal circuit (NTC)]

The ATM network terminal circuit (NTC) 121 is a interface for terminating the SDH on each line and inputting and outputting the cell to the interior of the node 1. That is, the ATM network terminal circuit (NTC) 121 extracts each cell 6 by eliminating the section overhead (SOH) and the path overhead (POH) from the SDH frame inputted from each of the lines φ1–φm. Further, the ATM network terminal circuit (NTC) 121 maps, to the SDH frame, the cell transferred from the ATM cell switch (SW) 11 via the cell demultiplexing circuit (DMUX) 124, properly adds the section overhead (SOH) and the path overhead (POH) and thus transmits it to each of the lines φ1–φm.

Figure 25:
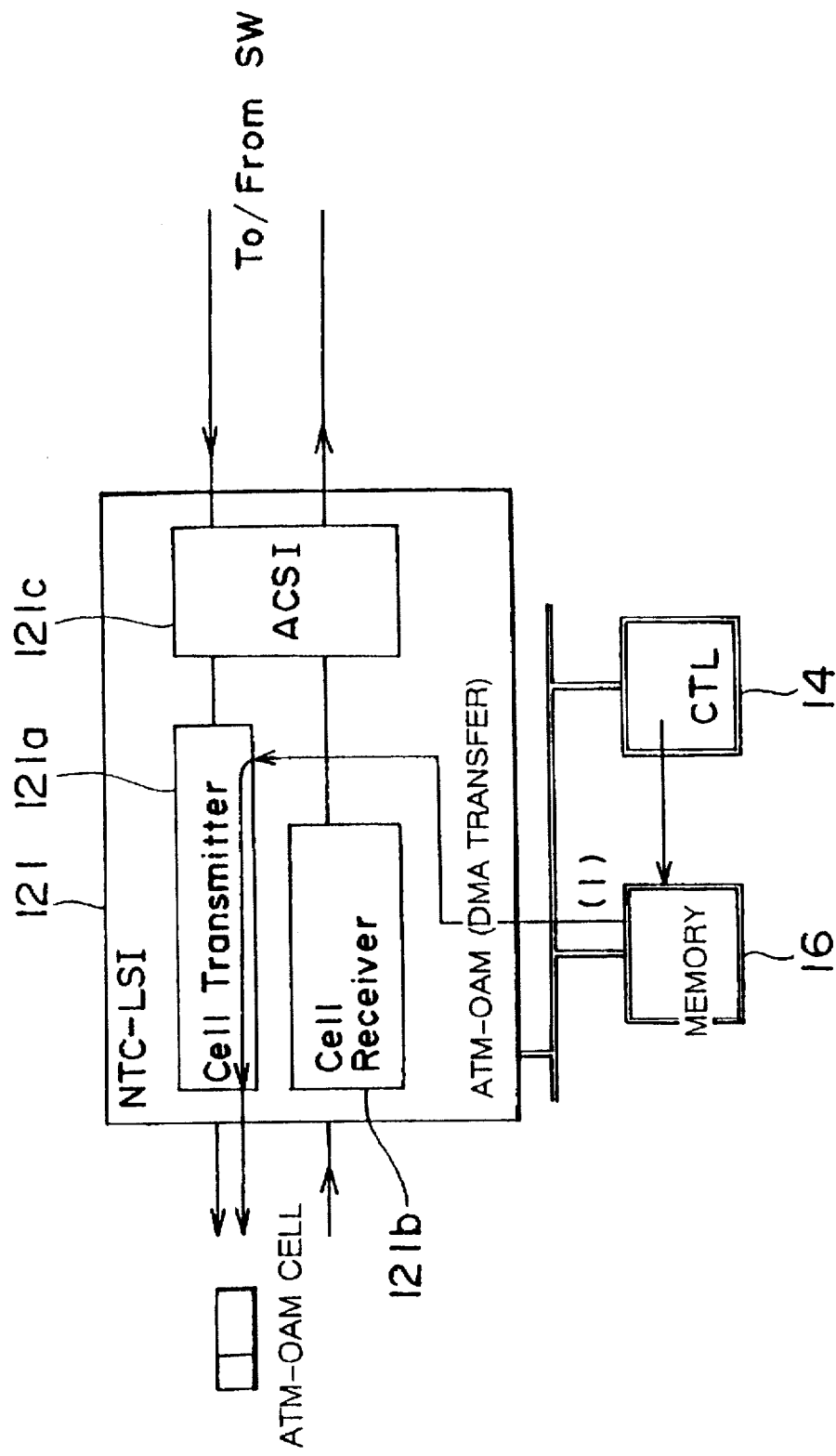
FIG. 25 is a diagram illustrating how the ATM-OAM cell is issued in a transmitting node.
Figure 26:
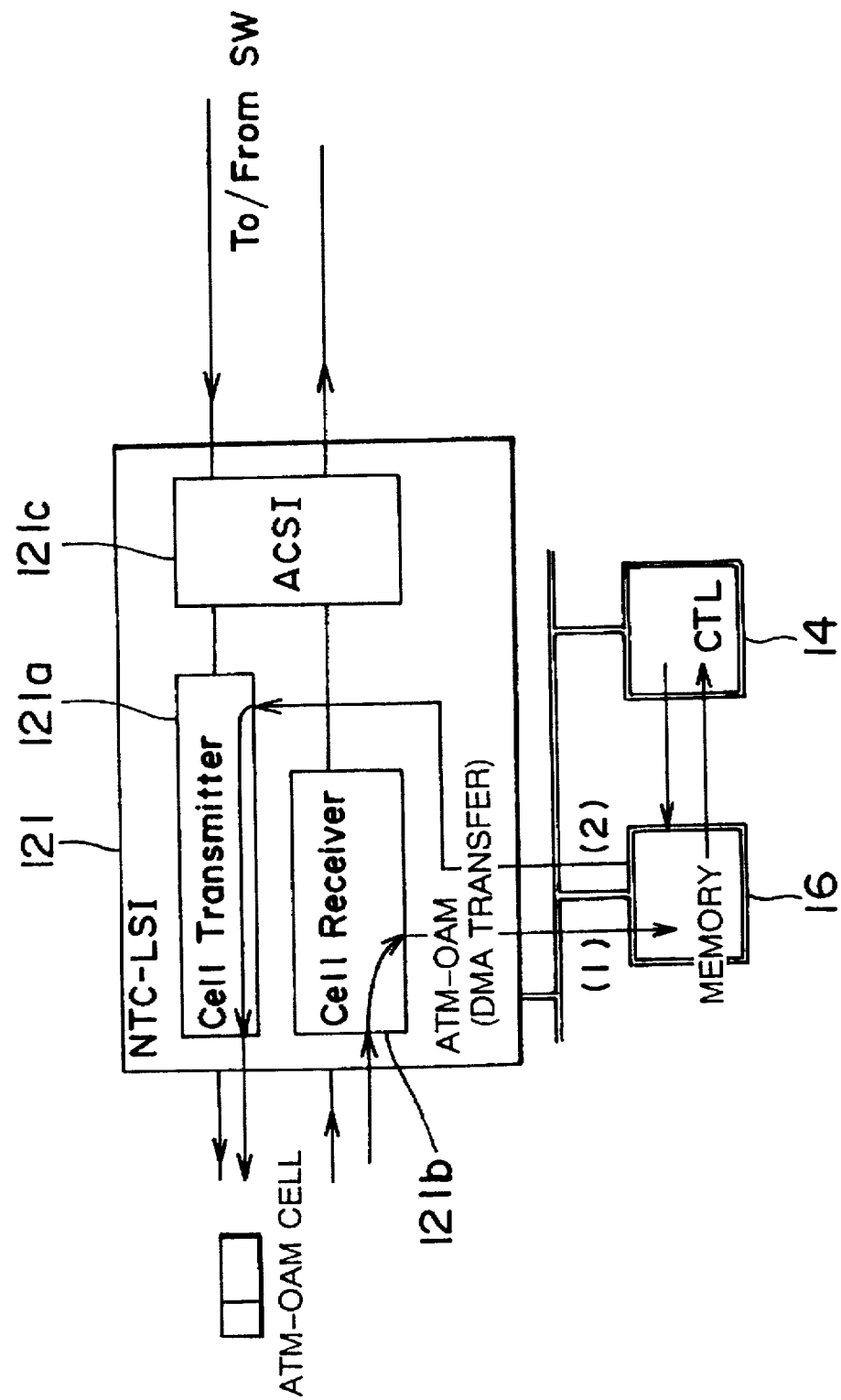
FIG. 26 is a diagram showing how the ATM-OAM cell is received and sent back in a face-to-face node.
Figure 27:
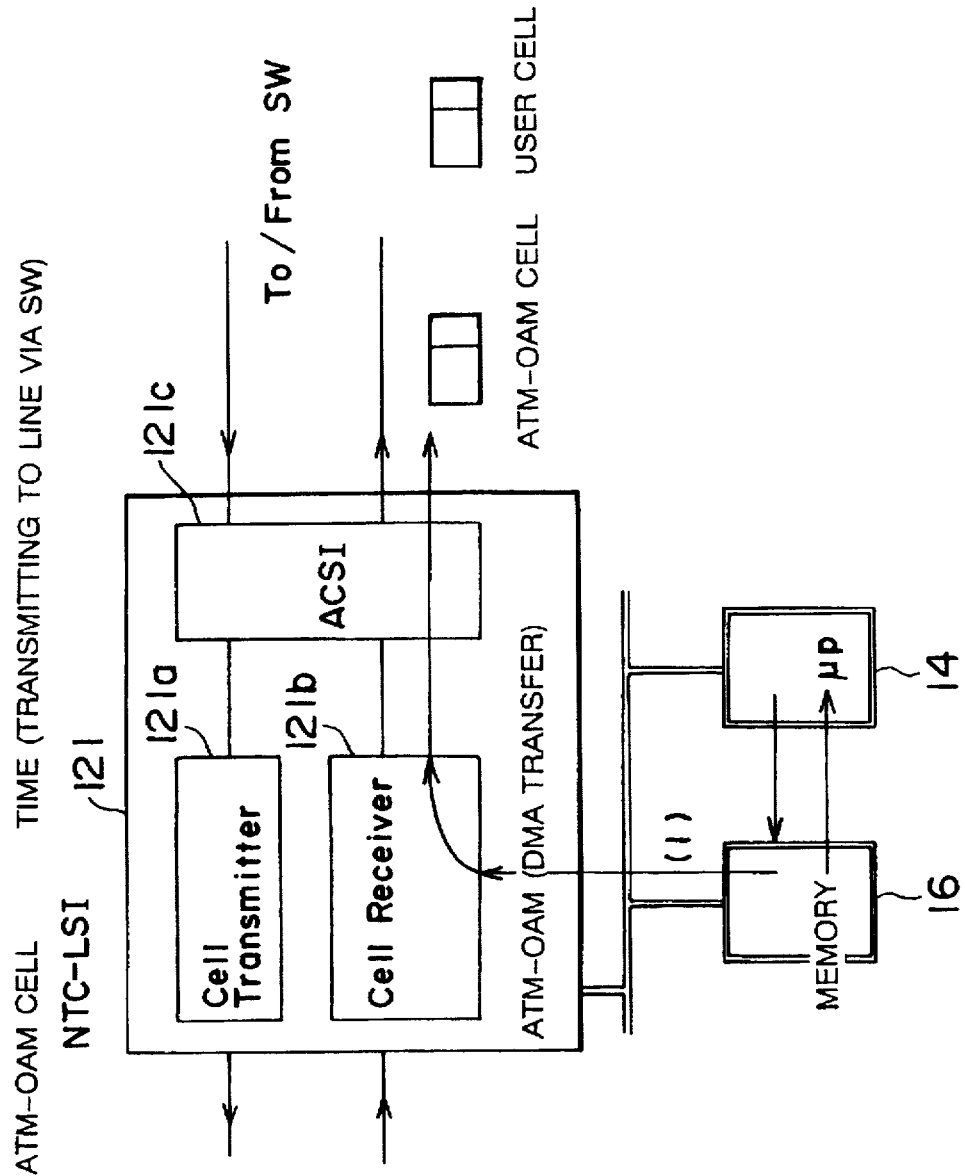
FIG. 27 is a diagram showing how the ATM-OAM cell is issued through an ATM cell switch unit.

Further, the ATM network terminal circuit (NTC) 121 includes, as illustrated in FIGS. 25 through 27, an ATM cell stream interface (ACSI) 121c to which a cell transmitter 121a and a cell receiver 121b are connected.

This ATM cell stream interface (ACSI) 121C is defined as a data flow control interface in terms of a transmission and receipt with respect to a cell header high-speed converting circuit (ATC) and a cell stream interface.

Further, the cell transmitter 121a incorporates a function to transmit an ATM-OAM cell outputted from the memory (RAM) 16 to a switching network via the trunk line φ1 or the subscriber line φ3 in accordance with an indication given from the main control unit 14 (see FIG. 25). Further, the cell receiver 121b has a function to receive the ATM-OAM cell sent via the trunk line φ1 and notify the main control unit (CTL) 14 of it through the memory (RAM) 16 (see FIG. 26) and also a function to transfer the ATM-OAM cell to the ATM cell switch (SW) 11 (see FIG. 27).

This ATM-OAM cell is a cell for operating and maintaining the connection of the virtual path (VP) and the virtual channel (VC) in the B-ISDN. Herein, structure of the ATM-OAM cell will be explained with reference to FIG. 24. This ATM-OAM cell is also, as depicted in FIG. 6, composed of a 5-octet header part (Cell Header) and a 48-octet payload part. Then, this payload part consists of a 4-bit CAM cell type indicating part (OAM Cell Type), a 4-bit function type indicating part (Function Type), a 45-octet function specific field, reserve 6-bits for a prospective use and a 10-bit error detection code (EDC (CRC-10)).

In accordance with this embodiment, the above-described ATM-OAM cell is employed for switching the connection of the user cell. More specifically, this ATM-OAM cell is used for switching, to the backup line φ2, a transmission path of the user cell transmitted to a specified node via the trunk line φ1. Further, in this embodiment, if a transmitting terminal of the user cell is the router 2, the ATM-OAM cell is employed for notifying the relevant router 2 of an item of data about the congestion.

Further, the ATM network terminal circuit (NTC) 121 is capable of detecting an L1 (physical layer) fault. This L1 fault is exemplified by, specifically, an abnormality in clock second, a cut-off of an optical output, a loss of signal (LOS), an out-of-synchronism of frame (LOF), a loss of pointer (LOP), an out-of-synchronism of cell (LOC) and a receipt of an alarm indication signal (AIS). The ATM network terminal circuit (NTC) 121, when detecting the LI fault, notifies the main control unit (CTL) 14 of this effect.

[Configuration of ATM Cell Header High-Speed Converting Circuit (ATC)]

Any ATM cell header high-speed converting circuit (ATC) 122 also rewrites the header part of the received cell. The ATM cell header high-speed converting circuit (ATC) 122, e.g., rewrites a VPI/VCI and writes an item of congestion notifying data to the payload type identifier (PTI).

Further, the input-directional ATM cell header high-speed converting circuit (ATC) 122a performs header editing to add routing (TAG) data to the cell in the ATM network terminal circuit (NTC) 121. On the other hand, the output-directional ATM cell header high-speed converting circuit (ATC) 122b performs the header editing to delete the routing (TAG) data from the cell in the ATM network terminal circuit (NTC) 121. To explain it in detail, when the ATM network terminal circuit (NTC) 121 receives the cell from the ATM trunk line φ1 or the ATM subscriber line φ3, the input-directional ATM cell header high-speed converting circuit (ATC) 122a adds the routing (TAG) data in accordance with a VPI/VCI value of the relevant cell. Further, when the ATM network terminal circuit (NTC) 121 receives the cell via the highway (HW), the output-directional ATM cell header high-speed converting circuit (ATC) 122b deletes the routing (TAG) data and, as the necessity arises, effects the high-speed conversion of the VPI/VCI. A cell transfer routing within the node 1 is determined based on this item of routing (TAG) data.

The input-directional ATM cell header high-speed converting circuit (ATC) 122a, in accordance with an indication given from the main control unit (CTL) 14, adds a 1-to-1 connection routing (TAG) data or a 1-to-N connection routing (TAG) data to the heading of the cell header part. Adding which type of the routing (TAG) data is initialized beforehand for every ATM cell header high-speed converting circuit (ATC) 122a of each line control unit (LT) 12. Then, this item of data is registered in the RAM 16.

Figure 8:
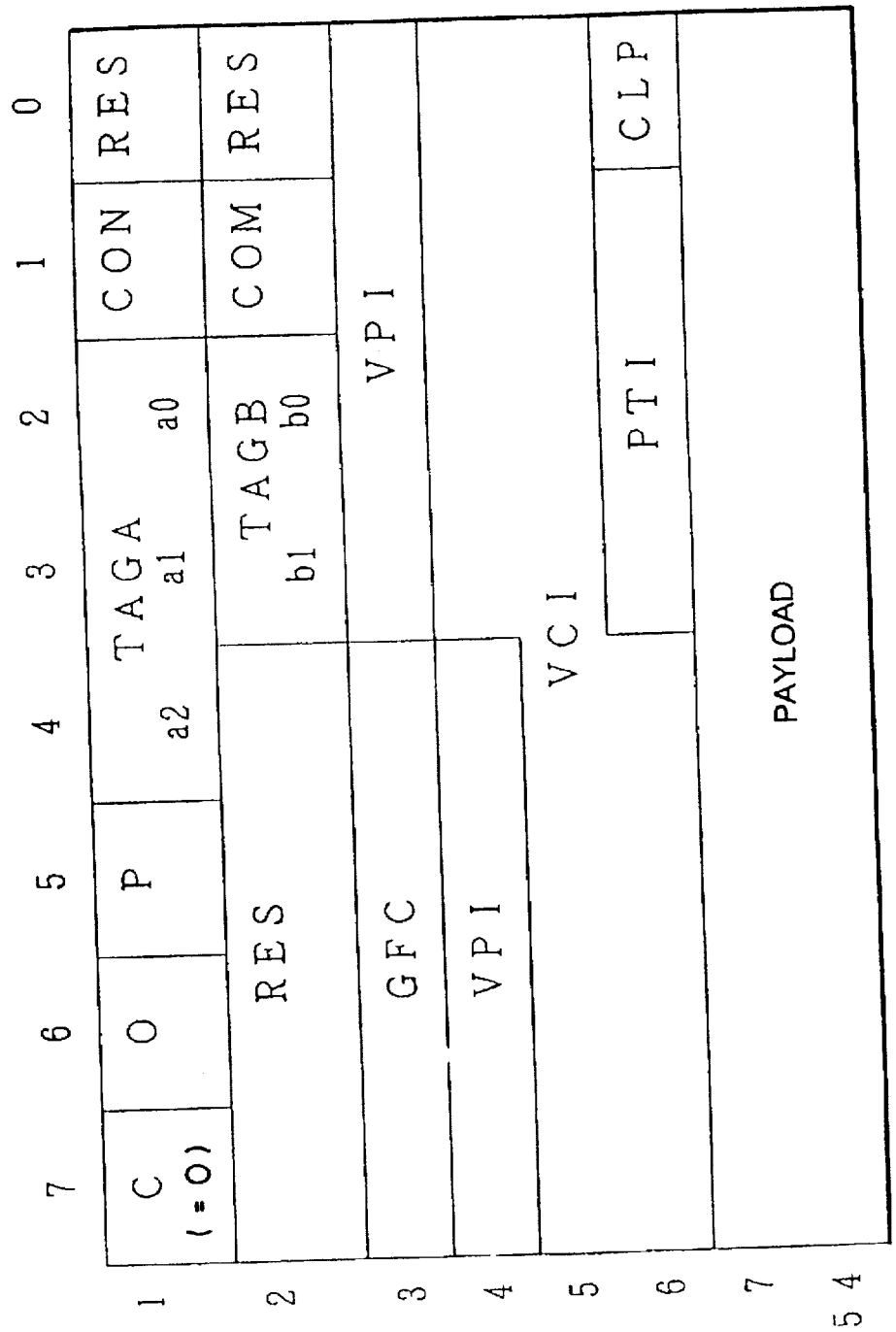
FIG. 8 is a diagram illustrating a structure of the ATM cell after being header-converted within the line control unit when in a 1-to-1 connection.

FIG. 8 shows the 1-to-1 connection routing (TAG) data. As illustrated in FIG. 8, this routing (TAG) data has a 2-octet length.

A copy indication bit (C) in the routing (TAG) data indicates whether the relevant cell is used for point-to-point signaling (=0) or point-to-multipoint signaling (=1). Accordingly, in this case, the copy indication bit (C) is set such as C=0. Further, an intra equipment test cell indication bit (0) indicates whether the relevant cell is a user cell (=0) or an intra equipment cell (=1). Moreover, a priority class bit (P) indicates whether the relevant cell is a high priority cell (=0) or a low priority cell (=1). Additionally, a congestion control bit (CON) indicates whether the relevant cell belongs to a significant call enough not to dispose of the cell (=0) or a non-significant call enough to dispose of the cell (=1). Note that the symbol RES designates a reserve bit.

Further, an intra SW routing data part (TAGA) indicates a routing within the ATM cell switch (SW), i.e., indicates which line control unit (LT) 12 to proceed. An intra line unit routing data part (TAGB) indicates routing within the line control unit (LT) 12, i.e., indicates which cell demultiplexing circuit (DMUX) 124 to pass, and a common unit selection bit (COM) indicates that the control signal transmitting/receiving unit (CLAD) 13 is made to select a forward route. The intra SW routing data part (TAGA), intra line control part routing data part (TAGB) and the common unit selection bit (COM) select one route in accordance with a combination of the respective bit-statuses (0 or 1). Hence, selectable routes depending on the combinations of totally 6 bits are given by $2^6=32$ ways. This numerical value corresponds to the number of 156 Mbps lines that can be accommodated when a maximum capacity is 4.8 Gbps.

A relationship given above will be schematically explained with reference to FIGS. 9 through 11.

Figure 9:
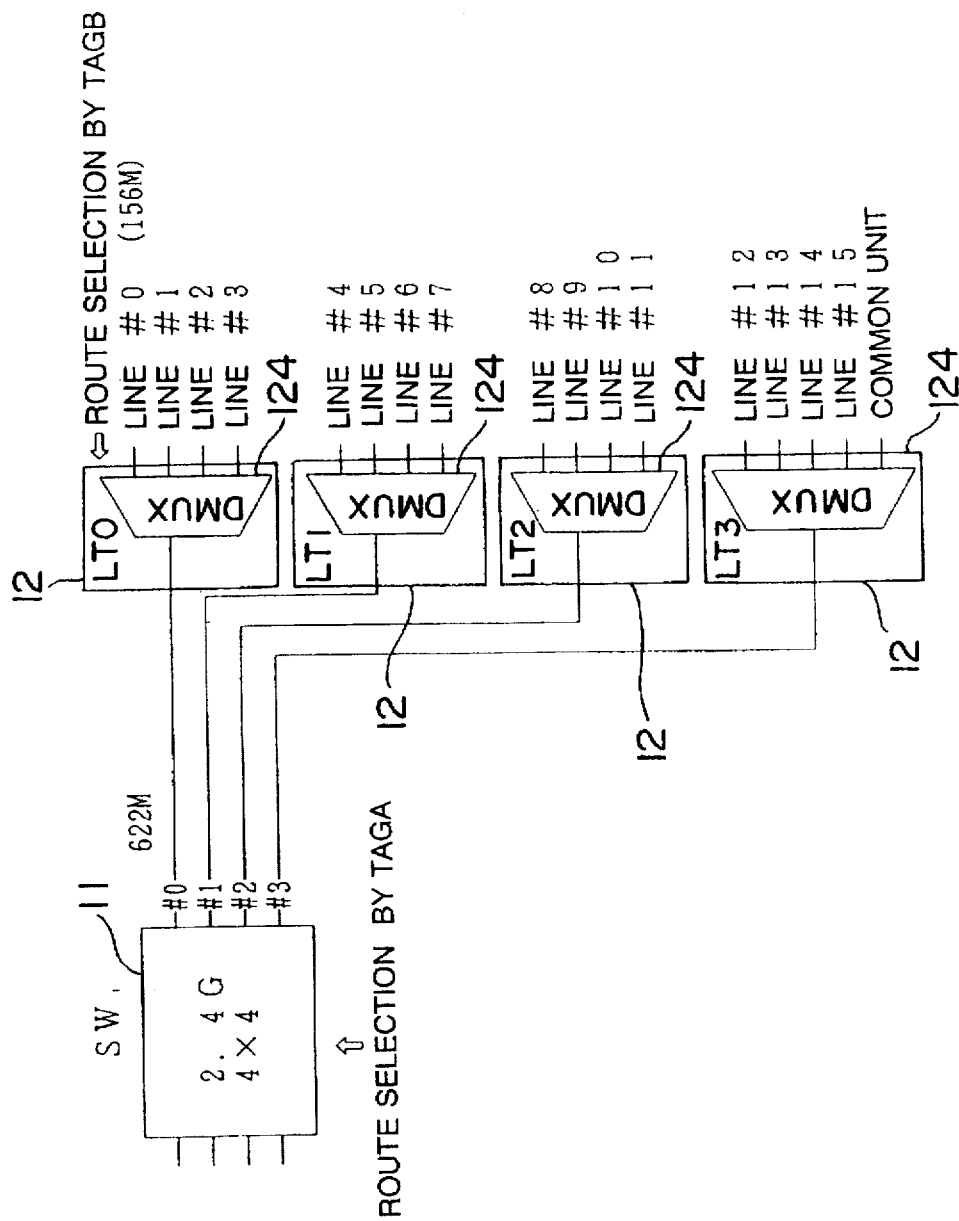
FIG. 9 is an explanatory diagram showing routing (TAG) data when in the 1-to-1 connection.

Now it is assumed that, as illustrated in FIG. 9, the ATM cell switch (SW) 11 has four output ports (#0–#4) to which the line control units (LT0–LT3) 12 are individually connected, and a cell demultiplexer (DMUX) 124 for demultiplexing the cell coming from the line to four lines is provided in each of the line control units (LT0–LT3) 12. It is also assumed that only the line control unit LT3 is connected to the common unit (CLAD) 13.

In this case, within the ATM cell switch (SW) 11, as shown in a table of FIG. 10, the output route (port) is determined based on a 3-bit status of TAGA.

Further, in each of the cell demultiplexers (DMUX) 124, as shown in a table of FIG. 11, the output route (port) is determined based on a TAGB 2-bit status and a common unit selection bit (COM) status.

It is herein assumed that the line extending from LT0 is connected to the trunk line φ1, and the line from LT1 is connected to the backup line φ2 for the trunk line φ1. Similarly, it is assumed that the line extending from LT2 is connected to the trunk line φ1, and the line from LT3 is connected to the backup line φ2 for the trunk line φ1. Then, as obvious from FIGS. 10 and 11, the output destination line control unit can be switched from LT0 to LT1 or from LT2 to LT3 simply by changing setting of the intra SW routing data (TAGA) (by switching a0 from "0" to "1"). Namely, the cell that is to be sent to the trunk line φ1 can be transmitted while being switched to the backup line φ2. Note that the switching of the line control unit (LT) serving as an output destination, i.e., the switching of the routing (TAG) data can be done for each cell. In addition, the switching can be effected based on a VPI/VCI value for each identical connection.

Figures 12A, 12B:
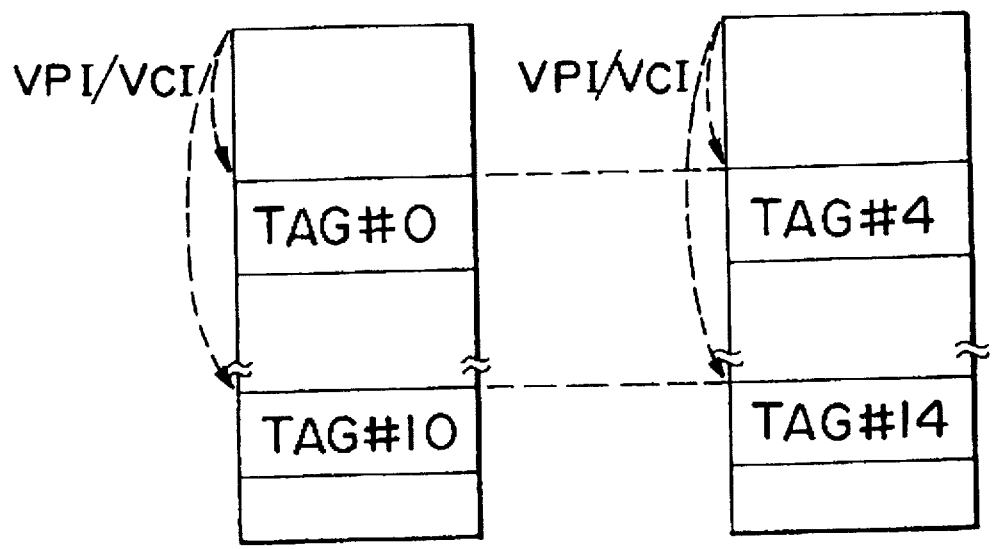
FIG. 12 is a diagram showing a routing table when in the 1-to-1 connection.

Note that the input-directional ATM cell header high-speed converting circuit (ATC) 122a includes a routing table as shown in FIG. 12 in order to perform this cell header editing. A symbol "TAG#0" in FIG. 12 represents [TAG for routing to a route #0].

Then, during a normal state, the input directional ATM cell header high-speed converting circuit (ATC) 122a retrieves a routing table (a) for the normal state on the basis of the VPI/VCI value of the cell received from the ATM subscriber line φ3 or the ATM trunk line φ1. Then, a value put in a relevant column of the routing table (a) is written in the added routing (TAG) data.

Accordingly, when the cell having the VPI/VCI value implying a transfer to an adjacent node via the trunk line φ1 enters the relevant ATM network terminal circuit (NTC) 121, the routing (TAG) data for routing toward the line control unit (LT0) or the line control unit (LT2) is added to the relevant cell, and the data-added cell is then sent to the ATM cell switch (SW) 11.

On the other hand, if there is a necessity for detouring the cell to the backup line φ2, contents of the routing table are changed over from the normal routing table (a) to the backup routing table (b) in accordance with a content of the cell loss priority (CLP) indication as well as with an indication given from the main control unit (CTL) 14. Hence, in this case, the routing (TAG) data for routing toward the line control unit (LT1) or the line control unit (LT3) is added to the cell having the above VPI/VCI value, and the data-added cell is sent to the ATM cell switch (SW) 11. As a result, it follows that the relevant cell is transferred to the adjacent node via the backup line φ2.

Figure 13:
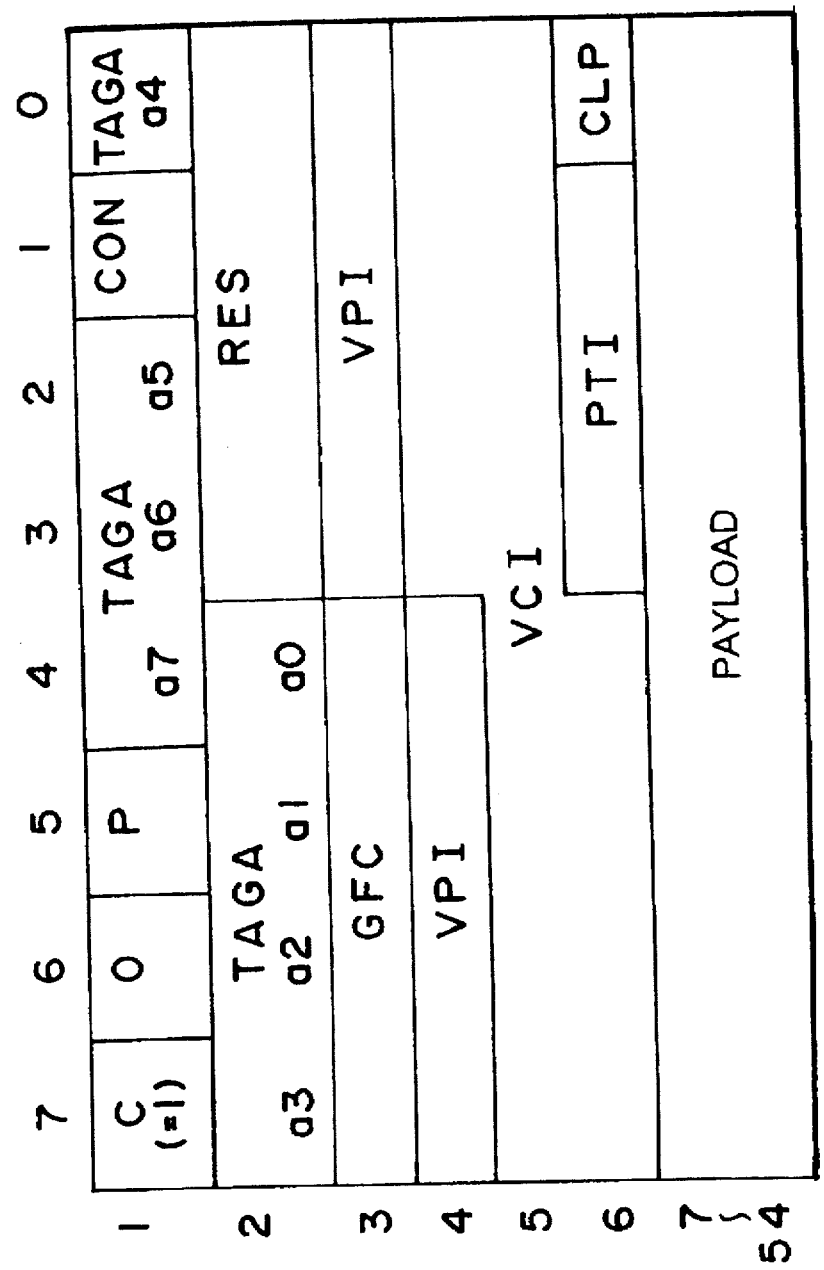
FIG. 13 is a diagram illustrating a structure of the ATM cell after being header-converted within the line control unit when in a 1-to-N connection.

FIG. 13 shows the 1-to-N connection routing (TAG) data. As illustrated in FIG. 13, the field for the routing (TAG) data has a 2-octet length.

In the routing (TAG) data, the copy indication bit (C), the intra equipment test cell indication bit (0), the priority class bit (P) and the congestion control bit (CON) have the same meanings as those in the 1-to-1 connection routing data. Hence, in this instance, the copy indication bit C is set such as C=1.

As compared with the 1-to-1 connection routing data, the intra SW routing data part (TAGA) of the routing (TAG) data in this case has totally 8 (a0–a7) bits from the fourth through sixth and eighth bits of the first octet and the first through fourth bits of the second octet. Further, in this instance, the intra line unit routing data part (TAGB) and the common unit selection bit (COM) are deleted.

The intra SW routing data part (TAGA) in this case indicates that the cell is transmitted to a route corresponding to each bit. That is, the intra SW routing data part (TAGA) is dealt with as the one in a bit map format. Accordingly, the number of selectable routes with the same number of bits is smaller than that in the case of the 1-to-1 connection, but the same cell can be transmitted to a plurality of route, respectively. This relationship will be schematically explained with reference to FIGS. 14 and 15.

Figure 14:
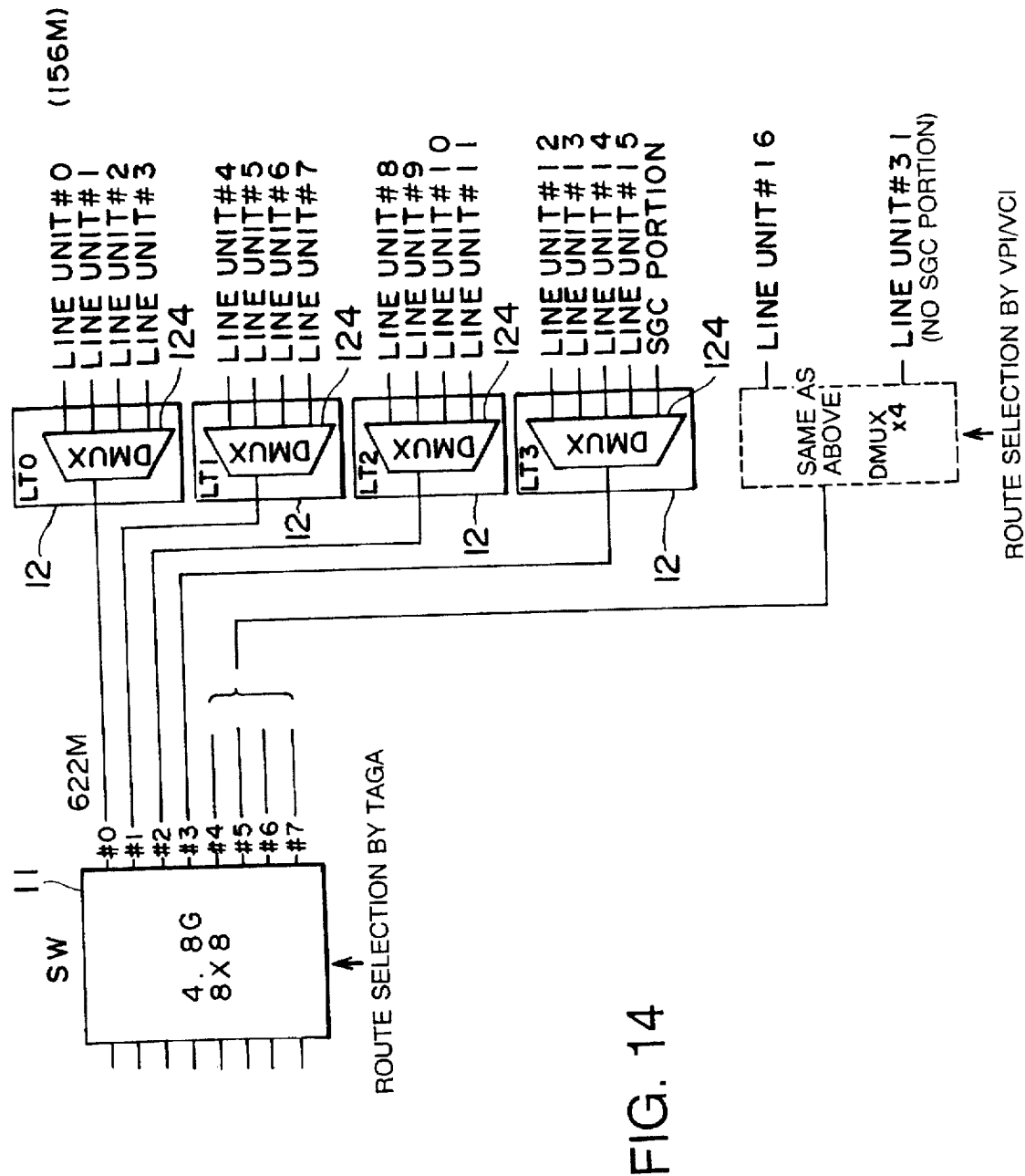
FIG. 14 is an explanatory diagram showing the routing (TAG) data when in the 1-to-N connection.

Now, it is assumed that the ATM cell switch (SW) 11, as shown in FIG. 14, has eight output ports (#0–#7) to which the respective line control units 12 are connected, and each of the line control units 12 includes the cell demultiplexer (DMUX) 124 for demultiplexing the cell coming from the line to four lines. Further, it is assumed that only the line control unit LT3 is connected also to an SCG portion.

In this case, as shown in a table of FIG. 15, corresponding relationships between 8-bit TAGA and the respective output routes (ports) are registered in the ATM cell switch (SW) 11. Then, the output route (port) corresponding to the bit set to "=1" is selected as an output route of the inputted cell. More specifically, when the bit a0 is set to "=1", the relevant cell is outputted from the port #0. Similarly, when set to a1=1, the cell is outputted from the port #1. When set to a2=1, the cell is outputted from the port #2. When set to a3=1, the cell is outputted from the port #3. When set to a4=1, the cell is outputted from the port #4. When set to a5=1, the cell is outputted from the port #5. When set to a6=1, the cell is outputted from the port #6. When set to a7=1, the cell is outputted from the port #7.

In this instance, if the plurality of bits are set to "=1", the cells are outputted from all the ports corresponding to the bits set to "=1". That is, in the interior of the ATM cell switch (SW) 11, the cells the number of which corresponds to the number of bits set to "=1" are copied and the outputted.

As described above, the 8-bit intra SW routing data part (TAGA) is dealt with as the one in the bit map format, thereby making it possible to select eight 622 Mbps output routes. When the maximum capacity is 4.8 Gbps, it is impossible to select all the accommodable lines (totally 32 lines) of 156 Mbps. Therefore, in each of the cell demultiplexer (DMUX) 124 connected to each output route, four lines are selected by identifying VPI/VCI of the cell.

That is, VPI/VCI of the cell that can be outputted per line is previously registered in each of the cell demultiplexers (DMUX) 124. Then, when the cell is outputted from the ATM cell switch (SW) 11, the cell demultiplexer (DMUX) 124 to which this cell is inputted outputs the same cell via the relevant line only when VPI/VCI of this cell is previously registered as the one which should be outputted from any line. Herein, it is assumed that VPI/VCI registerable per line is given in eight ways.

Herein, it is also assumed that the line extending from LT0 is, as in the case of the 1-to-1 connection, connected to the trunk line φ1, and the line from LT1 is connected to the backup line φ2 for the trunk line φ1. It is similarly assumed that the line extending from LT2 is connected to the trunk line φ1, and the line from LT3 is connected to the backup line φ2 for the trunk line φ1. Then, as apparent from FIG. 15, the output destination line control unit 12 can be switched from LT0 to LT1 simply by changing the setting of the intra SW routing data (TAGA) (by switching the setting such as "a0=1" and "a1=0" to "a0=0 and "a1=1"). Namely, the cell that is to be sent to the trunk line φ1 can be transmitted while being switched to the backup line. Further, if set such as "a0=1" and "a1=1", the output destination line control unit 12 can be switched to LT0 and LT1. That is, the cell that is to be sent to the trunk line φ1 can be also transmitted to the backup line φ2 in addition to the trunk line φ1.

Note that the ATM cell header high-speed converting circuit (ATC) 122a for an upward stream has a routing table as shown in FIG. 16 to perform this cell header editing. That is, the ATM cell header high-speed converting circuit (ATC) 122a for the upward stream retrieves, during the normal state, the normal-state routing table (a) on the basis of the VPI/VCI value of the cell received from the ATM subscriber line φ3 or the ATM trunk line φ1. Then, a value put in the relevant column of the routing table (a) is written to each bit of the intra SW routing (TAGA) data in the added routing (TAG) data. Note that 8-bit values in FIG. 16 are the very values set the respective bits of the intra SW routing (TAGA) data, wherein the minimum bit corresponds to a0, while the maximum bit corresponds to a7.

Accordingly, when the cell having the VPI/VCI value which implies a transfer to the adjacent node via the trunk line φ1 enter the relevant ATM network terminal circuit (NTC) 121, the routing (TAG) data for routing toward the line control unit (LT0) or the line control unit (LT2) is added to the relevant cell, and the data-added cell is sent to the ATM cell switch (SW) 11.

On the other hand, if there is a necessity for transferring the cell via the trunk line φ1 and the backup line φ2, the contents of the routing table are changed over from the normal routing table (a) to the backup routing table (b) in accordance an indication given from the main control unit (CTL) 14. Hence, in this case, the routing (TAG) data for routing toward the line control unit (LT0) or the line control unit (LT2), and the line control unit (LT1) or the line control unit (LT3) are added to the cell having the above VPI/VCI value, and the data-added cell is sent to the ATM cell switch (SW) 11. As a consequence, it follows that the relevant cell is transferred to the adjacent node via the trunk line φ1 and the backup line φ2.

[Configuration of HEC Delete Circuit (PLD)]

Referring back to FIG. 3, the HEC deletion circuit (PLD) 123b is a circuit for deleting one octet of the header error control (HEC) part from the cell having totally 55 octets with an addition of the routing (TAG) data from the ATM cell header high-speed converting circuit (ATC) 122a for the upward stream and thus providing a cell having totally 54 octets (see FIG. 8). The reason why this processing is done is that only the transfer of the cell having 54 octets or under is allowed within the ATM node 1, while there is no necessity for the header error control in the ATM node 1.

[Configuration of HEC Addition Circuit (PLD)]

Similarly, the HEC addition circuit (PLD) 123a is a circuit for calculating and adding a proper HEC value as a header error control part of one octet to the cell transmitted from the ATM cell switch (SW) 1 in a totally-54-octet status. The HEC addition circuit (PLD) 123a then transfers the cell having totally 55 octets to the ATM network terminal circuit (NTC) 121. The reason why this processing is carried out is that the header error control is required outwardly of the ATM node 1.

[Configuration of Cell Multiplexing Circuit (MUX)]

Figure 4:
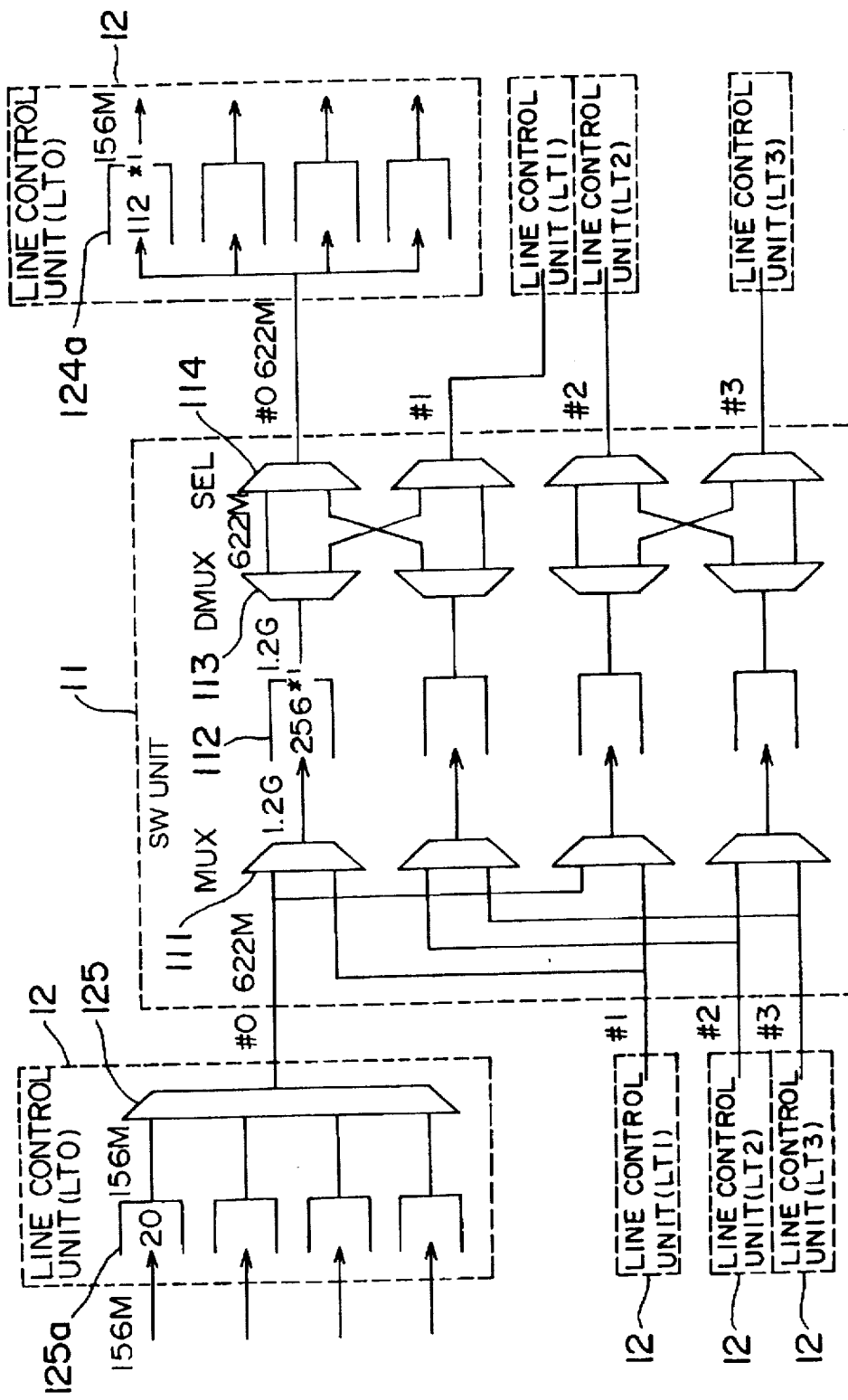
FIG. 4 is a block diagram illustrating a construction of an ATM cell switch.

The cell multiplexing circuit (MUX) 125 is a circuit for performing time-division-multiplexing of the cells respectively transferred at a speed on the order of 156 Mbps from the four HEC deletion circuits (PLD) 123b and then transferring the multiplexed cell to the ATM cell switch (SW) 11 at a speed of 622 Mbps. Note that buffers 125a, the number of which corresponds to the number of lines, for temporarily storing the inputted cells before being actually multiplexed are provided at an entrance of this cell multiplexing circuit (MUX) 125. This buffer, as shown in FIG. 4, has its capacity for 20 cells.

Further, the cell multiplexing circuit (MUX) 125 is also capable of detecting the L1 (physical layer) fault on the line as in the same way with the ATM network terminal circuit (NTC) 121. The L1 fault detectable by this cell multiplexing circuit (MUX) 125 includes, in addition to the above-mentioned, a parity error in the cell multiplexing circuit (MUX) 125. The cell multiplexing circuit (MUX) 125, when detecting an occurrence of the L1 fault, notifies the main control unit (CTL) 14 of this effect.

[Configuration of Cell Demultiplexing circuit (DMUX)]

The cell demultiplexing circuit (DMUX) 124 is a circuit for selecting the cell transferred at a speed of 622 Mbps from the ATM cell switch (SW) 11, permitting a passage thereof and then transferring the cell to the HEC addition circuit (PLD) 123a at a speed of 156 M[bps]. This cell demultiplexing circuit (DMUX) 124, when the copy indication bit (C) of the received cell is "C=0", and only when the routing (TAG) data (TAGB and COM) thereof is previously registered as the one with a self-line serving as a destination, permits the passage of this cell. Further, when the copy indication bit (C) of the received cell is "C=1", and only when VPI/VCI thereof is previously registered as the one with a self-line serving as a destination, the cell demultiplexing circuit (DMUX) 124 permits a passage of this cell. Accordingly, if the same VPI/VCI is registered in the plurality of cell demultiplexing circuits (DMUX) 124, the same cell is outputted from the plurality of cell demultiplexing circuits (DMUX) 124, and hence, as a result, the cell is copied.

Note that buffers 124a for temporarily storing the inputted cells are provided at the entrances of the individual cell demultiplexing circuits (DMUX) 124. This buffer 124a has, as shown in FIG. 4, a capacity for 112 cells.

The main control unit (CTL) 14 always monitors a usage of each buffer 124a to estimate a degree of risk causing the cell discard. This is because the usage of this buffer 124a is, when the buffer 124a is connected to a line linked to the trunk line φ1, equivalent to a usage of the trunk line φ1.

Figure 5:
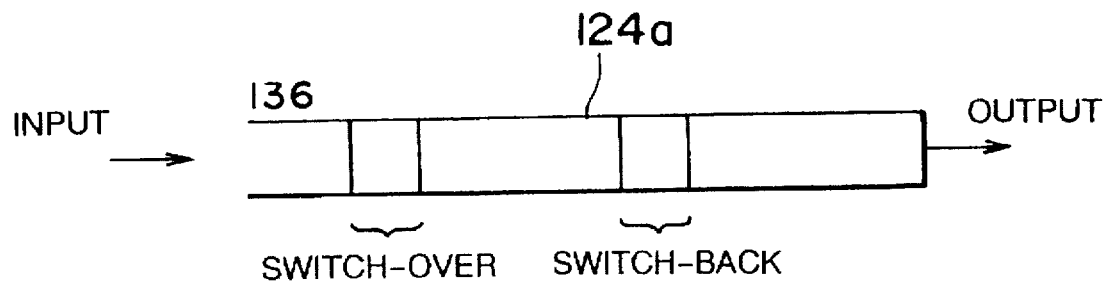
FIG. 5 is a conceptual diagram illustrating a buffer within a cell demultiplexing circuit (DMUX)

As illustrated in FIG. 5, two threshold values are given to the usage of this buffer 124a, and, when the usage reaches these threshold values, control operations different corresponding to these threshold values are conducted. That is, the threshold value for a comparatively large usage is set as [switch-over], while the threshold value for a comparatively small usage is set as [switch-back].

Then, the usage of the buffer 124a increases enough to reach this [switch-over] threshold, and, besides, this status continues for a fixed time. In this case, the contents of the above-mentioned routing table are changed over so that the cells of a low-quality class among the cells that are to be transmitted via this trunk line φ1 are transmitted via the backup line φ2. That is, with this changeover, the low-quality class connections through the trunk line φ1 are sequentially reset to the backup line φ2. The terms "high quality" and "low quality" connoted herein are determined for every connection but not items of data stored in the cell itself. A connection for control and a connection of a video signal, etc. are given by way of the high-quality class connection Further, e.g., a LAN connection, etc. may be given by way of the low-quality class connection. The reason why the connection is thus sequentially switched from the low-quality class connection is that the cell discard is inevitable when switching the connection, and hence the high-quality cell is protected from the cell discard.

On the other hand, the usage of the buffer 124a decreases enough to reach that [switch-back] threshold value, and, besides, this status continues for a fixed time. In this instance, the cell transmission via the backup line φ2 is halted, and all the connections are reset to the trunk line φ1. Thus, a hysteresis is provided by setting the [switch-over] and [switch-back] because of avoiding the occurrence of the cell discard due to frequent switching of the connection.

Further, the cell demultiplexing circuit (DMUX) 124 is, as in the same way with the ATM network terminal circuit (NTC) 121, capable of detecting the on-line L1 (physical layer) fault. The L1 fault detectable by this cell demultiplexing circuit (DMUX) 124 includes, in addition to those detected by the ATM network terminal circuit (NTC) 121, a parity error in the cell demultiplexing circuit (DMUX) 124. The cell demultiplexing circuit (DMUX) 124, when detecting the occurrence of the L1 fault, notifies the main control unit (CTL) 14 of this effect.

[Configuration of ATM Cell Switch (SW)]

The ATM cell switch (SW) 11 is constructed of, as illustrated in FIG. 4, signal paths arranged in network and a plurality of cell multiplexing circuits (MUX) 111 for integrating these signal paths. The ATM cell switch (SW) 11 is also constructed of buffers 112, each having a capacity for 256 cells, connected to an output side of each of the cell multiplexing circuits (MUX) 111, cell demultiplexing circuits (DMUX) 113 connected to outputs of the buffers 112 and selector (SEL) 114 connected to the plurality of cell demultiplexing circuits (DMUX) 113.

This cell multiplexing circuit (MUX) 111 permits or hinders the passage of the relevant cell in accordance with the routing (TAG) data of the received cell. That is, when the copy notification bit (C) of the routing (TAG) data is set to "C=0", the cell multiplexing circuit (MUX) 111 permits the passage of only the cell conforming to a condition wherein bit-combinations of the intra SW routing data (TAGA) are registered beforehand.

On the other hand, if the copy bit (C) of the routing (TAG) data is set to "C=1", the cell multiplexing circuit (MUX) 111 makes only the cell pass, wherein the previously registered bit among the bits of the intra routing data (TAGA) is set to "=1". Accordingly, when a plurality of bits are set to "=1", and, besides, when these respective bits are registered in the separate cell multiplexing circuits (MUX) 111, the relevant cells pass through the plurality of cell multiplexing circuits (MUX) 111. As a result, the cells are copied.

Then, this cell multiplexing circuit (MUX) 111, when permitting the passage of the cell, multiplexes the cells transmitted at 622 Mbps to the cell and outputs it at 1.2 Gbps.

The cell demultiplexing circuit (DMUX) 113 determines output routing of the relevant cell in accordance with the routing (TAG) data of the received cell. The cell output routing in this case is determined the same as the cell output routing in the cell multiplexing circuit (MUX) 111. Hence, if the copy notification bit (C) of the routing (TAG) data is set to "C=1", it is possible that the relevant cell is to be copied also in this cell demultiplexing circuit (DMUX) 113.

Further, the selector (SEL) 114 sends the cells transmitted from the plurality of cell demultiplexing circuits (DMUX) 113 to the respective ports in sequence.

Incidentally, FIG. 4 illustrates the configuration in which the input terminals are completely separated from the output terminals. In the actual ATM cell switch, however, each port serves as both of the input terminal and the output terminal, and hence the connections between the respective circuits become complicated. But then, the basic circuitry thereof is as shown in FIG. 4.

[Configuration of Control Signal Transmitting/Receiving Unit (CLAD)]

Referring back to FIG. 2, the control signal transmitting/receiving unit (CLAD) 13 makes the main control unit (CTL) 14 carry out maintenance operations when it receives an OAM sell from a console 17.

[Configuration of Main Control Unit (CTL)]

The main control unit (CTL) 14 exucutes the program stored in ROM 15 using the data stored in the RAM 16, thereby controls the respective line control units (LT) 12 and the control signal transmitting/receiving units (CLAD) 13 that are connected through the system bus.

Specifically, the main control unit (CTL) 14 controls initialization of each line control unit (LT) 12. The main control unit (CTL) 14 determines whether or not the line connected to each of these line control units (LT) 12 is used for managing a bandwidth based on an allocation of an average value and whether or not the contents shown in FIG. 12 are set in the routing table by setting the copy bit (C) of the routing (TAG) data to "=0", or whether or not the contents shown in FIG. 16 are set in the routing table by setting the copy bit (C) to "=1".

Further, the main control unit (CTL) 14 recognizes the occurrence of the L1 fault and a restoration thereof from notifications given from the ATM network terminal circuit (NTC) 121, the cell demultiplexing circuit (DMUX) 124 and the cell multiplexing circuit (MUX) 125 within each line control unit (LT) 12. Moreover, the main control unit (CTL) 14 always recognizes a situation of the occurrence of a hardware fault or its restoration in the respective line control units (LT) 12 as a whole on the basis of whether or not a notification about an abnormal state is given from the line control unit (LT) 12 or whether a response in communications with the line control unit (LT) 12 is made or not.

[Configuration of RAM]

This RAM 16 stores various items of data needed for the main control unit (CTL) 14 to perform the above control and various items of data obtained as a result of effecting the above control. As specific examples of these various items of data, there will be given an item of data about a method of managing the bandwidth of each line, an item of data about a format of the ATM-OAM cell and an item of data about a congested state of each line, etc.

As for the method of managing the bandwidth of each line, the data about whether or not the bandwidth management based on the allocation of the average value is conducted for every ID of the connection set for each line is registered.

For storing the data about the congested state of each line, a state-of-congestion management table as shown in FIG. 17 is prepared in the RAM 16. This state-of-congestion management table is constructed of a first table (a) and the second table (b). This first table (a) is a table in which a port number of each line corresponds to a start address of a relevant data storage area on the second table (b). Further, the second table (b) is a table in which the data about whether in the state of congestion or not is written for every VPI/VCI of the connection set at the port of the relevant line. Specifically, on the second table (b), the data about whether in the state of congestion or not is written to a position that is offset by a VPI/VCI value of the relevant connection from the start address position read from the first table (a).

<Processes Executed in Main Control Unit (CTL) 14>

There will hereinafter be summarized an initializing process and a detouring process from the trunk line φ1 to the backup line φ2 that are executed by the main control unit (CTL) 14 with respect to the ATM transit system.

Figure 18:
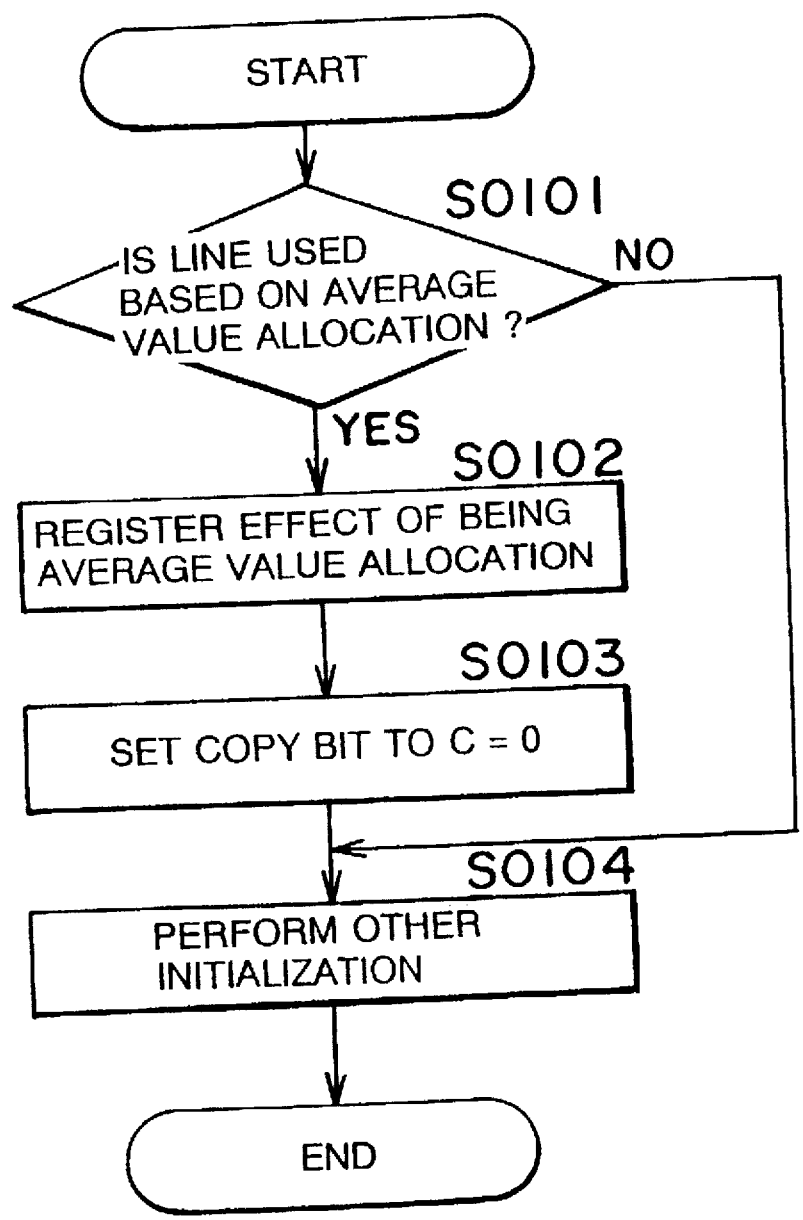
FIG. 18 is a flowchart showing a content of a initializing process.

FIG. 18 is a flowchart showing a line initializing process executed for setting a type of the management of the bandwidth and setting the copy indication bit (C).

Figure 19:
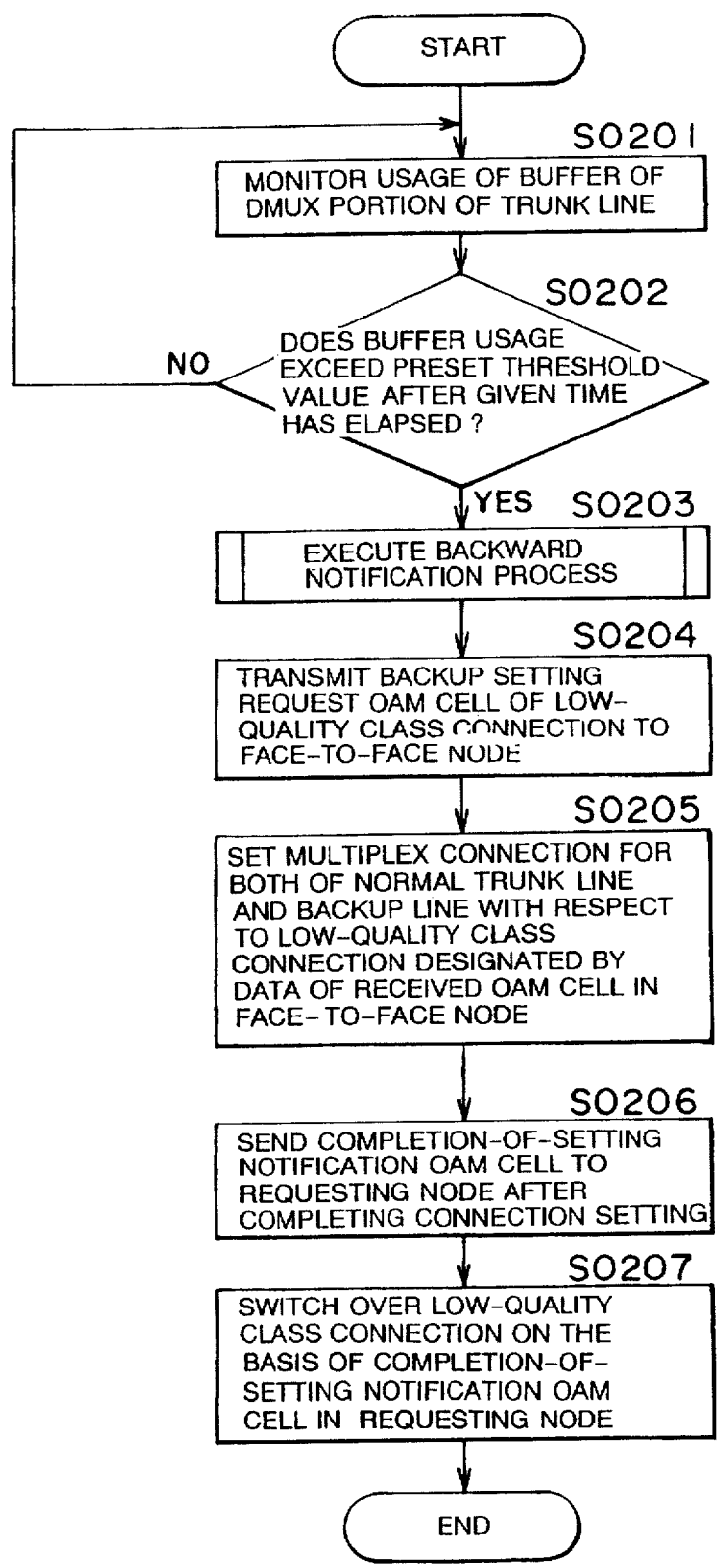
FIG. 19 is a flowchart showing a content of a connection switching process.
Figure 21:
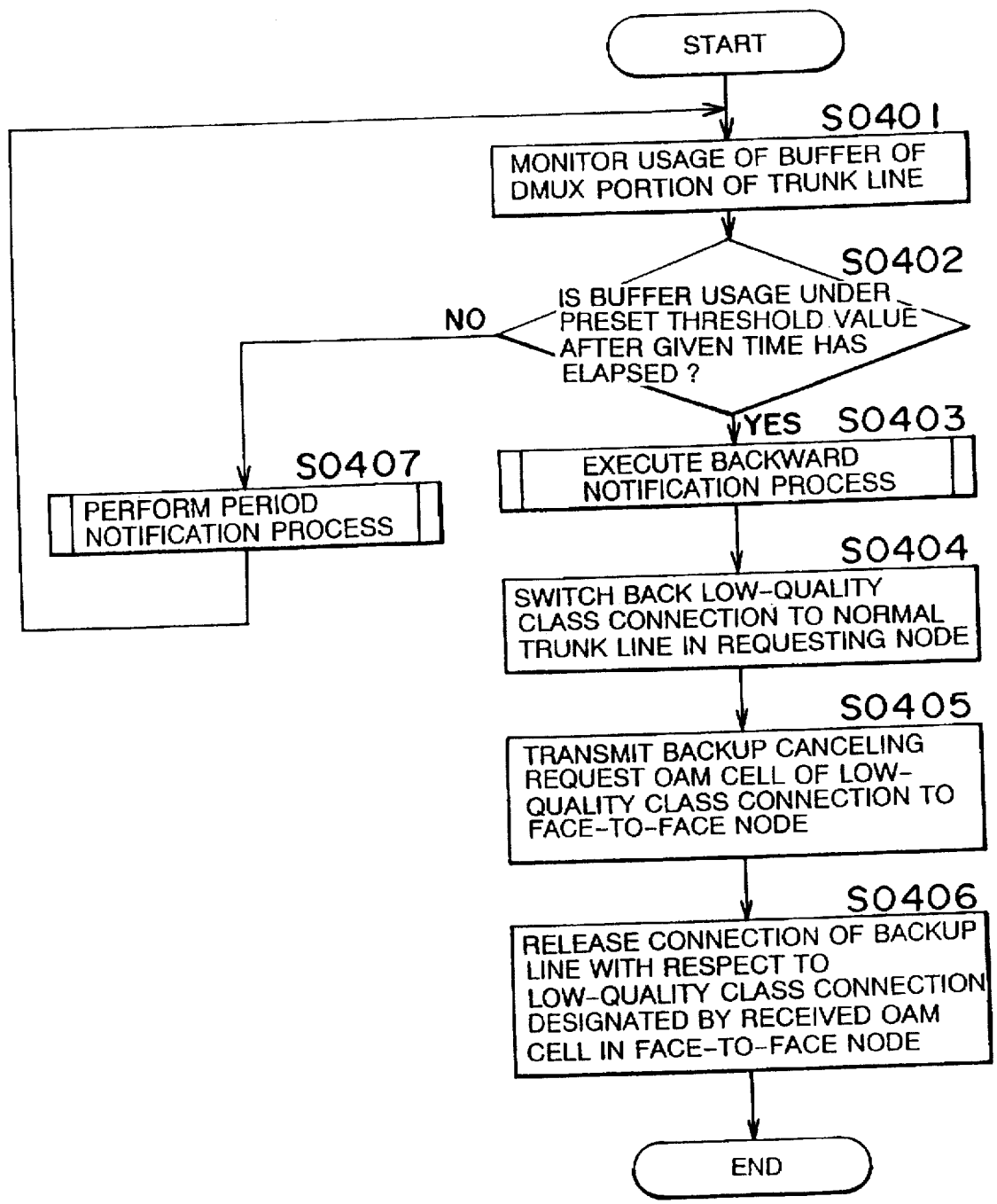
FIG. 21 is a flowchart showing a content of a connection switch-back process.

FIG. 19 is a flowchart showing a process executed for switching the connection in the main control unit (CTL) 14. Further, FIG. 21 is a flowchart showing a process executed for switching back the connection in the main control unit (CTL) 14. These two processes are executed per line with respect to all the lines connected to one of the trunk lines φ1. Then, the two processes are alternately executed by interruptions at an interval of a fixed period. Hereinafter, these flowcharts will be explained.

[Initializing Process]

The process in FIG. 18 is executed for each line. Further, this process of FIG. 18 starts when starting up the relevant node 1 or when changing the terminal or the line connected to each line control unit (LT) 12.

Then, in first step S0101, there is determined whether or not the relevant line is used for managing the bandwidth based on the allocation of the average value. On the occasion of making this determination, if the terminal connected to the relevant line is the LAN router 2, or if the trunk line connected to the relevant line is an existing low-speed line, the management of the bandwidth is conducted based on the allocation of the average value. Specifically, this determination is made by inputting from a maintenance console 17.

In the case of performing the bandwidth management based on the allocation of the average value, the RAM 16 registers the effect that the method of managing the bandwidth of the connection set to the relevant line is the allocation of the average value in step S0102. Then, the processing proceeds to step S0103. In the case of executing no bandwidth management based on the allocation of the average value in step S0101, the processing proceeds directly to step S0103.

In this step S0103, the input-directional ATM cell header high-speed converting circuit (ATC) 122a of the relevant line registers the effect that the copy indication bit (C) of the routing (TAG) data should be set to "C=0".

In next step S0104, other initializing processes are to be conducted. Specifically, for example, the setting required for the bandwidth management determined in step S0101 are carried out. Thereafter, this initializing process comes to an end.

[Process for Switching Connection]

The process in FIG. 19 starts at an interval of a fixed period after finishing the process in FIG. 18. Then, at first, there is monitored a usage of the buffer 124a of the cell demultiplexing circuit (DMUX) 124 corresponding to the line as a target for processing (step S0201).

Determined next is whether or not a fixed time or longer has elapsed while the usage of this buffer 124a remains in excess of the predetermined [switch-over] threshold value (step S0202). Then, if under the [switch-over] threshold value at the present time, and if over the [switch-over] threshold value at the present time but a time after exceeding the threshold value is shorter than the fixed time, the processing is returned to step S0201.

Figure 20:
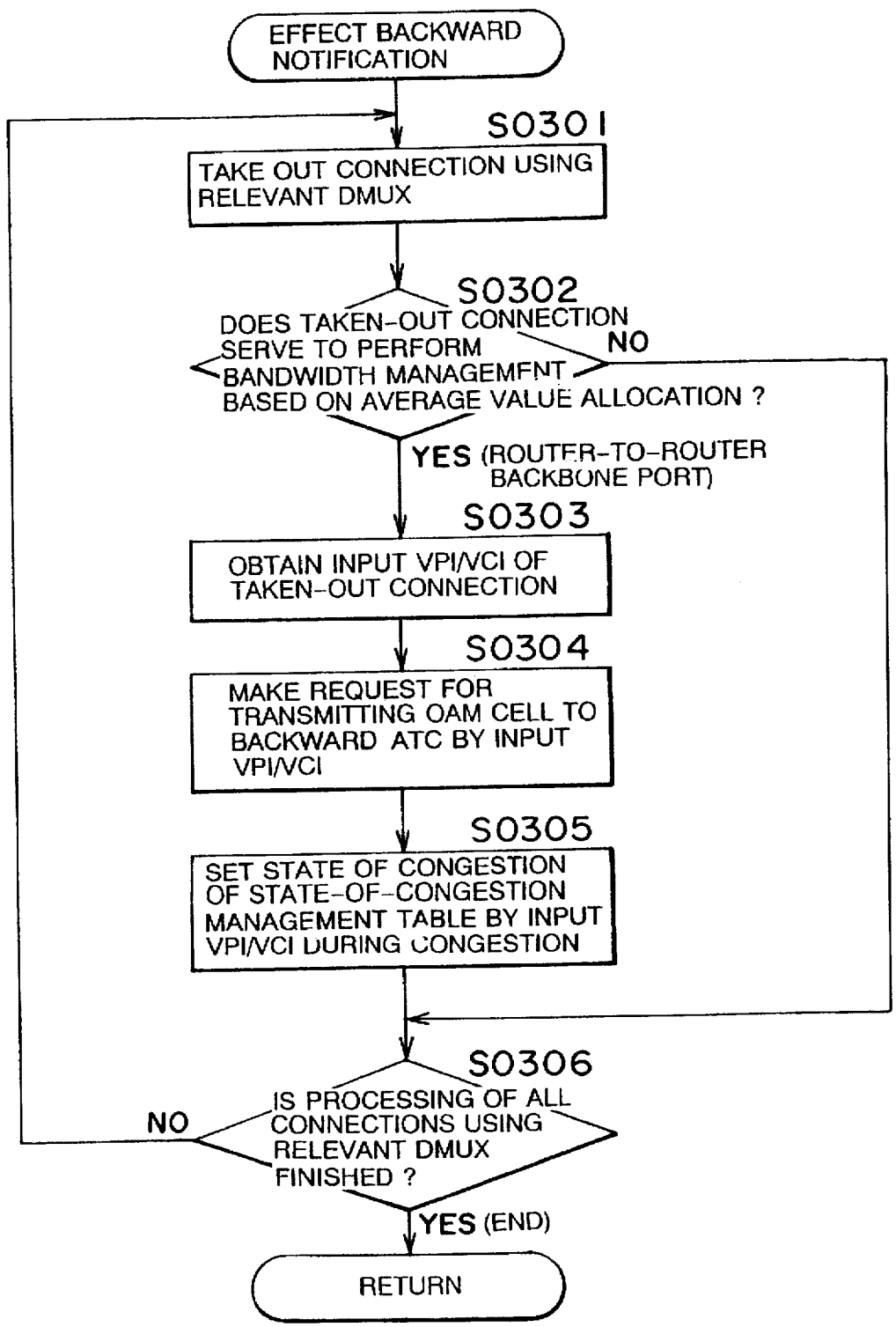
FIG. 20 is a flowchart showing a backward notification process subroutine executed in step S0203 of FIG. 19.

Whereas if over the [switch-over] threshold value at the present time but the time after exceeding the threshold value is the fixed time or longer, a backward notifying process is executed (step S0203). Note that the backward direction is a direction toward the transmitting side of the cell. FIG. 20 shows a subroutine of this backward notifying process.

In first step S0301 after entering this subroutine, one of the connections using the cell demultiplexing circuit (DMUX) 124 of the relevant line is taken out. In next step S0302, there is checked whether or not the taken-out connection is registered in the RAM 16 as the one for allocating the average value by way of the bandwidth managing method. Then, if not registered, the processing proceeds directly to step S0306.

In contrast with this, if registered as the one for allocating the average value, the processing proceeds to step S0303. In this step S0303, input VPI/VCI of the connection taken out in step S0301 is obtained.

Figure 28:
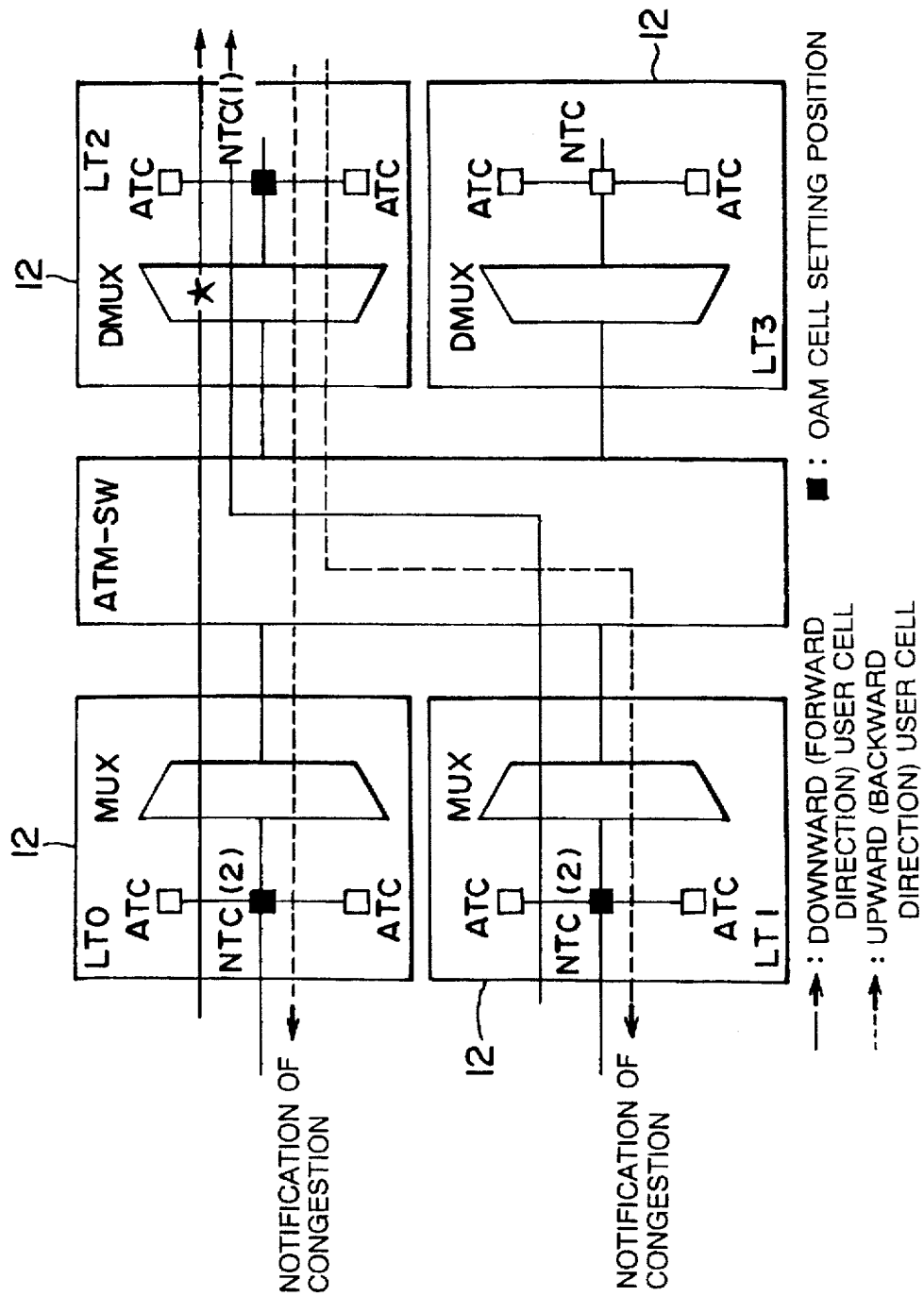
FIG. 28 is an explanatory diagram showing a backward notification.

In subsequent step S0304, sending the ATM-OAM cell for giving a notification of congestion in the backward direction is requested based on the input VPI/VCI obtained in step S0303. The RAM 16 receiving this request creates the ATM-OAM cell on the basis of the notified input VPI/VCI. Then, the request for transmitting the ATM-OAM cell is given to the ATM network terminal circuit (NTC) 121 within one of the line control units (LT) 12 in which the relevant connection is set. For example, as illustrated in FIG. 28, if it is assumed that the congestion is detected in the line control unit (LT2), the ATM-OAM cell transmission request is given to the ATM network terminal circuit (NTC ①) of this line control unit (LT2) or the ATM network terminal circuit (NTC ②) of the line control unit LT0, LT1) connected in the backward direction of the relevant connection.

The ATM network terminal circuit (NTC) receiving this transmission request outputs the ATM-OAM cell received from the RAM 16 through a connection in the backward direction that corresponds to the relevant connection. Note that the same value is to be given to VPI/VCI of the connection in the forward direction and VPI/VCI, corresponding thereto, of the connection in the backward direction. If different values are given thereto, it is enough to prepare a table in which VPI/VCIs of the connection in a face-to-face relationship are related to each other.

FIG. 27 shows procedures of outputting the ATM-OAM cell in the ATM network terminal circuit (NTC ①). Further, FIG. 25 shows procedures of outputting the ATM-OAM cell in the ATM network terminal circuit (NTC ②).

The terminal receiving the thus transmitted ATM-OAM cell is capable of knowing an occurrence of the congestion.

Accordingly, a timing of transmitting the cell can be delayed till the transmission of this ATM-OAM cell ceases.

In next step S0305, a corresponding entry of the second table (FIG. 17(b)) of the state-of-congestion management table is set in the state of Congestion on the basis of VPI/VCI obtained in step S0303. After the end of step S0305, the processing proceeds to step S0306.

Checked in step S0306 is whether or not the processes for all the connections using the cell demultiplexing circuit (DMUX) 124 of the relevant line are ended. Then, if unprocessed connections are left, the processing is returned to step S0301, and a process for the next connection is to be performed. Whereas if the processes for all the connections are completed, the subroutine of this backward notification is returned.

When the processing is returned from the backward notification subroutine, in a main routine of FIG. 19, step S0204 is next executed. In this step S0204, the ATM-OAM cell for a backup setting request of the low-quality class connection is transmitted to the face-to-face node. This ATM-OAM cell is transmitted in the following manner. That is, as illustrated in FIG. 25①, the main control unit (CTL) 14 indicates the memory (RAM) 16 to output the backup setting request ATM-OAM cell in which the VPI/VCI value of the connection reaching the face-to-face node via the trunk line as well as via the line as a target for processing is written. The memory (RAM) 16 receiving this indication generates an OAM cell conforming to the indication and transfers the OAM cell to the cell transmitter 121a within the ATM network terminal circuit (NTC) 121 connected to the relevant cell demultiplexing circuit (DMUX) 124. The cell transmitter 121a receiving this ATM-OAM cell, as in the case of the normal user cell, transmits the ATM-OAM cell in the forward direction via the line (trunk line φ1) serving as the target for processing.

Subsequent steps S0205 and S0206 are processes on the side of the face-to-face node. The following is the process in step S0205. The ATM-OAM cell is received by the cell receiver 121b of the face-to-face node and transferred to the memory (RAM) 16. The main control unit (CTL) 14 of the face-to-face node is notified of contents of the ATM-OAM cell, and thereafter its contents are executed (see FIG. 26①). Then, the main control unit (CTL) 14 of the face-to-face node sets multiplex connections both to the normal trunk line φ1 and to the backup line with respect to the low-quality class connection in accordance with the data of the received ATM-OAM cell (step S0205). That is, during the normal state, the routing table for transferring the received cell is set in the input-directional ATM cell header high-speed converting circuit (ATC) 122a connected to the trunk line φ1 in the face-to-face node. The routing table is not, however, set in the input-directional ATM cell header high-speed converting circuit (ATC) 122a connected to the backup line φ2. Then, for setting the multiplex connections defined such as 1:N=1:2, the routing table having the same contents as those of the routing table set in the ATM cell header high-speed converting circuit (ATC) 122a connected to the trunk line φ1 is set also in the input-directional ATM cell header high-speed converting circuit (ATC) 122a connected to the backup line φ2.

Subsequently, after completing the above setting of the connection, a completion-of-setting notification ATM-OAM cell is sent back to the requesting node (step S0206). This ATM-OAM cell is transmitted in the following way. That is, as illustrated in FIG. 26②, the main control unit (CTL) 14 indicates the memory (RAM) 16 to output the completion-of-setting notification OAM cell in which the VPI/VCI value of the backward-directional connection reaching the requesting node via the trunk line as the target for processing is written. The memory (RAM) 16 receiving this indication generates an ATM-OAM cell conforming to the indication and transfers the cell to the cell transmitter 121a within the ATM network terminal circuit (NTC) 121 connected to the trunk line φ1 as the target for processing. The cell transmitter 121a receiving this ATM-OAM cell transmits the ATM-OAM cell toward the trunk line φ1. Hereupon, this ATM-OAM cell is transferred to the requesting node 1 via the trunk line φ1 as the target for processing.

In the requesting node 1 receiving this completion-of-setting notification OAM cell, the relevant low-quality class connection is switched based on this completion-of-setting notification OAM cell (step S0207). That is, with respect to the low-quality class connection among the connections passing through the trunk line φ1 as the target for processing, all the line interfaces 12 are indicated to apply the routing table (see FIG. 12(b)) having a content of being via the backup line φ2 in place of the normal routing table (see FIG. 12(a)). After the processes described above, the process for switching the connection comes to an end.

[Process for Switching Back Connection]

A process of FIG. 21 starts after a fixed time has elapsed since the process of the FIG. 19 was started. Then, at first, there is monitored a usage of the buffer 124a of the cell demultiplexing circuit (DMUX) 124 corresponding to the line as the target for processing (step S0401).

Figure 22:
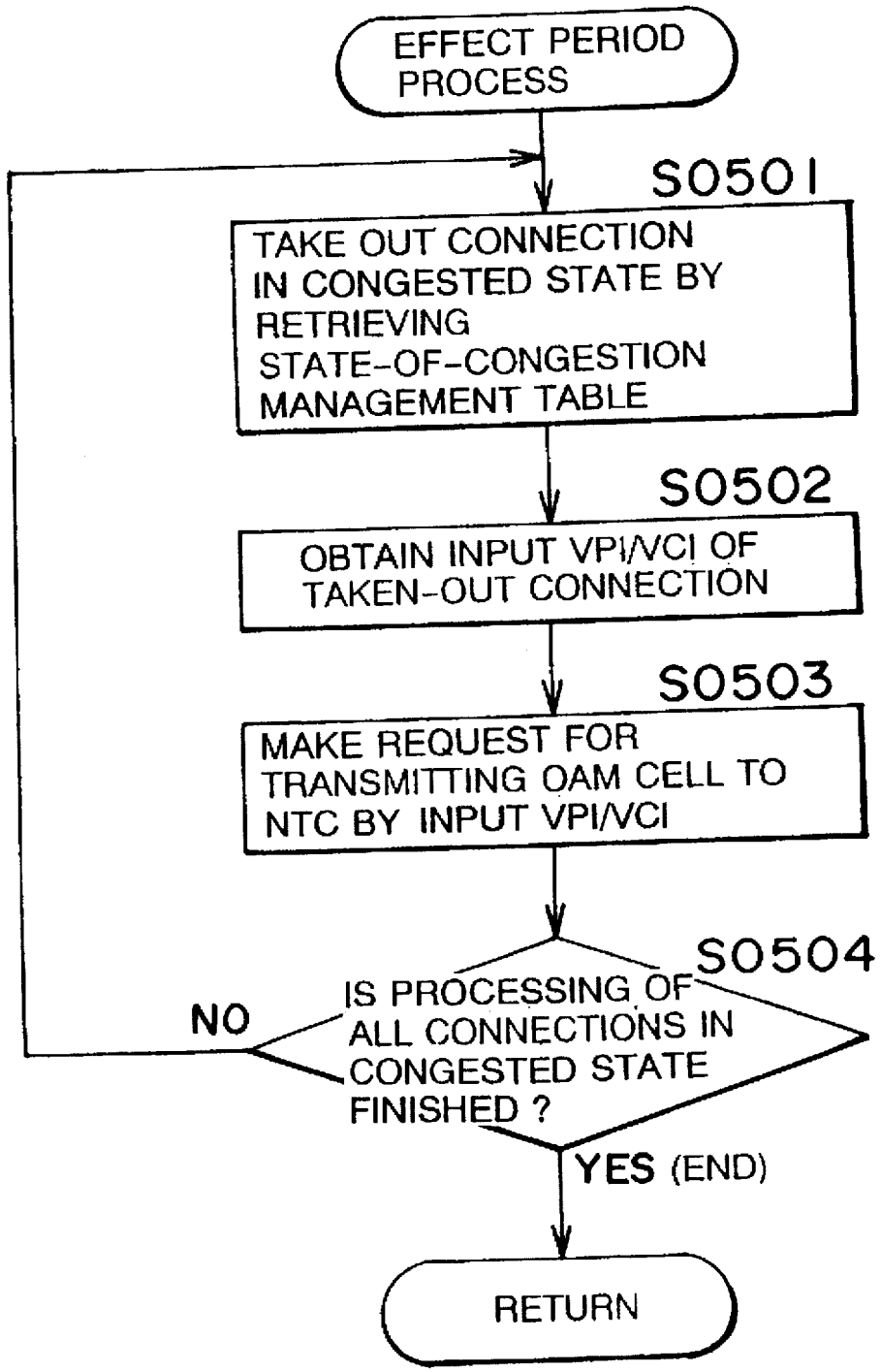
FIG. 22 is a flowchart showing a period notification process executed in step S0407 of FIG. 21.

Checked next is whether or not the fixed time has elapsed while the usage of the buffer 124a remains under the predetermined [switch-back] threshold value (step S0402). Then, if above the [switch-back] threshold value at the present time, and if under the [switch-back] threshold value at the present time but a time after being thereunder is shorter than the fixed time, this implies that the status of congestion still continues. Therefore, a period notifying process of step S0407 is executed. FIG. 22 shows a subroutine of the period notifying process executed in step S0407.

In first step S0501 after entering this subroutine, the state-of-congestion management table in the RAM 16 is retrieved, thereby taking out one of the connections in the state of congestion. In next step S0502, input VPI/VCI of the connection taken out is obtained. In subsequent step S0503, the backward-directional transmission of the ATM-OAM cell for notifying the congestion is requested based on the input VPI/VCI obtained in step S0502. This request has the same content of the process of step S0304 in FIG. 20. Accordingly, it follows that the congestion notifying ATM-OAM cell is transmitted to the terminal till the state of congestion is canceled.

Checked in next step S0504 is whether the processes for all the connections in which the state of congestion is set in the state-of-congestion management table are ended or not. Then, if unprocessed connections are left, the processing Goes back to step S0501, and a process for the next connection is conducted. Whereas if the processes for all the connections are completed, the subroutine of this period notifying process is returned. When the processing is returned from this subroutine, the processing is returned to step S0401 in the main routine of FIG. 21.

Figure 23:
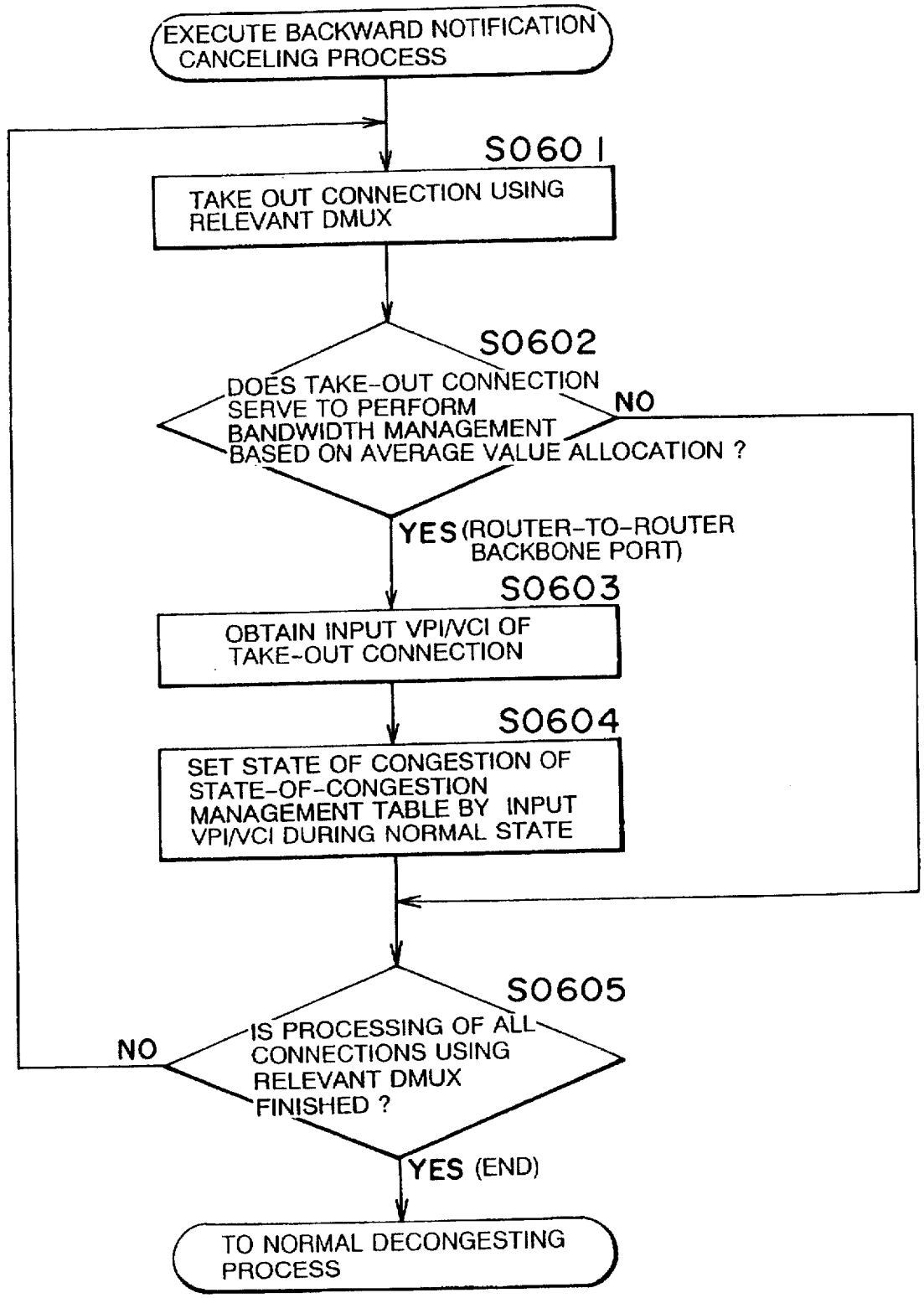
FIG. 23 is a flowchart showing a backward notification canceling process subroutine executed in step S0403 of FIG. 21.

On the other hand, in step S0402, if the usage of the buffer is, it is determined, under the [switch-over] threshold value at the present time but the time after being thereunder is the fixed time or above, the processing proceeds to step S0403. In this step S0403, a subroutine of a backward notification canceling process shown in FIG. 23 is to be executed.

In first step S0601 after entering the subroutine of this backward notification canceling process, one of the connections using the cell demultiplexing circuit (DMUX) 124 of the relevant line is taken out. Checked in next step S0602 is whether or not the taken-out connection is registered in the RAM 16 as the one for allocating the average value by way of the bandwidth managing method. Then, if not registered, the process proceeds directly to step S0605.

Whereas if registered as the one for allocating the average value, the processing goes to step S0603. In this step S0603, input VPI/VCI of the connection taken out in step S0601 is obtained.

In next step S0604, a corresponding entry of the second table of the state-of-congestion management table is set in the normal status on the basis of VPI/VCI obtained in step S0603. Accordingly, the transmission of the ATM-OAM cell for giving information on the state of congestion is halted. The terminal is therefore capable of transmitting the cell as usual. After finishing this step S0604, the processing moves to step S0605.

Checked in step S0605 is whether or not the processes for all the connections using the cell demultiplexing circuit (DMUX) 124 of the relevant line come to an end. Then, if the unprocessed connections are left, the processing returns to step S0601, wherein a process for the next connection is to be performed. On the other hand, if the processes for all the connections are completed, the subroutine of this backward notification canceling process is returned.

When the processing is returned from the subroutine of the backward notification canceling process, the process of step S0404 is executed in the main routine of FIG. 21. In this step S0404, the low-quality class connection switched in step S0207 is switched back to the normal trunk line $\phi1$. That is, with respect to all the connections passing through the trunk line $\phi1$ as the target for processing, all the line interfaces 12 are indicated to apply the normal routing table (see FIG. 12(a)).

Subsequently, the ATM-OAM cell for requesting a backup cancellation of the low-quality class connection is transmitted to the face-to-face node (step S0405).

Subsequent step S0406 provides a process for the face-to-face node. That is, the main control unit (CTL) 14 of the face-to-face node cancels the connection of the backup line $\phi2$ with respect to the designated low-quality class connection in accordance with the data of the received ATM-OAM cell (step S0406). That is, there is deleted the routing table set to the input-directional ATM header high-speed converting circuit (ATC) 122a connected to the backup line $\phi2$. After the above processing, the process for switching back the connection is ended.

<Operation of Embodiment>

In accordance with this embodiment having the construction discussed above, when transferred from the first ATM node 1a to the second ATM node 1b while a plurality of connections use the specified trunk line $\phi1$ in common, and if a quantity of the cells relative to the respective connections increases, the usage of this trunk line $\phi1$ augments. The usage of this trunk line $\phi1$ can known by monitoring the usage of the buffer 124a within the cell demultiplexing circuit (DMUX) 124 connected to the ATM network terminal circuit (NTC) in the line control unit (LT0) 12a connected to the trunk line $\phi1$ on the side of the first ATM node 1a.

Then, if this usage reaches the [switch-over] threshold value, and if a fixed time has elapsed, the connections are switched in sequence from the low-quality class connection to the backup line. More specifically, each time the usage of the trunk line $\phi1$ increases, the low-quality class connection is sequentially selected and switched to the backup line $\phi2$ so as not to exceed that [switch-over] threshold value. Further, even after some connections have been switched to the backup line $\phi2$, and if the usage of the buffer 124a still exceeds the [switchover] threshold value, the connections are further switched to the backup line $\phi2$. Accordingly, there is no possibility in principle, wherein the usage of the trunk line $\phi1$ increases over that. Hence, it is possible to prevent the cell discard due to an excess over the capacity of the trunk line $\phi1$.

By the way, the connection that has been once switched to the backup line $\phi2$ will not be immediately switched back to the trunk line $\phi1$ even when the usage of the trunk line $\phi1$ decreases under the [witch-over] threshold value. A requirement for switch-back to the trunk line $\phi1$ is that the usage of the trunk line $\phi1$ decreases under the [switch-back] threshold value smaller than the [switch-over] threshold value. Accordingly, there is eliminated such a situation that [switch-over] and [switch-back] frequently happen, and there is reduced a possibility in which the cell discard peculiar thereto is caused.

On the other hand, when determining that the usage of the buffer 124a exceeds the [switch-over] threshold value, the transmitting terminal (for managing the bandwidth based on the allocation of the average value) of the connection set to this trunk line $\phi1$ is informed of the occurrence of congestion. Accordingly, this transmitting terminal is capable of delaying a timing of transmitting the cell till decongestion is effected. Therefore, the bandwidth management based on the allocation of the average value is effectively conducted, thereby making it possible to prevent the cell discard.

<Embodiment 2>

A difference of an embodiment 2 according to the present invention from the first embodiment is that the notification in the backward direction, i.e., the notification to the transmitting terminal previously registered as the one for carrying out the bandwidth managing method based on the allocation of the average value is made not by using the ATM-OAM cell but by writing a payload type identifier (PTI) of the user cell transmitted through the connection in the backward direction. That is, the configurations of the respective units of the ATM node 1 and the contents of the control exclusive of the above-mentioned are the same as those in the first embodiment. Accordingly, the explanations thereof will be omitted herein, but only the portion having a different content of the control will be discussed.

<Process Executed in Main Control Unit (CTL) 14>

[Backward Notifying Process]

Figure 29:
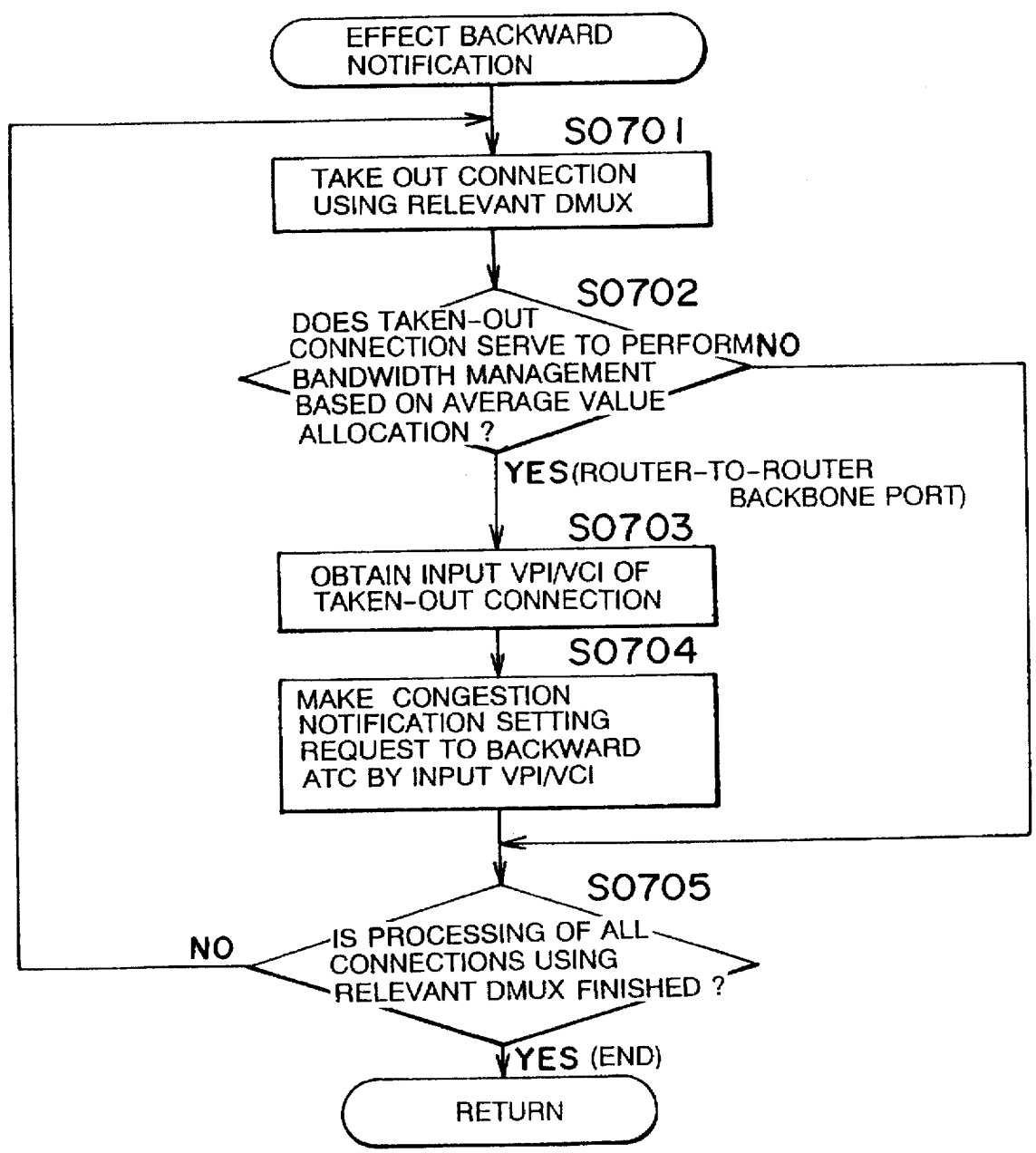
FIG. 29 is a flowchart showing a backward notification process subroutine executed in step S0203 of FIG. 19.

FIG. 29 shows a subroutine of the backward notifying process executed in step S0203 of FIG. 19 instead of FIG. 20 in accordance with the second embodiment.

In first step S0701 after entering this subroutine, one of the connections using the cell demultiplexing circuits (DMUX) 124 of the relevant line is taken out. Checked in next step S0702 is whether or not the taken-out connection is registered in the RAM 16 as the one for performing the bandwidth management based on the average value. Then, if not registered, the processing proceeds directly to step S0705.

Whereas if registered as the one for performing the bandwidth management based on the allocation of the average value, the processing proceeds to step S0703. In this step S0703, input VPI/VCI of the connection taken out in step S0701 is obtained.

Figure 31:
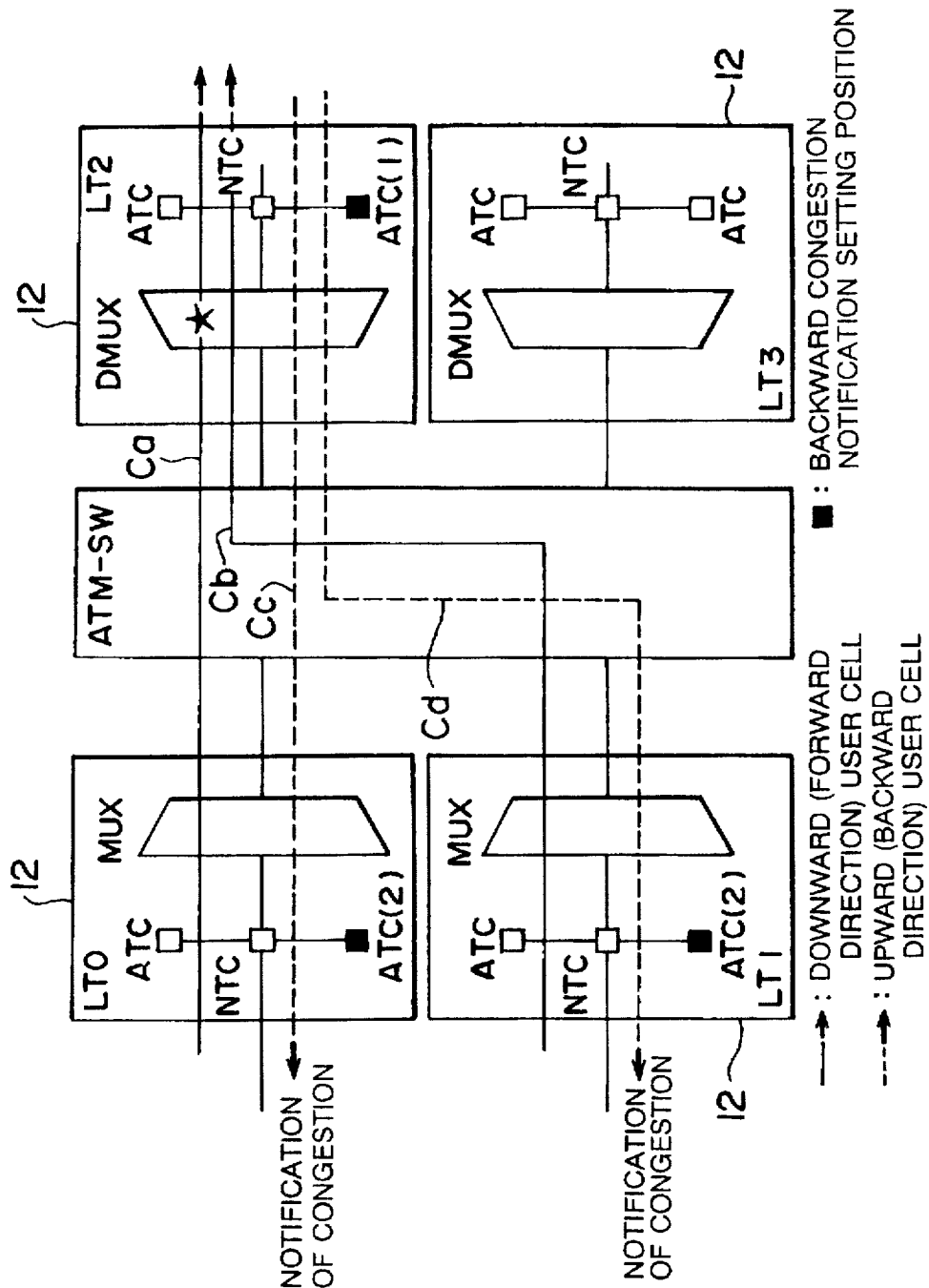
FIG. 31 is an explanatory diagram showing a backward notification in the second embodiment of the present invention.

In subsequent step S0704, a congestion notification setting request in the backward direction is made based on input VPI/VCI obtained in step S0703. This congestion notification setting request is given to the ATM cell header high-speed converting circuit (ATC) 122 within one line control unit (LT) 12 in which the relevant connection is set. For example, as illustrated in FIG. 31, if the congestion is detected in the line control unit (LT2), the congestion notification setting request is given to the input-directional ATM cell header high-speed converting circuit (ATC①) 122a of this line control unit (LT2) or the output-directional ATM cell header high-speed converting circuit (ATC②) 122b of the line control unit (LT0, LT1) connected in the backward direction of the relevant connection.

The ATM cell header high-speed converting circuit (ATC) 122 receiving this congestion notification setting request registers the effect that an item of congestion notification data is to be written in the cell type identifier (PTI) of the user cell having notified VPI/VCI (in case the same VPI/VCI is given to the connections in the up-and-down directions). Accordingly, hereinafter, when the user cell having VPI/VCI passes through the relevant ATM cell header high-speed converting circuit (ATC) 122, the relevant ATM cell header high-speed converting circuit (ATC) 122 writes the congestion notification data to the cell type identifiers (PTI) of all the user cells.

The terminal receiving the user cell to which the congestion notification data is thus written is capable of knowing the occurrence of the congestion. Hence, the timing of transmitting the cell can be delayed till writing the congestion notification data to within the received user cell ceases.

Checked in next step S0705 is whether or not the processes for all the connections using the cell demultiplexing circuit (DMUX) 124 of the relevant line are finished. Then, if the unprocessed connections are left, the processing returns to step S0701, and a process for the next connection will be effected. Whereas if the processes for all the connections are completed, this backward notification subroutine is returned.

In the main routine of FIG. 19 to which the processing is returned from that subroutine, the processes are to be executed in the same way as discussed in the first embodiment.

[Backward Notification Canceling Process]

Figure 30:
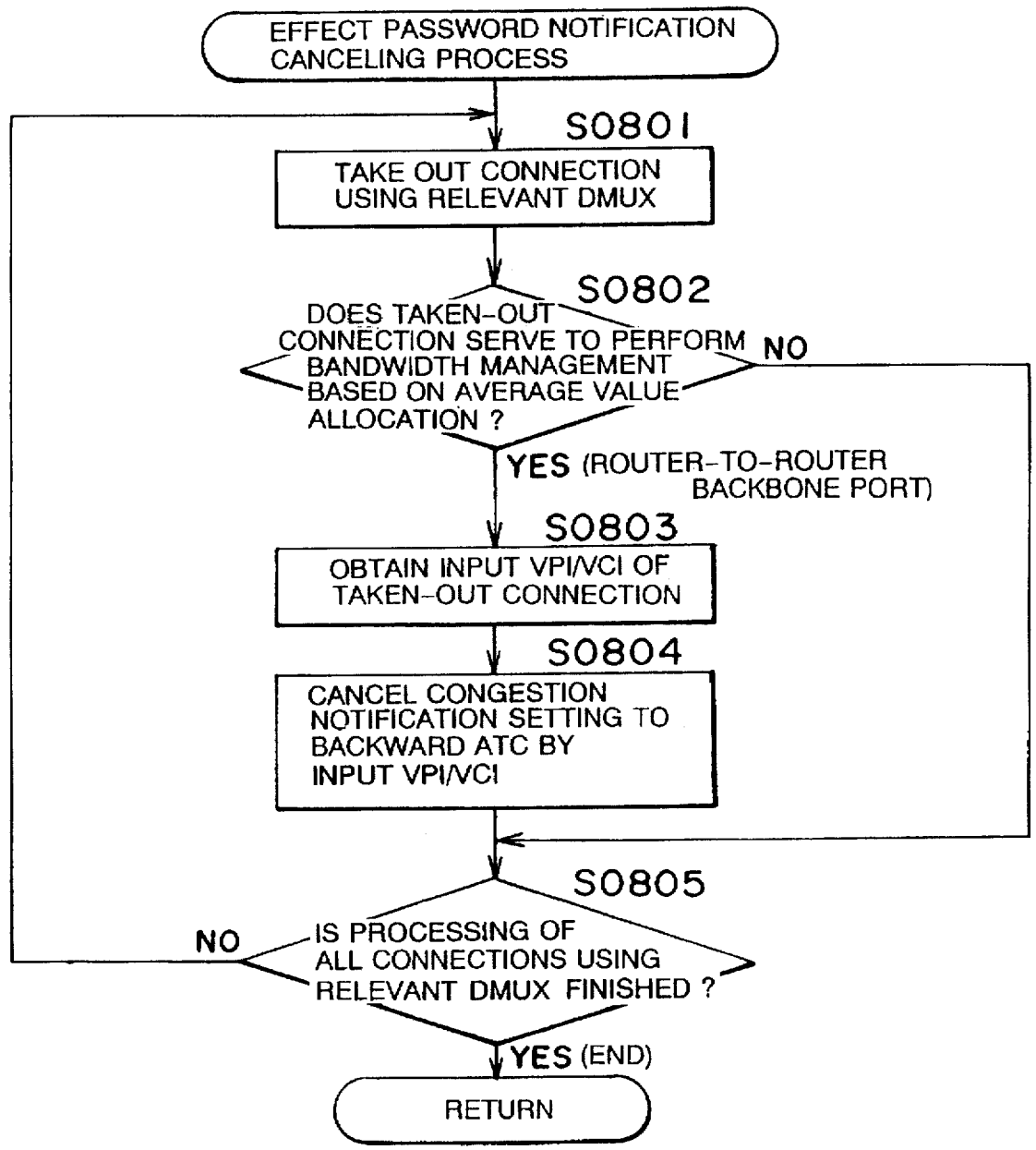
FIG. 30 is a flowchart showing a backward notification canceling process subroutine executed in step S0403 of FIG. 21 in a second embodiment of the present invention.

FIG. 30 shows a subroutine of a backward notification canceling process executed in step S0403 of FIG. 21 instead of FIG. 23 in accordance with the second embodiment. Note that the system jumps the period notifying process of step S0407 in the process of FIG. 21 executed in the second embodiment.

In first step S0801 after entering the subroutine of the backward notification canceling process of FIG. 30, one of the connection using the cell demultiplexing circuit (DMUX) 124 of the relevant line is taken out. Checked in next step S0802 is whether or not the taken-out connection is registered in the RAM 16 as the one for allocating the average value by way of the bandwidth managing method. Then, if not registered, the processing proceeds directly to step S0805.

Whereas if registered as the one for allocating the average value, the processing proceeds to step S0803. In this step S0803, input VPI/VCI of the connection taken out in step S0801 is obtained.

In next step S0804, a setting cancellation request for notifying the congestion in the backward direction is made based on VPI/VCI obtained in step S0803. This congestion notification setting cancellation request is given to the ATM cell header high-speed converting circuit (ATC) 122 within the line control unit (LT) 12 wherein the congestion notification setting request of step S0704 was made. In an example of FIG. 31, the congestion notification setting cancellation request is given to the input-directional ATM cell header high-speed converting circuit (ATC①) 122a of the line control unit (LT2) wherein the congestion is detected or the output-directional ATM cell header high-speed converting circuit (ATC②) 122b of the line control unit (LT0, LT1) connected in the backward direction of the connection set to this line control unit (LT2).

The ATM cell header high-speed converting circuit (ATC) 122 receiving this congestion notification setting cancellation request registers the effect of halting the writing of the congestion notification data to the cell type identifier (PTI) of the user cell having notified VPI/VCI (in case the same VPI/VCI is given to the connections in the up-and-down directions). Accordingly, hereinafter, even when the user cell having VPI/VCI passes through the relevant ATM cell header high-speed converting circuit (ATC) 122, the relevant ATM cell header high-speed converting circuit (ATC) 122 does not write the congestion notification data to the cell type identifier (PTI) of these user cells. Hence, thereafter, writing the congestion notification data to the user cell transferred through the relevant connection is halted. The terminal is therefore capable of transmitting the cell as usual. After the end of this step S0804, the processing proceeds to step S0805.

Checked in step S0805 is whether or not the processes for all the connections using the cell demultiplexing circuit (DMUX) 124 of the relevant line are ended. Then, if unprocessed connections are left, the processing goes back to step S0801, and a process for the next connection is executed. Whereas if the processes for all the connections are completed, the subroutine of this backward notification canceling process is returned.

In the main routine of FIG. 21 to which the processing is returned from that subroutine, the processes are executed in the same way as discussed in the embodiment 1.

<Operation of the Embodiment>

The second embodiment having the construction discussed above is capable of exhibiting all the operations demonstrated in the first embodiment. Further, in the second embodiment, the notification of the congestion is effected by use of the user cell in the backward direction, and, hence, there is no necessity for generating and outputting the ATM-OAM cell only for the notification of the congestion. Accordingly, the above-described ATM-OAM cell eliminates the possibility of further worsening the state of congestion on the line in the backward direction.

<Embodiment 3>

As compared with the first embodiment discussed above, a third embodiment of the present invention has such a characteristic that when the L1 fault is detected by the ATM network terminal circuit (NTC) 121 and the cell demultiplexing circuit (DMUX) 124 or the cell multiplexing circuit (MUX) 125 in each line control unit 2 of each ATM node 1, and when the hardware fault of the above line control unit (LT) 2 is detected, all the connections set to the NNI trunk line φ1 through the relevant line control unit (LT) 2 are detoured to the backup line φ2.

The third embodiment of the present invention has everything in the first embodiment in terms of the constructions of B-ISDN and of the respective ATM nodes 1. Hence, the explanations thereof will be omitted herein. In accordance with the third embodiment, however, executing the above control involves the initialization different from that in the first embodiment. Processes different from those executed in the first embodiment will be added and then executed. These processes will hereinafter be described.

\<Initialization\>

Figure 32:
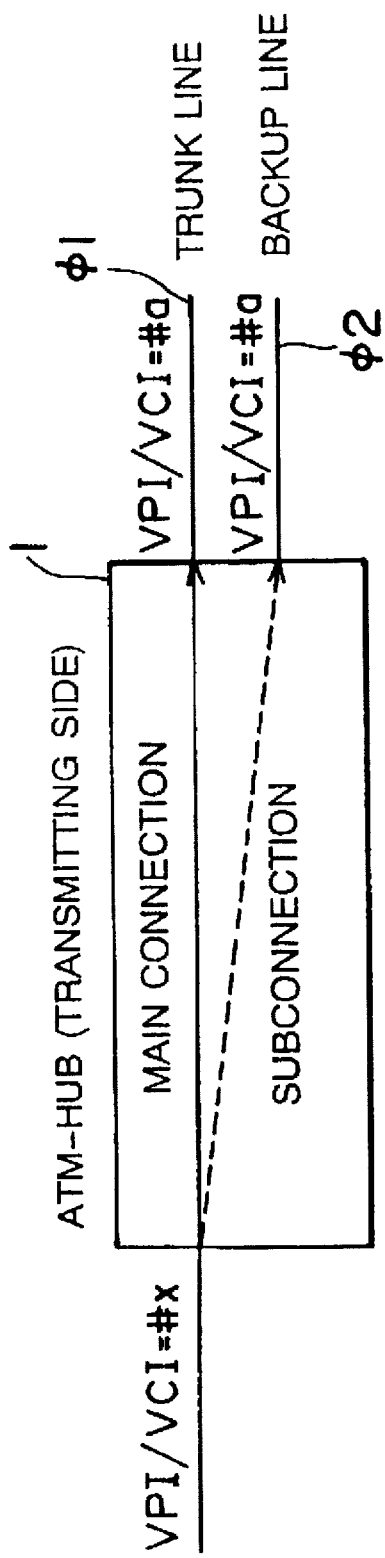
FIG. 32 is a diagram showing how a connection branches off within the ATM node on the transmitting side in a third embodiment of the present invention.

FIG. 32 schematically illustrates a status of the connection which is to be initialized in the first ATM node 1a on the transmission side. As obvious from FIG. 32, the connection for transferring a cell including VPI/VCI that is set to "=#x" works to rewrite VPI/VCI of the relevant cell to "=#a" and then transmit it to the trunk line φ1. This connection is defined as a main connection performing a function of transferring the cell during the normal state.

On the other hand, this main connection branches off in the ATM node 1. That is, the branched connection rewrites VPI/VCI of the received cell from "=#x" to "=#a" and transmits it to the backup line φ2. This branched connection is defined as a subconnection performing a function of transferring the cell when detouring the cell.

This branch-off of the connection entails causing all the line control units 1, in which the connection for transferring the cell to the trunk line φ1 is set, to register the effect that the copy indication bit (C) of the cell belonging to the relevant connection (i.e., the cell to which VPI/VCI having a content of being via the trunk line φ1 is written) is set such as C=1 within the first ATM node 1a from which the cell is transferred.

Figures 16A, 16B:
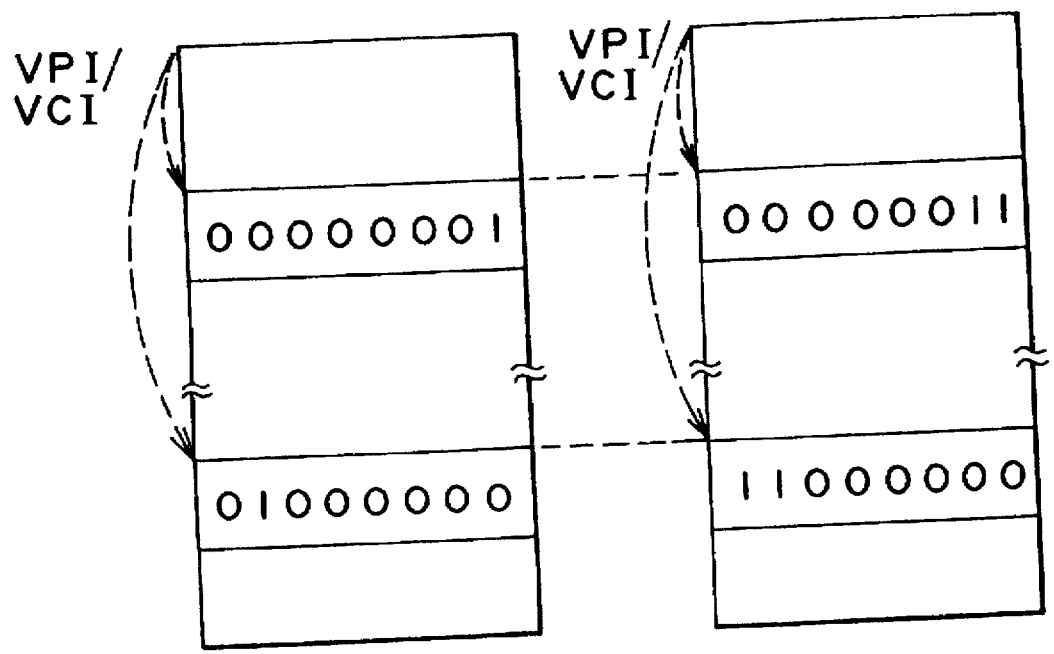
FIG. 16 is an explanatory diagram showing a routing table when in the 1-to-N connection.

As discussed above, for the cell in which the copy indication bit is set to C=1, the input-directional ATM cell header high-speed converting circuit (ATC) 122a is prepared with the routing table having the contents shown in FIG. 16 instead of the routing table of FIG. 12. In this case, the connection has to branch off, and, therefore, a content of giving an indication of being outputted from the plurality of lines as shown in FIG. 16(b) is set in the relevant routing table from the time of initialization. Specifically, the content that the input cell is copied and outputted from the trunk line φ1 and the backup line φ2 is set i the routing table.

Accordingly, with respect to the routing (TAG) data added to the relevant cell by the relevant input-directional ATM cell header high-speed converting circuit (ATC) 122a, the copy indication bit (C) thereof is set to "C=1", and the intra switch routing bit (TAGA) thereof is set in the content of being outputted to the trunk line φ1 and the backup line φ2. As a result, the cells inputted from the input lines are, as stated above, copied in the cell demultiplexing circuit (DMUX) 124 within the line control unit 12 connected to the trunk line φ1 or within the ATM cell switch (SW) 11 and respectively outputted via the trunk line φ1 and the backup line φ2.

On the other hand, in the second ATM node 1b to which the cell is transferred, the contents of the routing table are set in only the input-directional ATM cell header high-speed converting circuit (ATC) 122a within the line control unit 12 on the main connection. Columns for the contents of the routing table are blank in the input-directional ATM cell header high-speed converting circuit (ATC) 122a within the line control unit 12 on the subconnection. Hence, as shown in FIG. 33(a), in the normal state, it follows that only the cells belonging to the main connection are further transferred within the second ATM node 1b and outputted from the output lines, while the cells belonging to the subconnection are abandoned without being transferred.

Note that if the cells through the relevant main connection are further transferred from the second ATM node 1b to other ATM node 1, in the input-directional ATM cell header high-speed converting circuit (ATC) 122a within the line control unit 12 connected to the trunk line φ1, the copy indication bit is set to "C=1", and the routing table of FIG. 16 is prepared. However, if transferred to the terminal under the second ATM node 1b, it follows that the copy indication bit is set to "C=0", and the routing table of FIG. 12 is prepared.

\<Content of Control in Main Control Unit (CTL)\>

Given hereinafter is a specific explanation of a content of control executed for detouring by use of the backup line φ2 when detecting the L1 fault or the hardware fault of the line control unit 12. Note that the processes for controlling the congestion in the first embodiment, i.e., the processes of FIGS. 19 through 23 are also executed in parallel to the process for detouring. With respect to the contents thereof, however, any modifications are not required to be added to those in the first embodiment, and hence the explanation thereof will be omitted.

[Initializing Process]

Figure 36:
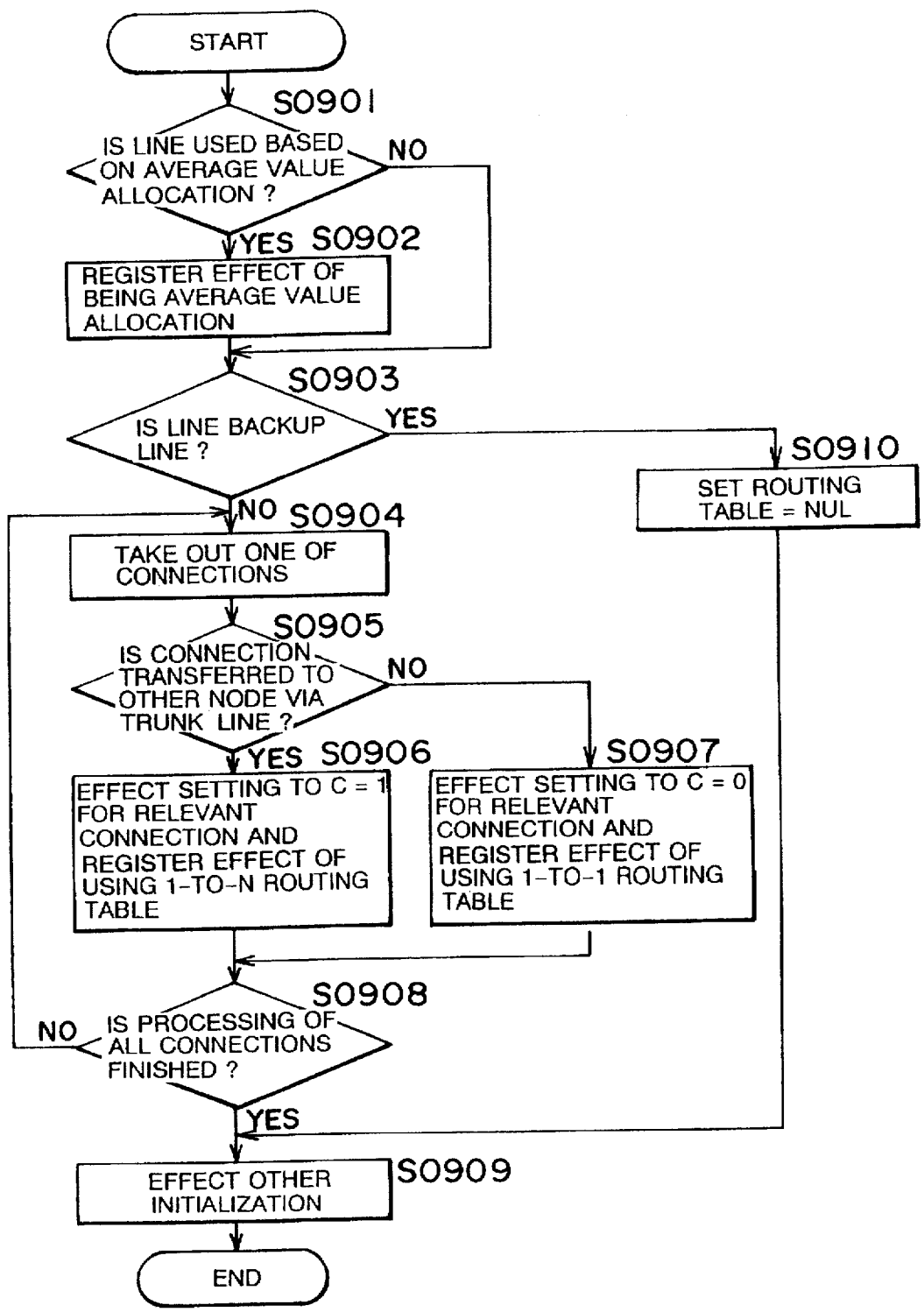
FIG. 36 is a flowchart showing the initializing process in the third embodiment of the present invention.

A process of FIG. 36 is executed for each line. Further, the process of FIG. 36 starts when starting up the relevant node 1 or changing the line or the terminal connected to each line control unit (LT) 12.

Then, in first step S0901, there is determined whether or not the relevant line is used for managing the bandwidth on the basis of the allocation of the average value. On the occasion of making this determination, if the terminal connected to the relevant line is a LAN router 2, or if the trunk line connected to the relevant line is an existing low-speed line, the bandwidth management based on the allocation of the average value is to be conducted. Specifically, this determination is done by inputting from the maintenance console 17.

When managing the bandwidth on the basis of the allocation of the average value, in step S0902, the RAM 16 registers the effect that the bandwidth managing method of the connection set to the relevant line involves the allocation of the average value. Then, the processing proceeds to step S0903. If the bandwidth management based on the allocation of the average value is not performed in step S0901, the processing proceeds directly to step S0903.

Checked in this step S0903 is whether the relevant line is the backup line or not. That is, there is checked whether or not a cable φ2 of the backup line is connected to the ATM network terminal circuit (NTC) 121 of the relevant line. If it is the backup line, as described above, it is required that the columns of the routing table remain blank, and hence the routing table is set to "NUL" in step S0910 (however, only the routing data for the ATM-OAM cell is set). Then, the processing proceeds directly to step S0909.

Whereas if the relevant line is not the backup line, in step S0904, one of the input-directional connections set to the relevant line is taken out. Checked subsequently in next step is whether or not the connection taken out is a connection for transferring the cell via the trunk line to other node 1. This checking is done depending on whether or not the relevant line is a line for the cell including VPI/VCI transferred to the line connected to the trunk line.

If determined as a connection for the cell transferred to other node, in step S0906, the copy indication bit set to "C=1" is given to the cell belonging to the relevant connection, and there is registered the effect that the 1-to-N connection routing table shown in FIG. 16 is applied. Further, if not the connection for the cell transferred to other node, in step S0907, the copy indication bit set to "C=0" is given to the cell belonging to the relevant connection, and there is registered the effect that the 1-to-1 connection routing table shown in FIG. 12 is applied.

Checked in any case in next step S0908 is whether or not the processes for all the connections set to the relevant line are ended. Then, when determining that the processes for all the connections are not yet finished, the processing returns to step S0904, and a process for the next connection is to be executed. Contrastingly, when determining that the processes for all the connections are finished, the processing proceeds to step S0909.

In next step S0909, other initializing processes are carried out. Specifically, for instance, the setting needed for the bandwidth management determined in step S0901. Thereafter, this initializing process comes to an end.

[Process against Occurrence of Fault]

Figure 37:
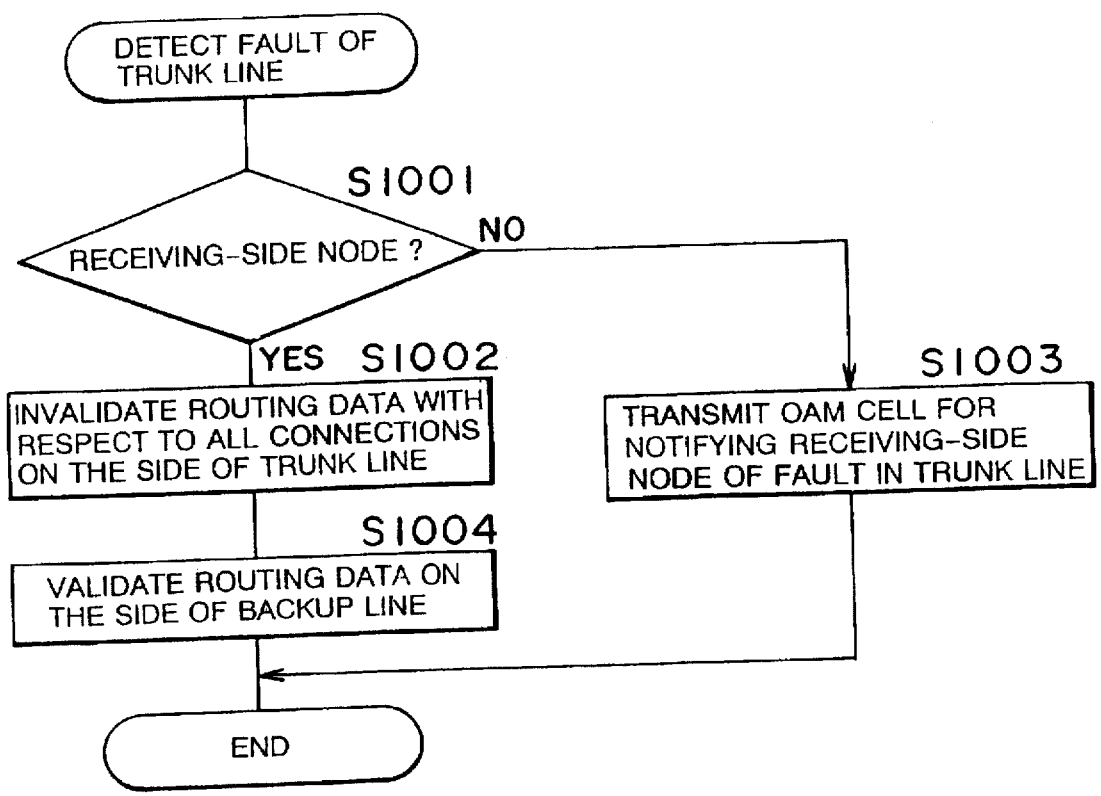
FIG. 37 is a flowchart showing a process of switching the trunk line in the third embodiment of the present invention.
Figure 38:
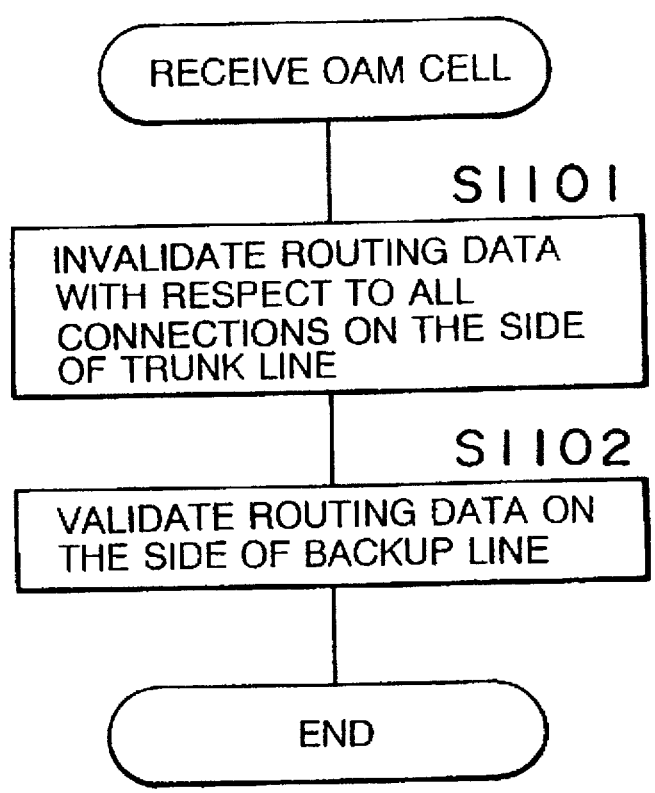
FIG. 38 is a diagram illustrating a trunk line switching process executed by the receiving-side ATM node receiving the ATM-OAM cell in the third embodiment of the present invention.

FIGS. 37 and 38 show control processes for switching the backup line φ2, which are executed when a fault happens. That is, the control processes are executed to discard the cells transferred through the main connection in the second ATM node 1b on the receiving side and to validate the cells transferred via the subconnection.

The process in FIG. 37 starts with an interrupting process when detecting an occurrence of the L1 fault on the trunk line or when detecting an occurrence of the hardware fault in the line control unit (LT) 12 accommodating the trunk line in the main control unit (CTL) 14 of each ATM node 1.

A content of this process in FIG. 37 differs depending on whether the relevant ATM node 1 turns out a node on the receiving side or on the transmitting side with respect to the trunk line φ1 in which the L1 fault or the hardware fault of the line control unit (LT) 12 happens. Then, in step S1001 after the start, whether the relevant ATM node 1 is the receiving side node or not is checked. Then, if the relevant node 1 is the receiving side node, the processing proceeds to step S1002. That is, processes inclusive of step S1002 are those in the case of being capable of the switchover to the backup line simply by setting the routing table in the relevant node 1. In contrast with this, if the relevant node 1 is the transmitting side node, the processing proceeds to step S1003. That is, the process in this step S1003 is such a process that the receiving node is notified of the occurrence of the fault, and an indication to switch the routing table has to be given thereto.

Invalidated in step S1002 are the contents of the routing table stored in the input-directional ATM cell header high-speed converting circuit (ATC) 122a connected to the trunk line φ1 within the line control unit (LT) 12 in which the hardware fault happens or the input-directional ATM cell header high-speed converting circuit (ATC) 122a accommodating the trunk line in which the L1 fault happens. Specifically, a description of the routing data set in this routing table is deleted.

Validated in next step S1004 are the contents of the routing table stored in the input-directional ATM cell header high-speed converting circuit (ATC) 122a accommodating the backup line corresponding to that trunk line. Specifically, the contents of the routing data that have been invalidated in step S1002 are put in this routing table as they are. After the above processes have been done, this processing is ended.

In this connection, the ATM-OAM cell for the notification about the trunk line fault is transmitted to the receiving side node in step S1003, and this processing is finished.

In the receiving side node receiving this ATM-OAM cell, the process in FIG. 38 starts. The process in FIG. 38 has the same contents as the processes of steps S1002 and S1004 in FIG. 37.

[Process for Fault Restoration]

Figure 39:
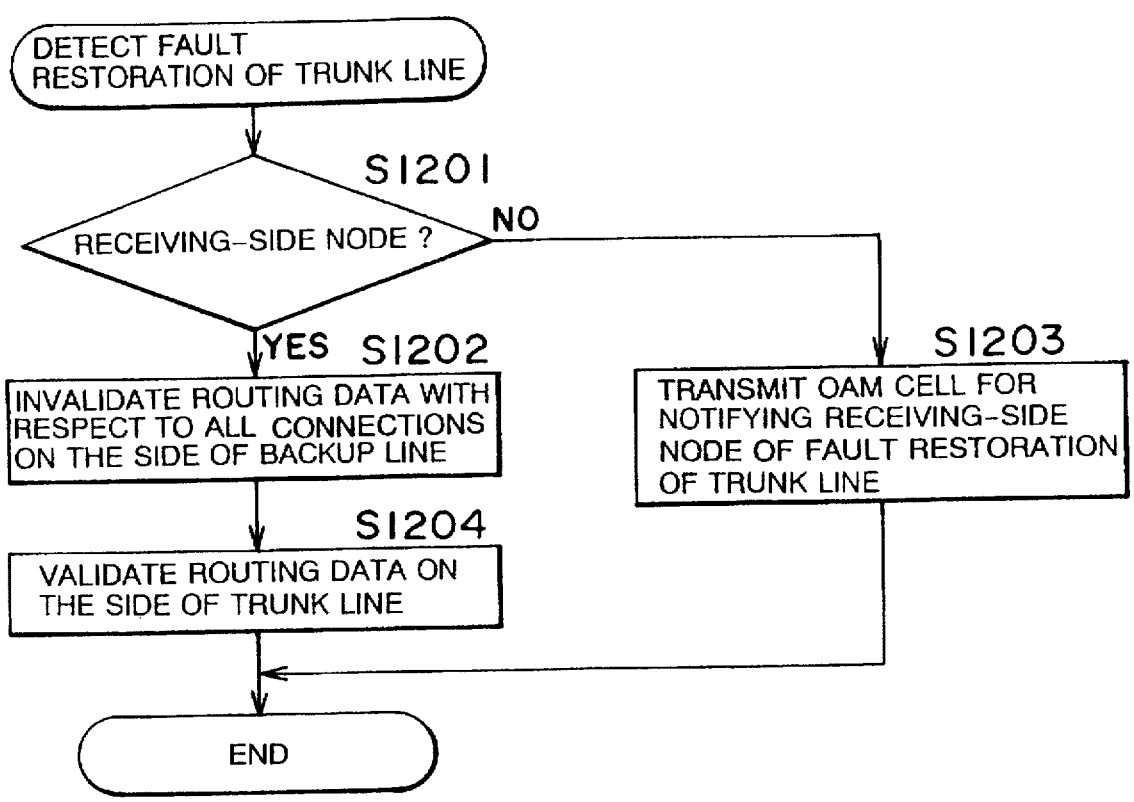
FIG. 39 is a flowchart showing a process of switching back the trunk line in the third embodiment of the present invention.
Figure 40:
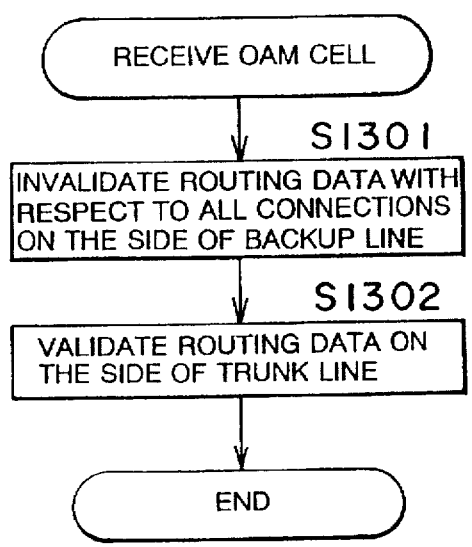
FIG. 40 is a diagram showing the trunk line switch-back process executed by the receiving-side ATM node receiving the ATM-OAM cell in the third embodiment of the present invention.

FIGS. 39 and 40 show control processes for the switch-back to the trunk line φ1, which are executed for the fault restoration. That is, the control process is conducted for discarding of the cells transferred through the subconnection in the second ATM node 1b on the receiving side and for validating the cells transferred through the main connection.

The process in FIG. 39 starts with an interrupting process when recognizing a restoration from the L1 fault of the trunk line or from the hard fault of the line control unit (LT) 12 in the main control unit (CTL) 14 that has detected the fault.

A content of the process in FIG. 39 also differs depending on whether the relevant ATM node 1 turns out a node on the receiving side or on the transmitting side with respect to the trunk line restored from the fault. Subsequently, in step S1201 after the start, whether the relevant node 1 is the receiving side node or not is checked. Then, if the relevant node 1 is the receiving side node, the processing proceeds to step S1202. Whereas if the relevant node 1 is the transmitting side node, the processing goes forward to step S1203.

Invalidated in step S1202 are the contents of the routing table stored in the input-directional ATM cell header high-speed converting circuit (ATC) 122a accommodating the backup line corresponding to the trunk line restored from the fault. Specifically, a description of the routing data set in this routing table is deleted.

Validated in next step S1204 are the contents of the routing table stored in the input-directional ATM cell header high-speed converting circuit (ATC) 121a on this trunk line restored from the fault. Specifically, the contents of the routing data that have been invalidated in step S1002 are restored. After the above processes have been done, this processing is ended.

In this connection, the ATM-OAM cell for the notification about the restoration of the trunk line from the fault is transmitted to the receiving side node in step S1203, and this processing is finished.

In the receiving side node receiving this ATM-OAM cell, the process in FIG. 40 starts. This process in FIG. 40 has the same contents as the processes of steps S1202 and S1204 in FIG. 39.

<Operation of Embodiment>

In accordance with the thus constructed third embodiment, when executing the initializing process in FIG. 36, as illustrated in FIG. 33(a), there is set the subconnection via the backup line φ2 in addition to the main connection via the trunk line φ1. This subconnection branches off within the first ATM node 1a and extends to the second ATM node 1b via the backup line φ2.

Accordingly, in the normal state with no occurrence of the fault, the cell belonging to the relevant connection is transmitted via the trunk line φ1 to the second node 1b. The cell is then copied within the first ATM node 1a and transmitted via the backup line φ2 to the second node 1b. Within the second node 1b, a routing data about a transfer destination of the cell belonging to the relevant connection is written in the routing table in the input-directional ATM cell header high-speed converting circuit (ATC) 122a connected to the trunk line φ1. Accordingly, the cell transmitted via the trunk line φ1 to the second node 1b is further transferred to other ATM node or the terminal from the second node 1b. In contrast with this, within the second node 1b, no routing data about the transfer destination of the cell is written in the routing table in the input-directional ATM cell header high-speed converting circuit (ATC) 122a connected to the backup line φ2. Hence, the cell transmitted via the backup line φ2 to the second node 1b is discarded of without being transferred within the second node 1b. As a result, the cells are prevented from being overlapped.

In the course of transmitting the cell in such a way, when the main control unit (CTL) 14 of the second ATM node 1b on the receiving side detects the L1 fault or the fault of the line control unit (LT) 12, the description of the routing data is deleted from the routing table in the input-directional ATM cell header high-speed converting circuit (ATC) 122a connected to the trunk line φ1. At the same time, the routing data about the transfer destination of the cell belonging to the relevant connection is written in the routing table in the input-directional ATM cell header high-speed converting circuit (ATC) 122a connected to the backup line φ2.

Figure 34:
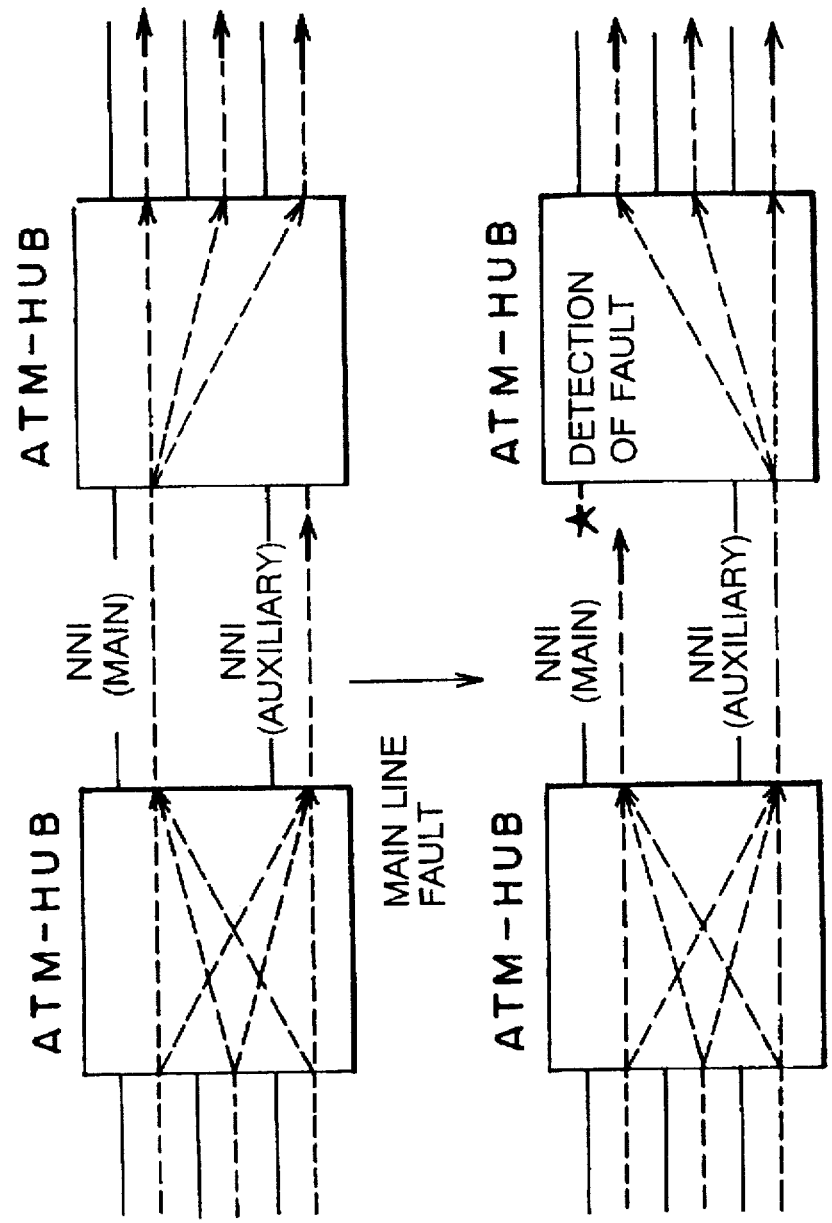
FIG. 34 is a diagram showing more specifically how the trunk line is switched than in FIG. 33.

Accordingly, as shown in FIG. 33(b), it follows that the cell transmitted via the backup line φ2 to the second ATM node 1b is transferred other ATM node 1b or the terminal from the second node 1b. On the other hand, even if there are cells reaching the second node 1b through the main connection in which the fault happens, these cells are discarded of without being transferred to others. It is therefore possible to prevent the transfer of the cell that would probably be destructed by the fault. Incidentally, referring to FIG. 33, a connection change point is marked with a black circle, while a fault occurrence point is marked with a black star. Note that, as a matter of fact, a plurality of connections are set through the trunk line φ1, and the cells are inputted to the first node 1a individually via separate lines and outputted from the second node 1b individually via separate lines. In accordance with this embodiment, each individual connection branches off to the backup line φ2 within the first node 1a, and a switching process is effected within the second node 1b. FIG. 34 illustrates this state.

Figure 35:
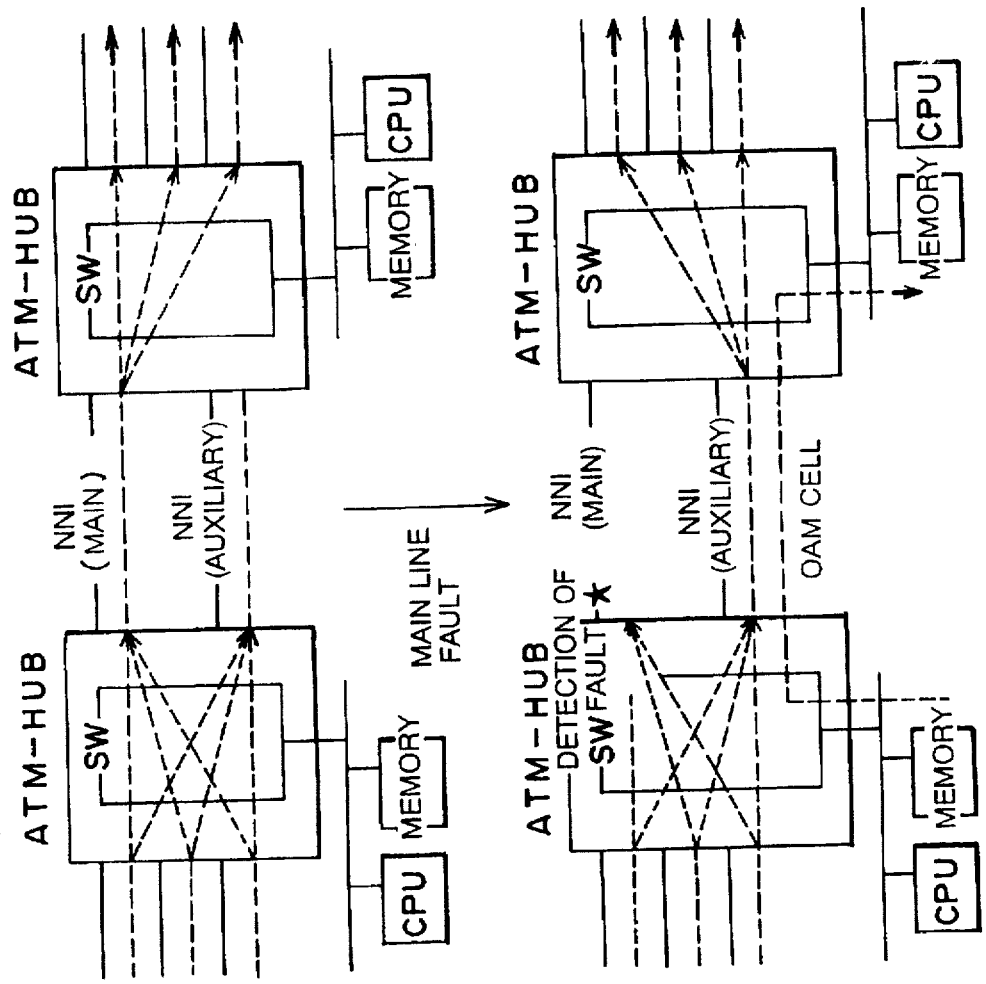
FIG. 35 is a diagram illustrating how the ATM node on the receiving side is notified of a fault in the third embodiment of the present invention.

On the other hand, when the main control unit (CTL) 14 of the first ATM node 1a on the transmitting side detects the L1 fault or the fault of the line control unit (LT) 12, as illustrated in FIG. 35, this first ATM node 1a transmits the ATM-OAM cell for giving a notification of the occurrence of the fault to the second ATM node 1b via the backup line φ2. Accordingly, the second ATM node 1b notified of the occurrence of the fault through this ATM-OAM cell is capable of performing the same switching process as the above-mentioned. This notification of the occurrence of the fault may be written to the path overhead (POH) of the SDH frame transmitted to the second ATM node 1b from the first ATM node 1a.

For a duration of the cell transmission through the thus switched backup line φ2, it is possible to perform the fault restoration on the side of the main connection (trunk line φ1). Then, when the main control unit (CTL) 14 of the ATM node 1 which has detected the occurrence of the fault detects a completion of the fault restoration, the description of the routing data is deleted from the routing table in the input-directional ATM cell header high-speed converting circuit (ATC) 122a connected to the backup line φ2.

At the same time, the routing data about the transfer destination of the cell belonging to the relevant connection is written in the routing table within the input-directional ATM cell header high-speed converting circuit (ATC) 122a connected to the trunk line φ1.

Therefore, as in the manner before the fault happens, only the cells transmitted via the trunk line φ1 to the second ATM node 1b are transferred from this second node 1b to other ATM node 1b or the terminal.

Thus, in accordance with the third embodiment, the 1-to-1 connection has been made beforehand within the first node 1a on the transmitting side, and, therefore, the switchover to the backup line φ2 can be done by only the processes in the second node 1b on the receiving side. Accordingly, when effecting the switch-over to the backup line φ2 and the switch-back to the trunk line φ1, it is possible to restrain the possibility in which the cells will be disposed of.

<Embodiment 4>

As compared with the third embodiment, a fourth embodiment of the present invention has such a characteristic that the N-to-1 connection is set at all times within the second ATM node 1b on the receiving side, and, when the fault happens, the cell transfer destination is switched from the trunk line φ1 to the backup line φ2 within the first ATM node 1a on the transmitting side.

The fourth embodiment of the present invention has everything in the first embodiment in terms of the constructions of B-ISDN and of the respective ATM nodes 1. Hence, the explanations thereof will be omitted herein. In accordance with the fourth embodiment, however, the execution of the above control involves the initialization different from that in the first embodiment. Processes different from those executed in the first embodiment will be added and then executed. These processes will hereinafter be described.

<Initialization>

Figure 41:
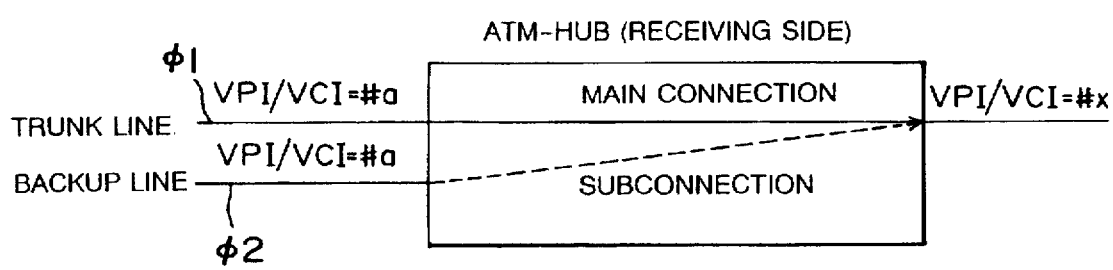
FIG. 41 is a diagram illustrating an integration of the connections within the ATM node on the receiving side in a fourth embodiment of the present invention.

FIG. 41 schematically illustrates a status of the connection which is to be initialized in the first ATM node 1a on the receiving side. As obvious from FIG. 41, the connection for transferring a cell in which VPI/VCI="#a", upon receiving an input of the relevant cell from the trunk line φ1, rewrites VPI/VCI of the relevant cell such as "=#x" and output it from the line linked to other ATM node 1 or the terminal. This connection is defined as the main connection performing the function of transferring the cell during the normal state.

On the other hand, this main connection is integrated with other connections within the ATM node 1. The connection integral with this main connection, upon inputting the cell of "VPI/VCI=#a" from the backup line φ2, rewrites VPI/VCI of the received cell as "=#x" from "=#a" and outputs it from the same output line with the main connection. The connection integral with the main connection is defined as the subconnection performing the function of transferring the cell when detouring the cell.

For integrating this connection, within the second ATM node 1b to which the cell is transferred, the routing table having the same contents is prepared for the line control unit (LT) 12 to which the trunk line φ1 is connected and the line control unit (LT) 12 to which the backup line φ2 is connected. That is, the routing data with the same line serving as a destination is made corresponding to the cells having identical VPI/VCI. Accordingly, in the case of the cell including its VPI/VCI that is registered in this routing table, whether to input it to the relevant second ATM node 1b via the trunk line φ1 or via the backup line φ2, it follows that the cell is outputted from the same output line. Incidentally, FIG. 12 shows the contents of the routing table prepared in this case.

On the other hand, in the first ATM node 1a from which the cell is transferred, the routing table having such a content that the cell belonging to the each relevant connection is transferred toward the trunk line φ1 is prepared for the line control units (LT) 12 on all the connections for transferring the cell via the trunk line φ1 to the second ATM node 1b. Hence, as illustrated in FIG. 42(a), in the normal state, the cell outputted to the first ATM node 1a is transferred to the second ATM node 1b via the trunk line φ1. Then, it follows that the cell is transferred through the main connection within this second ATM node 1b and outputted to the output line.

<Content of Control in Main Control Unit (CTL)>

Given hereinafter is a specific explanation of a content of control executed for detouring by use of the backup line φ2 when detecting the L1 fault or the hardware fault of the line control unit 12. Note that the processes for controlling the congestion in the first embodiment, i.e., the processes of FIGS. 19 through 23 are also executed in parallel to the process for detouring. With respect to the contents thereof, however, any modifications are not required to be added to those in the first embodiment, and hence the explanation thereof will be omitted.

[Initializing Process]

Figure 45:
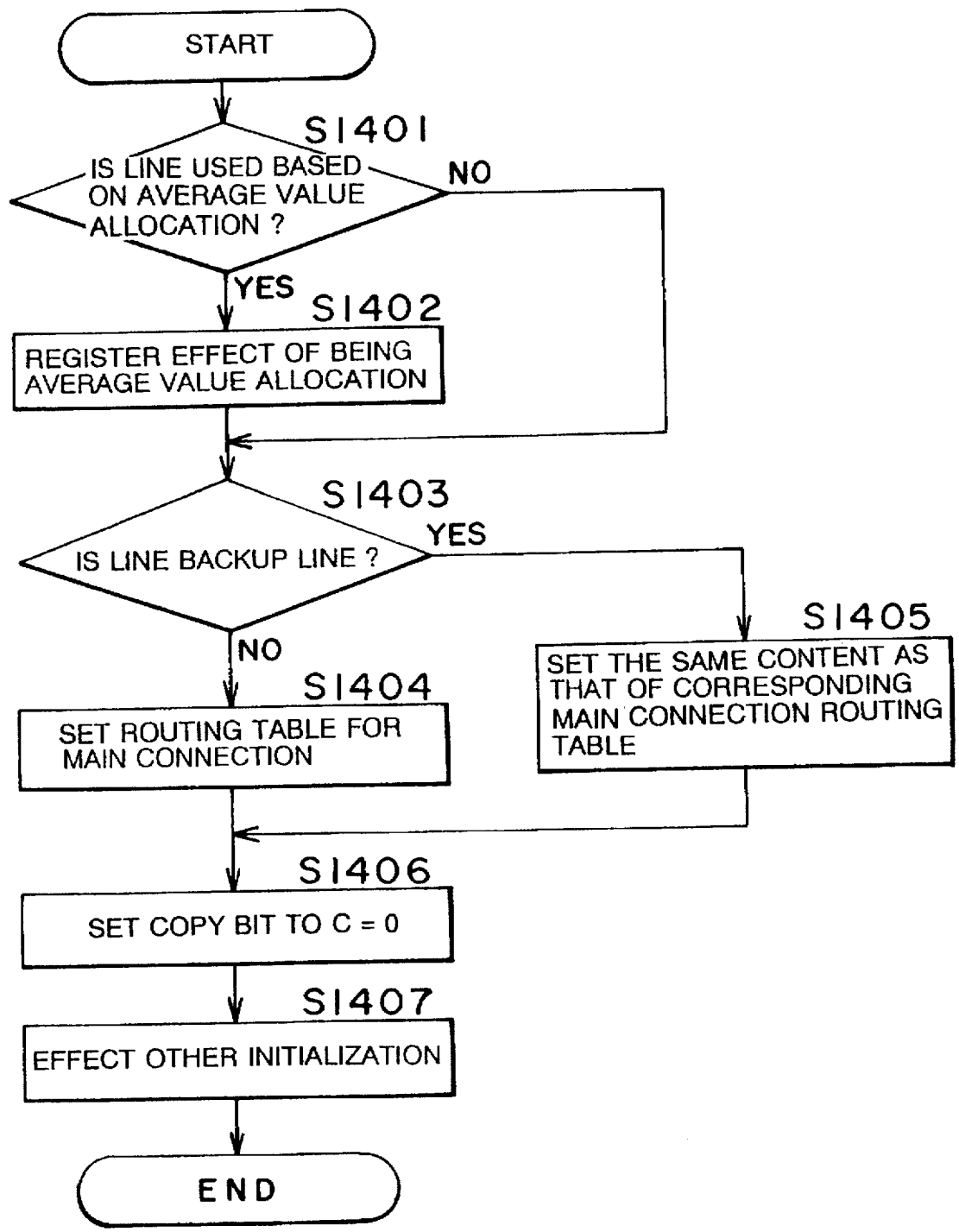
FIG. 45 is a flowchart showing the initializing process in the fourth embodiment of the present invention.

A process of FIG. 45 is executed for each line. Further, the process of FIG. 45 starts when starting up the relevant node 1 or changing the line or the terminal connected to each line control unit (LT) 12.

Then, in first step S1401, there is determined whether or not the relevant line is used for managing the bandwidth on the basis of the allocation of the average value. On the occasion of making this determination, if the terminal connected to the relevant line is the LAN router 2, or if the trunk line connected to the relevant line is the existing low-speed line, the bandwidth management based on the allocation of the average value is to be conducted. Specifically, this determination is done by inputting from the maintenance console 17.

When managing the bandwidth on the basis of the allocation of the average value, in step S1402, the RAM 16 registers the effect that the bandwidth managing method of the connection set to the relevant line involves the allocation of the average value. Then, the processing proceeds to step S1403. If the bandwidth management based on the allocation of the average value is not performed in step S1401, the processing proceeds directly to step S1403.

Checked in this step S1403 is whether the relevant line is the backup line φ2 or not. That is, there is checked whether or not the cable φ2 of the backup line is connected to the ATM network terminal circuit (NTC) 121 of the relevant line. If not the backup line, it can be presumed that it is a line (including an input line for inputting the cell transmitted from the terminal) connected to the above-mentioned main connection. Accordingly, in this case, the routing table (for the main connection) for transferring the cells belonging to each connection to one specified output line is set in the input-directional high-speed ATM cell header converting circuit (ATC) 122a (step S1404).

On the other hand, if determined as the backup line in step S1403, a routing table having the same contents as the routing table for the main connection that set to the corresponding main connection line is set in the input-directional ATM cell header high-speed converting circuit (ATC) 122a of the relevant line (step S1405).

In any case, the copy indication bit (C) is set such as "C=0" in next step S1406, and, in subsequent step S1407, other initializing processes are to be carried out. Specifically, for example, the setting needed for the bandwidth management determined in step S1401 is performed. Thereafter, this initializing process comes to na end.

[Process against Occurrence of Fault]

Figure 46:
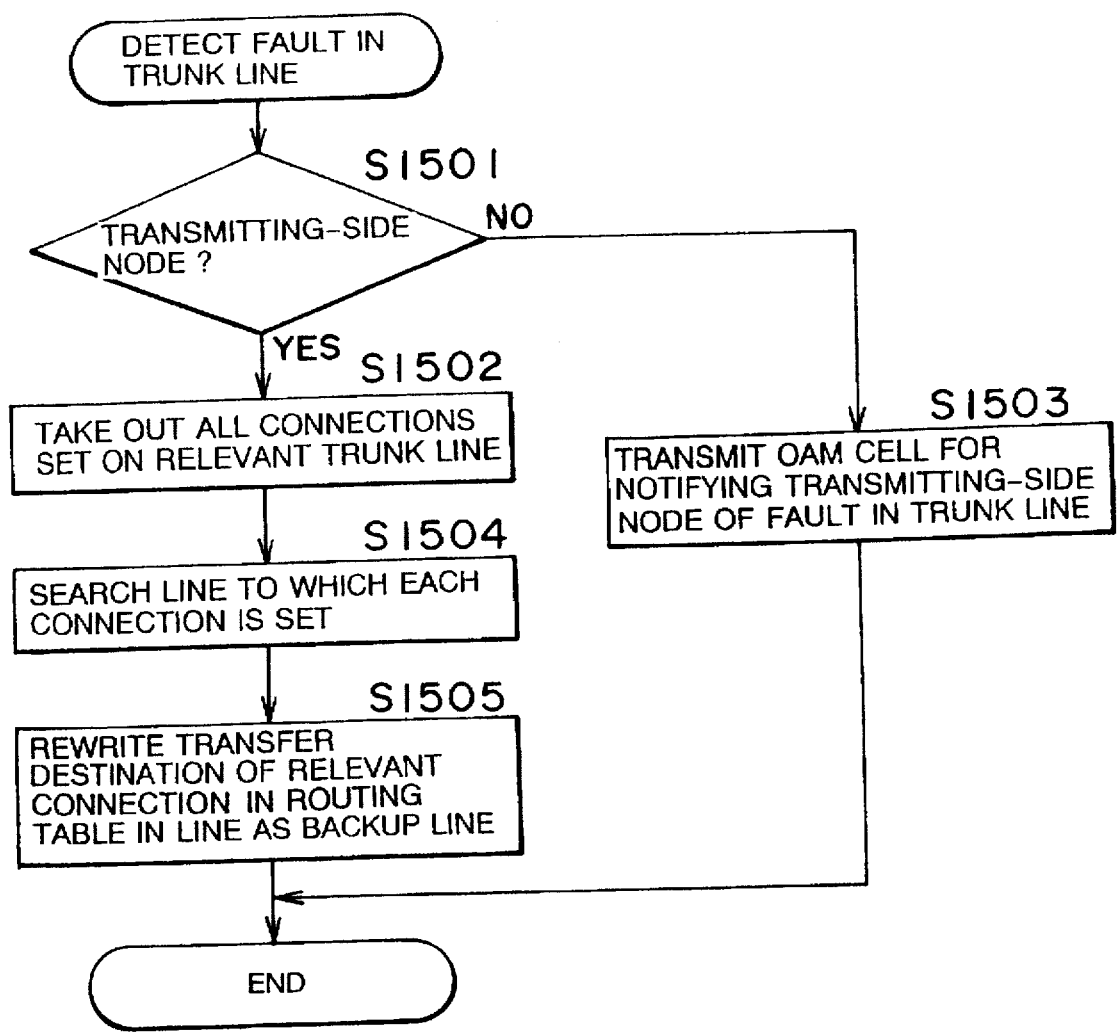
FIG. 46 is a flowchart showing a process of switching the trunk line in the fourth embodiment of the present invention.
Figure 47:
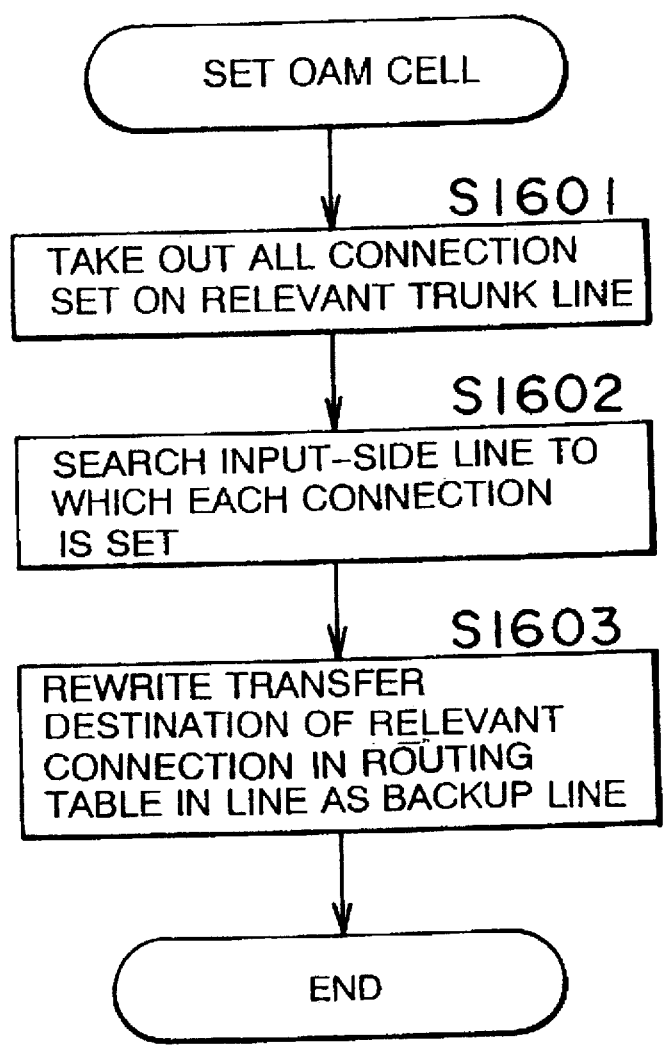
FIG. 47 is a diagram illustrating a trunk line switching process executed by the transmitting-side ATM node receiving the ATM-OAM cell in the fourth embodiment of the present invention.

FIGS. 46 and 47 show control processes for the switchover to the backup line φ2 that are to be executed when the fault happens. That is, the control process is done for inhibiting the cell transfer through the main connection by changing, to the backup line φ2, the transfer destination of the cell outputted toward the trunk line φ1 in the first ATM node 1a on the transmitting side and for transferring the cell through the subconnection.

The process of FIG. 46 starts with an interrupting process when detecting the occurrence of the L1 fault in the trunk line or when detecting the occurrence of the hardware fault of the line control unit (LT) 12 accommodating the trunk line φ1 in the main control unit (CTL) 14 of each ATM node 1.

A content of this process in FIG. 46 differs depending on whether the relevant ATM node 1 turns out a node on the receiving side or on the transmitting side with respect to the trunk line φ1 in which the L1 fault or the hardware fault of the line control unit (LT) 12 happens. Then, in step S1501 after the start, whether the relevant ATM node 1 is the transmitting side node or not is checked. Then, if the relevant node 1 is the transmitting side node, the processing proceeds to step S1502. That is, processes inclusive of step S1502 are those in the case of being capable of the switchover to the backup line simply by setting the routing table in the relevant node 1. In contrast with this, if the relevant node 1 is the receiving side node, the processing proceeds to step S1503. That is, the process in this step S1503 is such a process that the transmitting side node is notified of the occurrence of the fault, and an indication to switch the routing table has to be given thereto.

Taken out in step S1502 are all the connections set to the trunk line φ1 connected to the interior of the line control unit (LT) 12 in which the hardware fault is caused or to the trunk line in which the L1 fault happens.

Searched in next step S1504 is an input side line to which each taken-out connection is set. That is, there is searched the input-directional ATM cell header high-speed converting circuit (ATC) 122a which receives first the ATM cell belonging to each of those connections in the relevant ATM node 1.

Rewritten in next step S1505 are contents of the routing table stored in each of the thus searched input-directional ATM cell header high-speed converting circuits (ATC) 122a. That is, the routing data corresponding to VPI/VCI of each connection are updated to a content transferred to the backup line φ2. Thereafter, this process is finished.

Contrastingly, in step S1503, there is transmitted the ATM-OAM cell for notifying the transmitting side node of the fault of the trunk line, thus finishing this process.

In the transmitting side node receiving this ATM-OAM cell, a process of FIG. 47 starts. The process of FIG. 47 has the same contents as those of the processes in steps S1502 trough 1505 in FIG. 46.

[Process for Fault Restoration]

Figure 48:
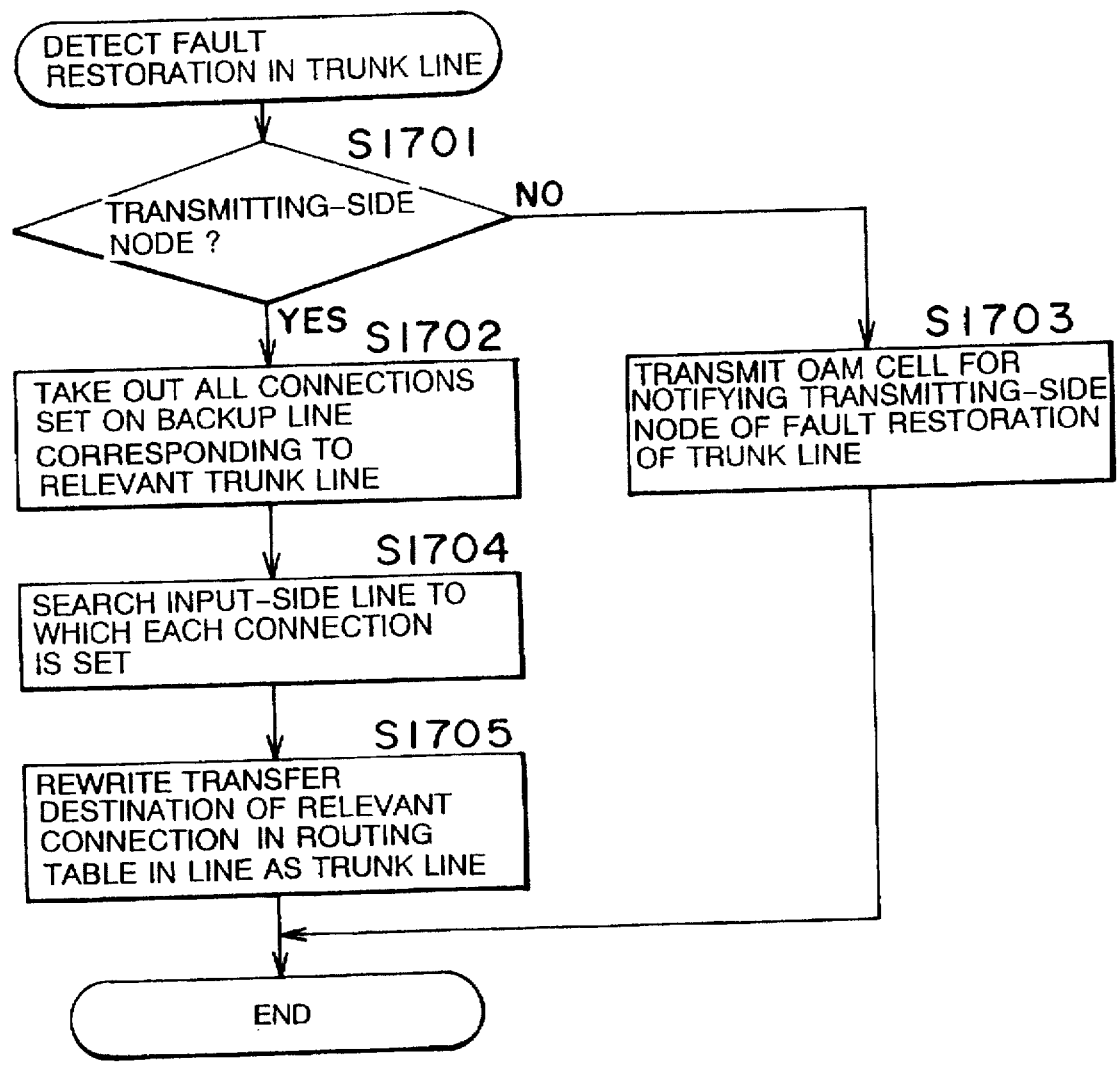
FIG. 48 is a flowchart showing a process of switching back the trunk line in the fourth embodiment of the present invention.
Figure 49:
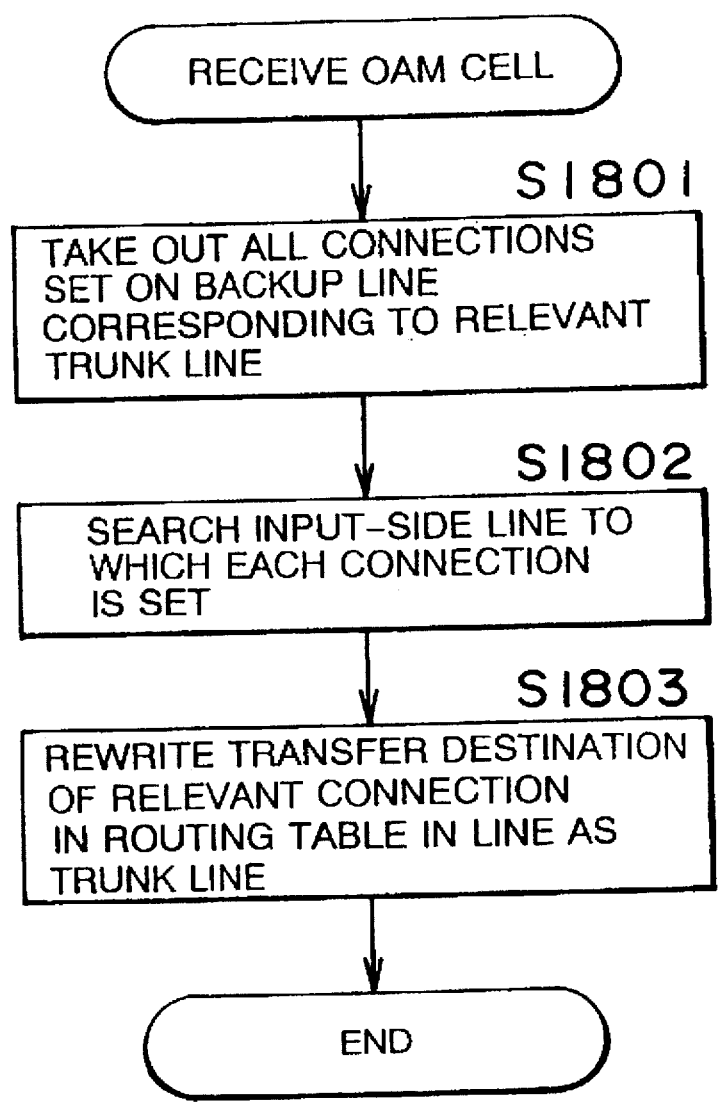
FIG. 49 is a diagram showing the trunk line switch-back process executed by the transmitting-side ATM node receiving the ATM-OAM cell in the fourth embodiment of the present invention.

FIGS. 48 and 49 show control processes for the switchback to the trunk line φ1, which are executed for the fault restoration. That is, the control process is conducted for inhibiting the cell transfer through the subconnection and transferring the cell through the main connection by changing, to the trunk line φ1, the transfer destination of the cell outputted to the backup line φ2 in the first ATM node 1a on the transmitting side.

The process in FIG. 48 starts with an interrupting process when recognizing the restoration from the L1 fault of the trunk line or from the hardware fault of the line control unit (LT) 12 in the main control unit (CTL) 14 that has detected the fault.

A content of the process in FIG. 48 also differs depending on whether the relevant ATM node 1 turns out a node on the receiving side or on the transmitting side with respect to the trunk line φ1 in which the L1 fault or the hardware fault of the line control unit (LT) 12 happens. Subsequently, in step S1701 after the start, whether the relevant ATM node 1 is the receiving side node or not is checked. Then, if the relevant node 1 is the transmitting side node, the processing proceeds to step S1702. Whereas if the relevant node 1 is the receiving side node, the processing goes forward to step S1703.

Taken out in step S1702 are all the connections set to the backup line φ2 corresponding to the trunk line restored from the fault.

Searched in next step S1704 is an input side line to which each taken-out connection is set. That is, there is searched the input-directional ATM cell header high-speed converting circuit (ATC) 122a which receives first the ATM cell belonging to each of those connections in the relevant ATM node 1.

Rewritten in next step S1705 are contents of the routing table stored in each of the thus searched input-directional ATM cell header high-speed converting circuits (ATC) 122a. That is, the routing data corresponding to VPI/VCI of each connection are updated to a content transferred to the trunk line φ1. Thereafter, this process is finished.

Contrastingly, in step S1703, there is transmitted the ATM-OAM cell for notifying the transmitting side node of the fault of the trunk line, thus finishing this process.

In the transmitting side node receiving this ATM-OAM cell, a process of FIG. 49 starts. The process of FIG. 49 has the same contents as those of the processes in steps S1702 trough 1705 in FIG. 46.

<Operation of Embodiment>

In accordance with the thus constructed fourth embodiment, when executing the initializing process in FIG. 45, as illustrated in FIG. 42(a), there is set the subconnection connected to the backup line φ2 in addition to the main connection via the trunk line φ1. This subconnection is integrated with the main connection within the second ATM node 1, and the cells are outputted from the same output line. Further, in the first ATM node 1a, the routing table having a content indicating a transfer to the trunk line φ1 is set in the line control unit on the connection set via the trunk line φ1, but the routing table having a content indicating a transfer to the backup line φ2 is not any line units.

Accordingly, in the normal state where no fault happens, the cells belonging to the connection set via the trunk line φ1 are transmitted to the second node 1b via the trunk line φ1 and outputted to the output line through the main connection within the second ATM node 1b. In contrast with this, no cell is transferred to the backup line φ2 within the first node 1a. As a result, the cells are prevented from being overlapped.

In the course of transmitting the cell in such a way, when the main control unit (CTL) 14 of the first ATM node 1a on the transmitting side detects the L1 fault or the fault of the line control unit (LT) 12, there are rewritten the contents of the routing table of the input-directional ATM cell header high-speed converting circuit (ATC) 122a to which the relevant connection is set. That is, an item of the transfer destination of the routing data corresponding to VPI/VCI of the relevant connection is updated to the backup line φ2.

Figure 43A:
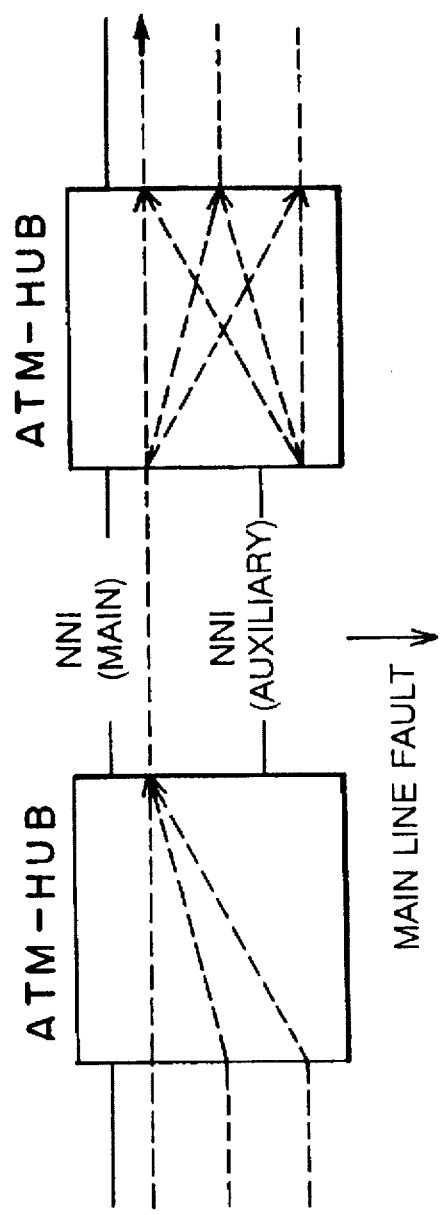
FIG. 43 is a diagram showing more specifically how the trunk line is switched than in FIG. 42.
Figure 43B:
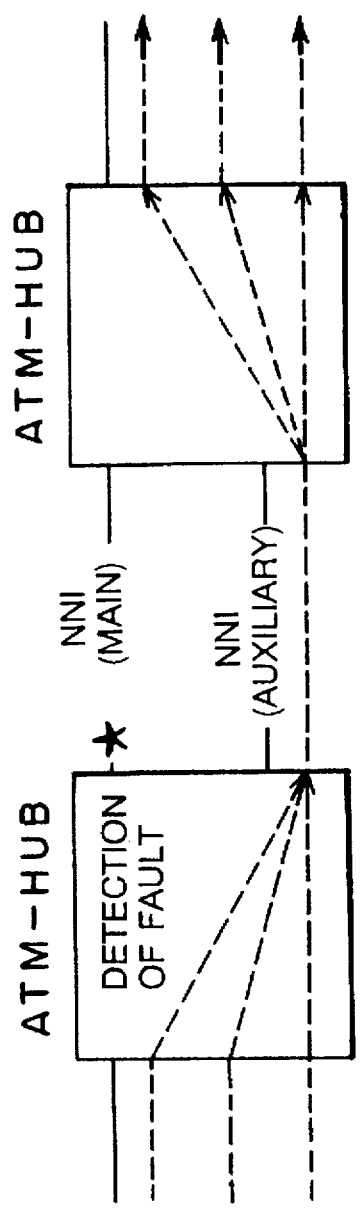

Accordingly, as shown in FIG. 42(b), the cells belonging to the connection set via the trunk line φ1 are transmitted to the second node 1b via the backup line φ2 and outputted to the output line through the subconnection within the second ATM node 1b. In contrast with this, within the first node 1a, there is no cell to be transferred to the trunk line φ1. As a consequence, the cells are prevented from being overlapped. Incidentally, referring to FIG. 42, the connection change point is marked with a black circle, while the fault occurrence point is marked with a black star. Note that, as a matter of fact, a plurality of connections are set through the trunk line φ1, and the cells are inputted to the first node 1a individually via separate lines and outputted from the second node 1b individually via separate lines. In accordance with this embodiment, the main connection and the subconnection are set for individual connection, and the two connections are integrated in the second node 1b. FIG. 43 illustrates this state.

Figure 44A:
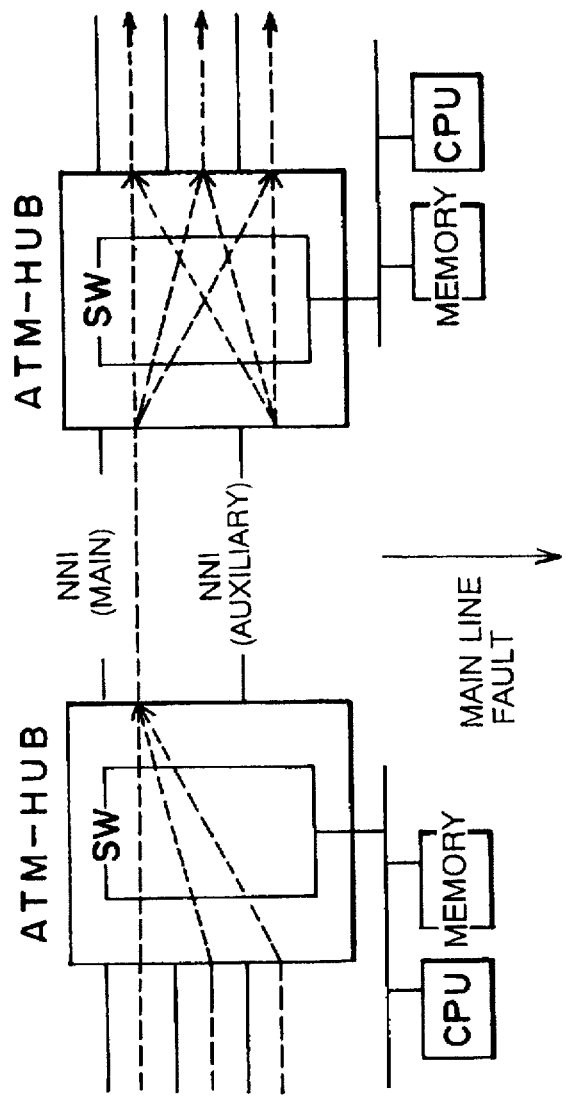
FIG. 44 is a diagram illustrating how the ATM node on the transmitting side is notified of the fault in the fourth embodiment of the present invention.
Figure 44B:
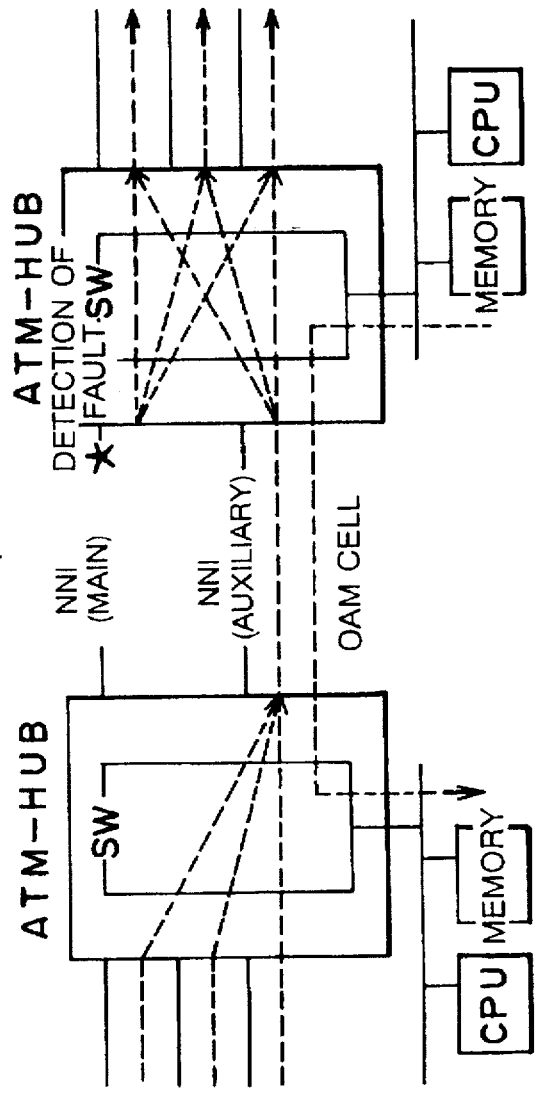

On the other hand, when the main control unit (CTL) 14 of the second ATM node 1b on the receiving side detects the L1 fault or the fault of the line control unit (LT) 12, as illustrated in FIG. 44, the second ATM node 1b transmits the ATM-OAM cell for Giving an notification of the occurrence of the fault to the first ATM node 1a via the backup line φ2. Hence, the first ATM node 1a notified of the occurrence of the fault through this ATM-OAM cell is capable of performing the same switching process as the above-mentioned. This notification of the occurrence of the fault may be written to the path overhead (POH) of the SDH frame transmitted to the first ATM node 1a from the Second ATM node 1b.

For a duration of the cell transmission through the thus switched backup line φ2, it is possible to perform the fault restoration on the side of the main connection (trunk line φ1). Then, when the main control unit (CTL) 14 of the ATM node 1 which has detected the occurrence of the fault detects a completion of this fault restoration, there are rewritten the contents of the routing table within the input-directional ATM cell header high-speed converting circuit (ATC) 122a which was transferring the cells to the backup line φ2. That is, an item of the transfer destination of the routing data corresponding to VPI/VCI of the relevant connection is updated to the backup line φ2.

Accordingly, as in the manner before the occurrence of the fault, there resumes the cell transfer from the first ATM node 1a via the trunk line φ1 to the second ATM node 1b.

Thus, in accordance with this fourth embodiment, the N-to-1 connection has been conducted beforehand within the second node 1b on the receiving side, and hence the switchover to the backup line φ2 can be effected by only the processing within the first node 1a on the transmitting side. Accordingly, it is feasible to restrain the possibility in which the cells will be discarded when performing the switch-over to the backup line φ2 and the switch-back to the trunk line φ1.

<Embodiment 5>

An embodiment 5 of the present invention has a difference form the third embodiment in terms of such a point that a single backup line φ2 is prepared for a plurality of trunk lines φ1. This backup line φ2 has only the same bandwidth as that of each trunk line φ1. Hence, it is impossible to cause all the connections set on the respective trunk lines φ1 to branch off in order to set the subconnections on the backup lines φ2 as done in the third embodiment. Accordingly, in accordance with this fifth embodiment, only the importance connection among the respective main connections set on the individual trunk lines φ1 branches off within the first node 1a on the transmitting side is thus led to the backup line φ2. Hereinafter, a content of the control therefor will be explained.

Note that the fifth embodiment of the present invention has everything in the first embodiment in terms of the constructions of B-ISDN and of the respective ATM nodes 1. Hence, the explanations thereof will be omitted herein.

<Initialization>

Figure 50:
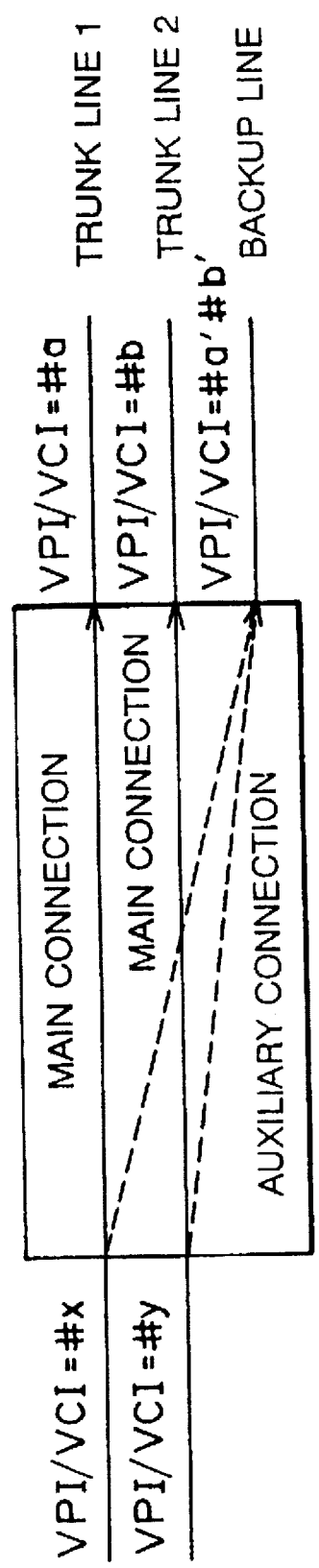
FIG. 50 is a diagram illustrating how the connection branches off within the transmitting-side ATM node in a fifth embodiment of the present invention.

FIG. 50 schematically illustrates a status of the connection which is to be initialized in the first ATM node 1a on the transmitting side. As obvious from FIG. 50, the connection for transferring the cell in which VPI/VCI is set to "=#a", rewrites VPI/VCI of the relevant cell as "=#a" and transmits it to the first trunk line φ1. This connection is defined as the main connection performing the function of transferring the cell during the normal state, and herein this is termed a first main connection. Similarly, the connection for transferring the cell in which VPI/VCI is set to "=#y" rewrites VPI/VCI of the relevant cell as "=#b" and sends it to the second trunk line φ1. This connection is defined as the main connection for performing the function of transferring the cell during the normal state, and herein this is termed a second main connection.

On the other hand, these first and second main connections branch off within the ATM node 1. Namely, the connection branching off from the first main connection rewrites VPI/VCI of the received cell as "=#a" from "=#x" and then sends it to the backup line φ2. This branched-off connection is defined as the subconnection for performing the function of transferring the cell when detouring the cell, and this is herein called a first subconnection. Similarly, the connection branching off from the second main connection rewrites VPI/VCI of the received cell as "=#b" from "=#y" and sends it to the backup line φ2. This branched-off connection is defined as the subconnection for performing the function of transferring the cell when detouring the cell, and herein this is herein referred to as a second subconnection.

For making the connection branch off, in the first ATM node 1a from which the cell is transferred, all the line control units 12, in which one of the connections for transferring the cell to each trunk line φ1 is set, register the effect that the copy indication bit (C) is set such as C=1 with respect to only the cells belonging to a specified important connection among those respective connections.

As discussed above, with respect to the cell containing the copy indication bit set to C=1, the input-directional ATM cell header high-speed converting circuit (ATC) 122a is prepared with the routing table having the content of FIG. 16 in place of the routing table of FIG. 12. In this case, the connection has to branch off, and, therefore, the content to given an indication of being outputted from the plurality of output lines as illustrated in FIG. 16(b) is set in the relevant routing table from the time of initialization. Specifically, the content that the input cell is copied and outputted from the trunk line φ1 and the backup line φ2 is set in the routing table.

Accordingly, with respect to the routing (TAG) data added to the relevant cell by the relevant input-directional ATM cell header high-speed converting circuit (ATC) 122a, the copy indication bit (C) thereof is set to "C=1", and the intra switch routing bit (TAGA) thereof is set to the content of being outputted to the trunk line φ1 and the backup line φ2. As a result, the relevant cells are, as described above, copied in the cell demultiplexing circuit (DMUX) 124 within the line control unit 12 connected to the trunk line φ1 or within the ATM cell switch (SW) 11 and respectively outputted via the trunk line φ1 and the backup line φ2.

On the other hand, the routing table of FIG. 12 is applied directly to the cell in which the copy bit is set to C=0. Hence, with respect to the routing (TAG) data added to the relevant cell by the relevant input-directional ATM cell header high-speed converting circuit (ATC) 122a, the copy indication bit (C) thereof is set to "C=1", and the intra switch routing bit (TAGA) thereof is set to the content of being outputted to the trunk line φ1. As a consequence, the relevant cells are outputted via the trunk line φ1.

Figure 51A:
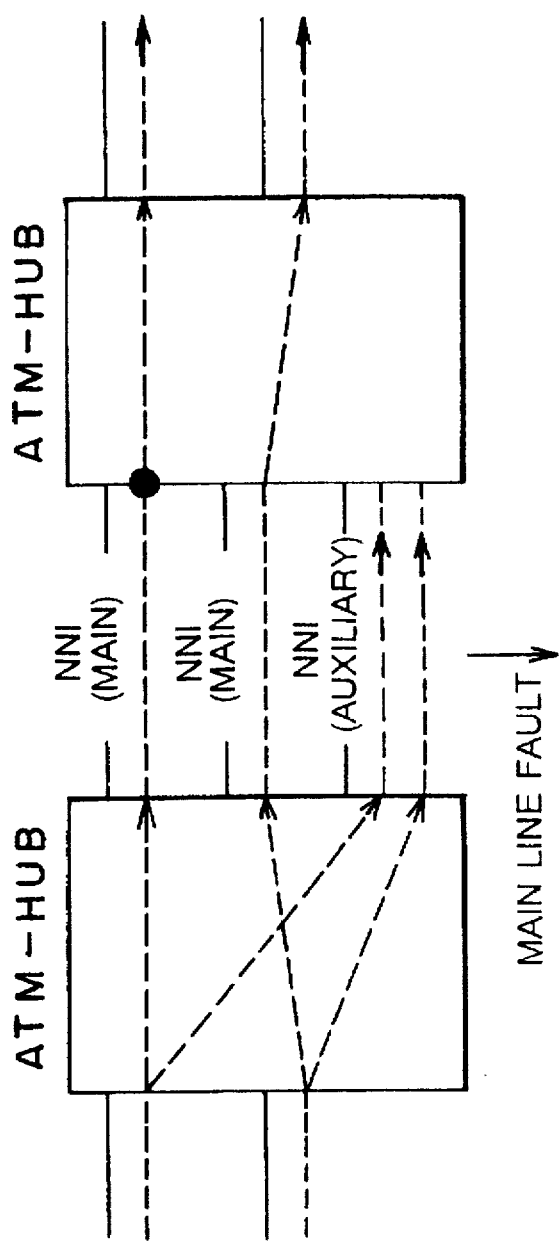
FIG. 51 is a diagram showing how the trunk line is switched in the fifth embodiment of the present invention.

Further, in the second ATM node 1b to which the cell is transferred, the contents of the routing table are set in only the input-directional ATM cell header high-speed converting circuits (ATC) 122a in the line control units 12 on the first and second main connections. In the input-directional ATM cell header high-speed converting circuit (ATC) 122a in the line control unit 12 on the subconnection, the columns for the contents of the routing table are blank. Accordingly, as illustrated in FIG. 51(a), in the normal state, only the cells belonging to the first and second main connections are further transferred within the second ATM node 1b and outputted from the output lines. However, it follows that the cells belonging to the subconnection are abandoned without being transferred. As a result, the cells are prevented from being overlapped.

Note that when the cells belonging to the first or second main connection are further transferred from the second ATM node 1b to other ATM node 1, the copy indication bit (C) is set to "C=1", and the routing table of FIG. 16 is prepared in the input-directional ATM cell header high-speed converting circuit (ATC) 122a. When transferred to the terminal under the second ATM node 1b, however, the copy indication bit is set to "C=0", and it follows that the routing table of FIG. 12 is prepared.

<Setting against Occurrence of Fault>

In the course of transmitting the cell in such a way, when the main control unit (CTL) 14 of the second ATM node 1b on the receiving side detects the L1 fault or the fault of the line control unit (LT) 12, there are rewritten the contents of the routing table in the input-directional ATM cell header high-speed converting circuit (ATC) 122a in which the fault-caused main connection is set. That is, in the first ATM node 1a, the description of the routing data is deleted from the routing table with respect to only VPI/VCI of the specified important connection where the copy indication bit is set to C=1. With this deletion, the routing data for VPI/VCI of the specified important connection are written in the routing table within the input-directional ATM cell header high-speed converting circuit (ATC) 122a in which the corresponding subconnection is set.

Figure 51B:
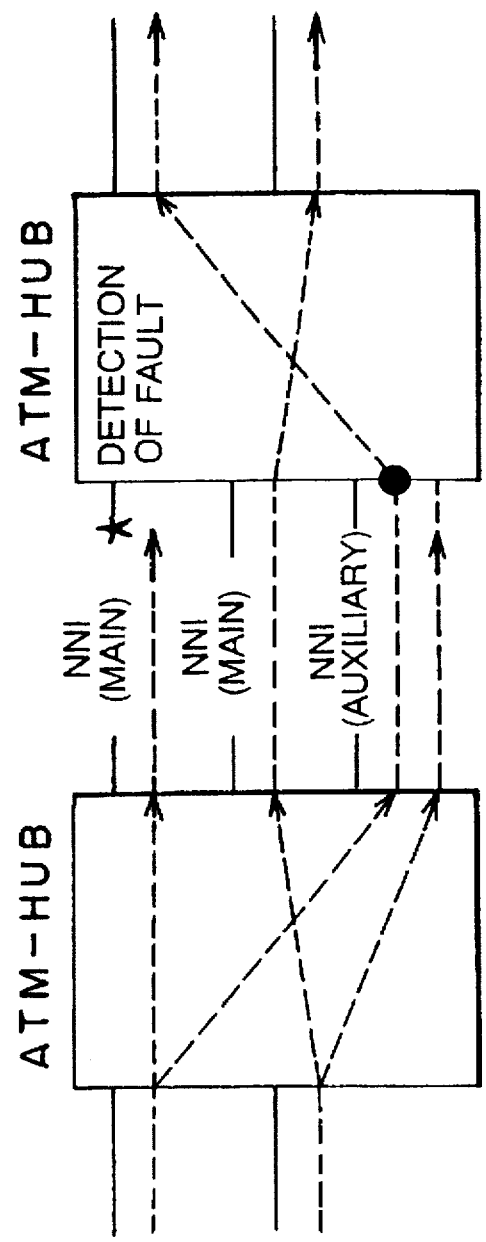

Therefore, as shown in FIG. 51(b), it follows that the cell transmitted via the backup line φ2 to the second ATM node 1b is transferred from the second node 1b to other ATM node 1b or the terminal. On the other hand, even if there are cells that have reached the second node 1b through the main connection (trunk line φ1) where the fault is caused, the cells belonging to the specified important connection are discarded without being transferred to others. Hence, it is possible to prevent the important cells which would be destructed by the fault from being transferred. Note that the connection change point is marked with a black circle, while the fault occurrence point is marked with a black star.

Figure 52:
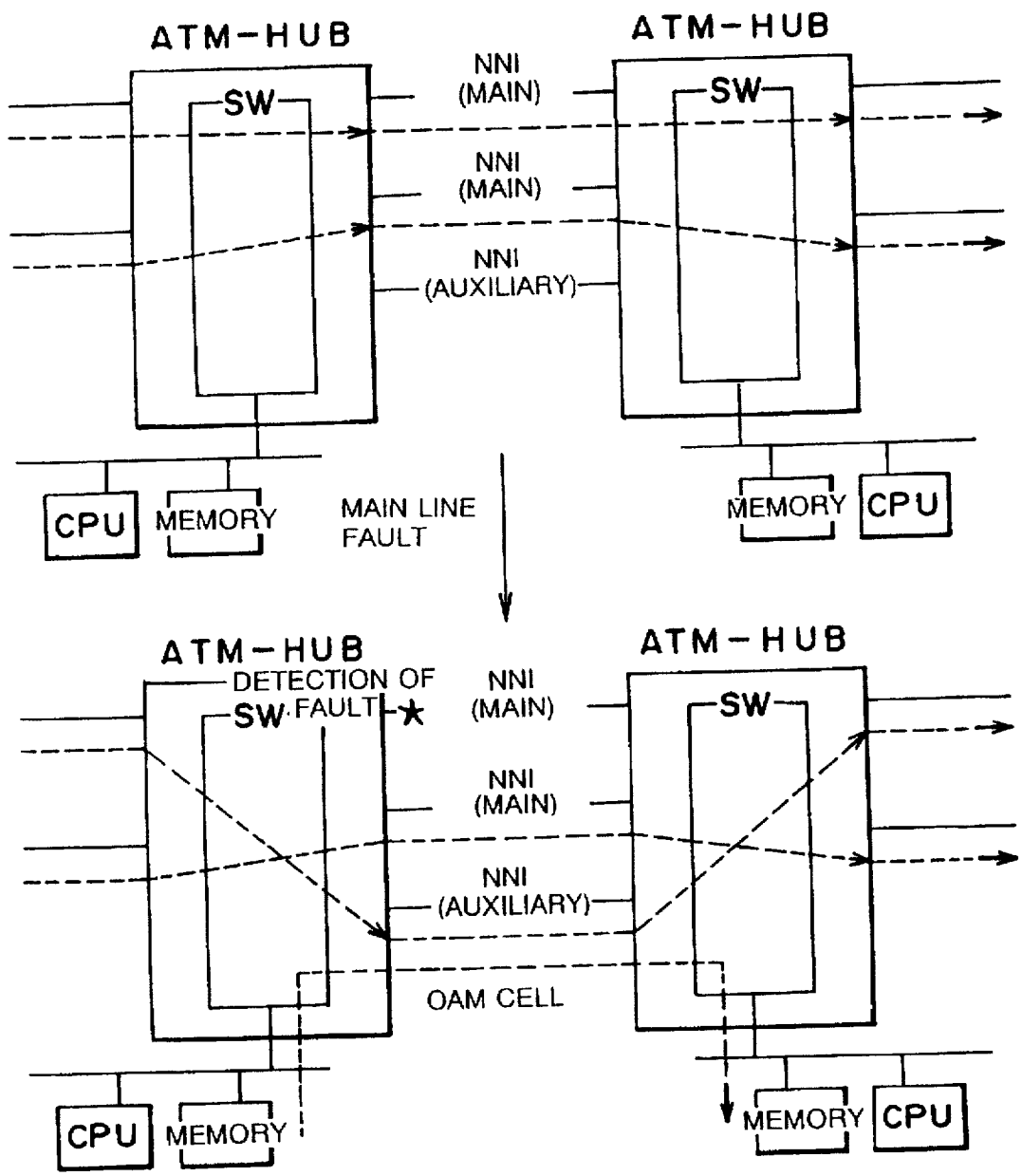
FIG. 52 is a diagram illustrating how the receiving-side ATM node is notified of the fault in the fifth embodiment of the present invention.

On the other hand, when the main control unit (CTL) 14 of the first ATM node 1a on the transmitting side detects the L1 fault or the fault of the line control unit (LT) 12, as illustrated in FIG. 52, this first ATM node 1a transmits the ATM-OAM cell for giving the notification of the fault occurrence to the second ATM node 1b via the backup line φ2. Therefore, the second ATM node 1b informed of the occurrence of the fault through the ATM-OAM cell is capable of performing the same switching process as the above-mentioned.

For a duration of the cell transmission through the thus switched backup line φ2, it is possible to perform the fault restoration on the side of the main connection (trunk line φ1) where the fault happens. Then, when the main control unit (CTL) 14 of the ATM node 1 which has detected the occurrence of the fault detects a completion of this fault restoration, the description of the routing data is deleted from the routing table in the input-directional ATM cell header high-speed converting circuit (ATC) 122a connected to the backup line φ2. At the same time, the routing data about the transfer destination of the cell belonging to the relevant connection is written in the routing table within the input-directional ATM cell header high-speed converting circuit (ATC) 122a connected to the original trunk line φ1.

Therefore, as in the manner before the fault happens, only the cells transmitted via the trunk line φ1 to the second ATM node 1b are transferred from this second node 1b to other ATM node 1b or the terminal.

<Operation of Embodiment>

As discussed above, in accordance with the fifth embodiment, the 1-to-N connection has been previously carried out within the first node 1a on the transmitting side, and, therefore, the switchover to the backup line φ2 can be effected only by the processing in the second node 1b on the receiving side. Hence, it is possible to restrain the possibility in which the cells will be discarded when performing the switchover to the backup line Φ2 and the switch-back to the trunk line Φ1. Further, the specified important connections on the plurality of trunk lines φ1 can be backed up by the common backup line φ2, and hence the number of the backup lines φ2 can be reduced.

<Embodiment 6>

An embodiment 6 of the present invention has a difference form the fourth embodiment in terms of such a point that a single backup line φ2 is prepared for a plurality of trunk lines φ1. This backup line φ2 has only the same bandwidth as that of each trunk line φ1. Hence, it is impossible to set the subconnections on the backup line φ2, corresponding to all the connections set on the respective trunk lines φ1 as done in the third embodiment. Accordingly, in this sixth embodiment, the subconnections are set on the backup line φ2, corresponding to only the important connections among the respective main connections set on the individual trunk line φ1. Hereinafter, a content of the control therefor will be explained.

Note that the sixth embodiment of the present invention has everything in the first embodiment in terms of the constructions of B-ISDN and of the respective ATM nodes 1. Hence, the explanations thereof will be omitted herein.

<Initialization>

Figure 53:
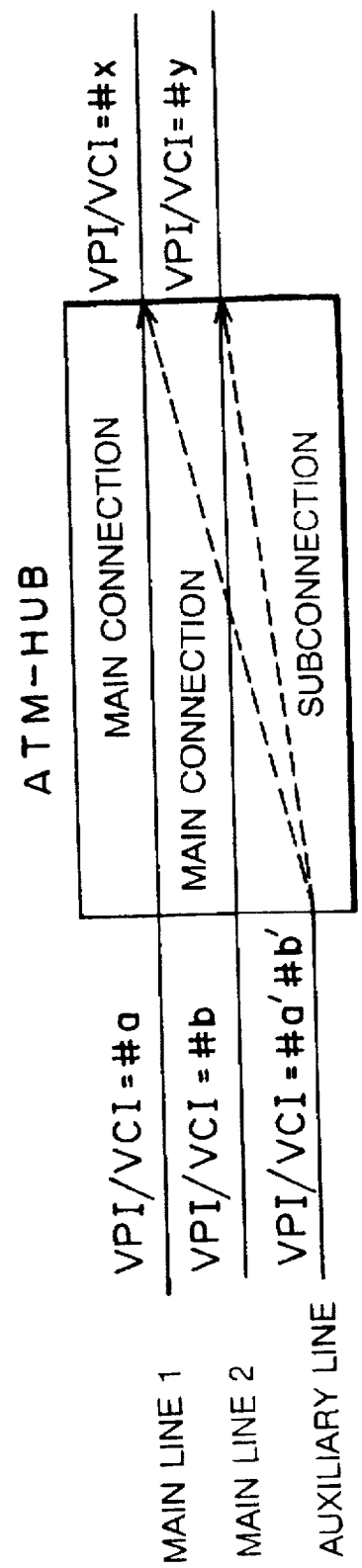
FIG. 53 is a diagram illustrating an integration of the connections within the ATM node on the receiving side in a sixth embodiment of the present invention.

FIG. 53 schematically illustrates a status of the connection which is to be initialized in the first ATM node 1a on the receiving side. As obvious from FIG. 53, the connection for transferring the cell in which a relationship of "VPI/VCI= #a" is established, rewrites VPI/VCI of the relevant cell as "=#a" upon receiving the input of the relevant cell from the first trunk line φ1 and outputs it from the output line connected to other ATM node 1 or the terminal. This connection is defined as the main connection performing the function of transferring the cell during the normal state, and herein this is termed a first main connection. Similarly, the connection for transferring the cell in which a relationship of "VPI/VCI=#b", upon receiving the input of the relevant cell from the second trunk line φ1, rewrites VPI/VCI of the relevant cell as "=#y" and outputs it from the output line connected to other ATM node 1 or the terminal. This connection is defined as the main connection for performing the function of transferring the cell during the normal state, and herein this is referred to as a second main connection.

On the other hand, these first and second main connections are integrated with other connections within the ATM node 1. Namely, the connection integrated with the first main connection, upon inputting the cell of "VPI/VCI=#a" from the backup line φ2, rewrites VPI/VCI of the received cell as "=#x" from "=#a" and outputs it from the same output line as that of the first main connection. The connection integrated with this first main connection is defined as the subconnection performing the function of transferring the cell when detouring the cell, and herein this is referred to as a first subconnection. Similarly, the connection integrated with the second main connection, upon inputting the cell of "VPI/VCI=#b" from the backup line φ2, rewrites VPI/VCI of the received cell as "=#y" from "=#b" and outputs it from the same output line as that of the second main connection. The connection integrated with this second main connection is defined as the subconnection for performing the function of transferring the cell when detouring the cell, and herein this is termed a second subconnection.

For performing the integration of this connection, in the second ATM node 1b as a cell transfer destination, the routing data about the specified important connection set to the line control unit (LT) 12 to which each trunk line φ1 is connected are written also in the routing table within the line control unit (LT) 12 to which the backup line φ2 is connected. That is, in the main connection and the subconnection, the routing data with the same line serving as the destination are made corresponding to the cells having identical VPI/VCI. Accordingly, if the cell is the one including its VPI/VCI registered in the routing table within the line control unit 12 on the side of the subconnection, whether to input it to the relevant second ATM node 1b via the trunk line φ1 or via the backup line φ2, it follows that the cell is outputted from the same output line. Note that the contents of the routing table prepared in this instance are as shown in FIG. 12.

Figure 54A:
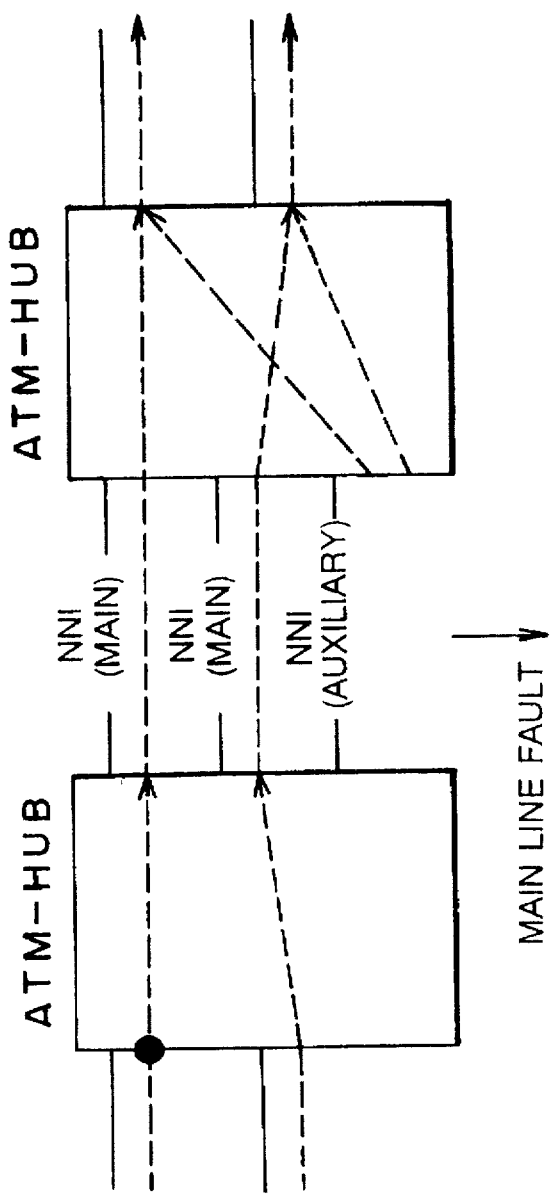
FIG. 54 is a diagram showing how the trunk line is switched in the sixth embodiment of the present invention.

On the other hand, in the first ATM node 1a from which the cell is transferred, the routing table having the content of transferring the cell belonging to each relevant connection toward only the trunk line φ1 is prepared in the line control units (LT) 12 on all the connections for transferring the cells to the second ATM node 1b via the first or second trunk line φ1. Hence, as illustrated in FIG. 54 (a), in the normal state, the cell inputted to the first ATM node 1a is transferred via the first or second trunk line φ1 to the second ATM node 1b. It follows that the cell is further transferred through the main connection within this second ATM node 1b and outputted to the output line. Contrastingly, in the first node 1a, there is no cell transferred to the backup line φ2. As a result, the cells are prevented from being overlapped.

<Setting against Occurrence of Fault>

In the course of transmitting the cell in such a way, when the main control unit (CTL) 14 of the second ATM node 1b on the transmitting side detects the L1 fault or the fault of the line control unit (LT) 12, there are rewritten the contents of the routing table in the input-directional ATM cell header high-speed converting circuit (ATC) 122a in which the fault-caused main connection is set. That is, with respect to only VPI/VCI of the specified important connection, an item of cell transfer destination is rewritten as the backup line φ2 from the trunk line φ1.

Figure 54B:
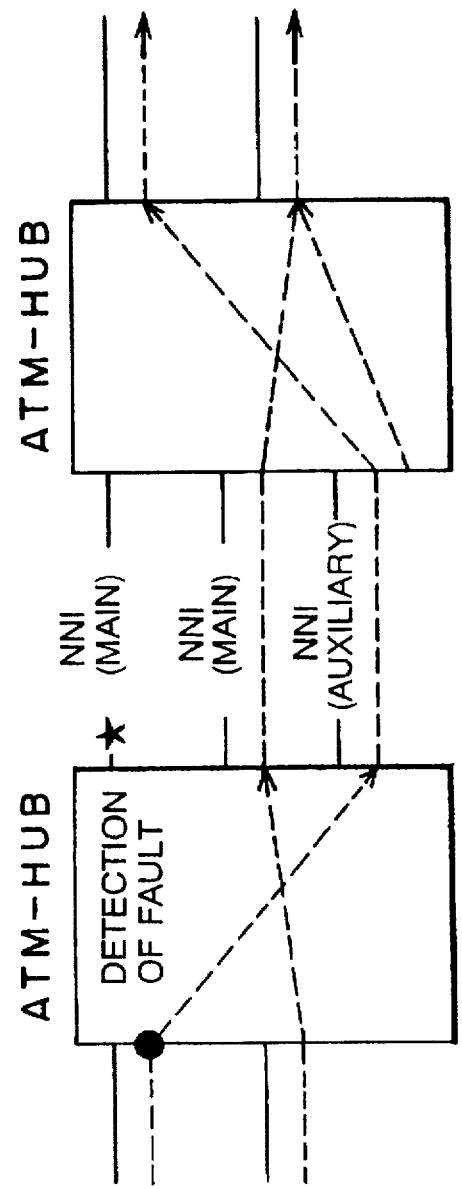

Therefore, as shown in FIG. 54(b), only the cells belonging to the specified important connection set via the trunk line φ1 are transmitted to the second node 1b via the backup line φ2 and outputted to the output line through the subconnection within the second ATM node 1a. In contrast with this, the cells belonging to the above-specified important connection are not transferred to the trunk line φ1. As a result, the cells are prevented from being overlapped. Note that the connection change point is marked with a black circle, while the fault occurrence point is marked with a black star.

On the other hand, when the main control unit (CTL) 14 of the second ATM node 1a on the receiving side detects the L1 fault or the fault of the line control unit (LT) 12, as illustrated in FIG. 55, this second ATM node 1b transmits the ATM-OAM cell for giving the notification of the fault occurrence to the first ATM node 1a via the backup line φ2. Therefore, the first ATM node 1a informed of the occurrence of the fault through the ATM-OAM cell is capable of performing the same switching process as the above-mentioned.

For a duration of the cell transmission through the thus switched backup line φ2, it is feasible to perform the fault restoration on the side of the main connection (trunk line φ1) where the fault happens. Then, when the main control unit (CTL) 14 of the ATM node 1 which has detected the occurrence of the fault detects a completion of this fault restoration, there are rewritten the contents of the routing table in the input-directional ATM cell header high-speed converting circuit (ATC) 122a that was transferring the cell to the backup line φ2. That is, an item of the cell transfer destination corresponding to VPI/VCI of the relevant specified important connection is rewritten as the trunk line φ1 from the backup line φ2.

Therefore, as in the manner before the fault happens, there resumes the cell transfer from the first ATM node 1a via the trunk line φ1 to the second ATM node 1b.

Thus, in accordance with this sixth embodiment, the N-to-1 connection has been conducted beforehand within the second node 1b on the receiving side, and hence the switchover to the backup line φ2 can be effected by only the processing within the first node 1a on the transmitting side. Accordingly, it is feasible to restrain the possibility in which the cells will be discarded when performing the switch-over to the backup line φ2 and the switch-back to the trunk line φ1. Further, only the specified important connections on the plurality of trunk lines φ1 can be backed up by the common backup line φ2, and hence the number of the backup lines φ2 can be reduced.

In the digital switching equipment relay system or the digital switching equipment according to the first aspect of the present invention, the discard of the cells (or packet, frame) is avoided as much as possible, and it is possible to relay the cells (or packet, frame) exceeding a capacity of the trunk line.

Further, in the digital switching equipment according to the second aspect of the present invention, the terminal or the switching equipment on the transmitting side can be immediately informed of the occurrence of the congested state in one of elements of the switching network, and hence a traffic flow density in the terminal or the switching equipment on the transmitting side is restricted, whereby the system is prompted to prevent the cell discard.

Furthermore, in the digital switching equipment relay system according to the third or fourth aspect of the present invention, if a system-down of the trunk line happens, the trunk line can be switched simply by changing over the switch within the switching equipment on one hand, an, therefore, it is possible to restrain the cell discard due to the time lag with the switchover of the trunk line.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An inter digital switching equipment relay system, having a plurality of digital switching equipments connected each other through a trunk line, for transferring a block of digital data containing an item of destination data from said one digital switching equipment to said other digital switching equipment via said trunk line, said relay system comprising:

a backup trunk line arranged in parallel to said trunk line between said plurality of digital switching equipments and having substantially the same capacity as that of said trunk line; and transferring means, provided in said one digital switching equipment, for transferring, in case a data quantity of the block of the digital data passing though said trunk line becomes a fixed threshold value or larger, part of the block of the digital data passing through said trunk line to said other digital switching equipment via said backup trunk line.

2. An inter ATM switching equipment relay system, having a plurality of ATM switiching equipments connected each other through a trunk line, for transferring an ATM cell from said one ATM switching equipment to said other ATM switching equipment via said trunk line, said relay system comprising:

a backup trunk line arranged in parallel to said trunk line between said plurality of ATM switching equipments and having substantially the same capacity as that of said trunk line; and transferring means, provided in said one ATM switiching equipment, for transferring, in case the number of ATM cells passing through said trunk line becomes a fixed threshold vlaue or larger, part of the ATM cells passing through said trunk line to said other ATM switching equipment via said backup trunk line.

3. An inter ATM switching equipment relay system according to claim 2, further comprising:

maintenance OAM cell transmitting means, provided in said one ATM switching equipment, for transmitting, in case the number of ATM cells transmitted to said trunk line in said one ATM switching equipment becomes the fixed threshold value or larger, a maintenance OAM cell for notifying that the ATM cells are transmitted via said backup trunk line to said other ATM switching equipment.

4. An inter ATM switching equipment relay system according to claim 3, wherein said transferring means transfers, in case said other ATM switching equipment receiving the maintenance OAM cell sends back a maintenance OAM cell for a response to said one ATM switching equipment, part of the ATM cells passing through said trunk line to said other ATM switching equipment via said backup trunk line.

5. A digital switching equipment connectable via a trunk line to other switching equipment and capable of transferring a block of digital data containing an item of destination data to said other switching equipment via said trunk line, said digital switching equipment comprising:

a first trunk unit transmitting the block of the digital data to said trunk line;

a second trunk unit, to which a backup trunk line having substantially the same capacity as that of said trunk line is connectable, capable of transferring the block of the digital data to said backup trunk line;

a switch unit transmitting the block of digital data to said first trunk unit; and transmitting means for transmitting, in case a data quantity of the block of the digital data passing through said first trunk unit exceeds a fixed threshold value, a part of the block of the digital data to be transmitted to said first trunk unit from said switch unit to said second trunk unit.

6. A digital switching equipment according to claim 5, further comprising:

monitoring means for monitoring a data quantity of the block of the digital data outputted from said first trunk unit; and wherein said transmitting means transmits, in case said monitoring means determines that the data quantity of the block of the digital data exceeds the fixed threshold, the part of the block of the digital data to be transmitted to said first trunk unit from said switch unit to said second trunk unit.

7. A digital switching equipment connectable via a trunk line to other switching equipment and capable of transferring an ATM cell to said other switching equipment via said trunk line, said digital switching equipment comprising:

a first trunk unit transmitting the ATM cell to said trunk line;

a second trunk unit, to which a backup trunk line having substantially the same capacity as that of said trunk line is connectable, capable of transferring the ATM cell to said backup trunk line;

a switch unit transmitting the ATM cell to said first trunk unit; and transmitting means for transmitting, in case the number of ATM cells passing through said first trunk unit exceeds a fixed threshold value, a part of the ATM cells to be transmitted to said first trunk unit from said switch unit to said second trunk unit.

8. A digital switching equipment according to claim 7, further comprising:

monitoring means for monitoring the number of ATM cells outputted from said first trunk unit; and wherein said transmitting means transmits, in case said monitoring means determines that the number of ATM cells exceeds the fixed threshold, the part of the ATM cells to be transmitted to said first trunk unit from said switch unit to said second trunk unit.

9. An ATM switching equipment according to claim 8, wherein said monitoring means counts the number of ATM cells on the basis of a usage of a buffer provided in said trunk unit.

10. An ATM switching equipment according to claim 9, wherein said buffer has a first threshold value that is comparatively large and a second threshold value that is comparatively small, and said transmitting means transmits, in case the number of ATM cells exceeds the first threshold value, the part of the ATM cells to be transmitted to said first trunk unit from said switch unit to said second trunk unit, and transmits, in case the number of ATM cells is the second threshold value or under, the ATM cells transmitted to said second trunk unit back to said first trunk unit.

11. A digital switching equipment, to which a plurality of lines are connected, for receiving a block of digital data containing an item of destination data from an input line and outputting the data block to an output line, said digital switching equipment comprising:

a detection unit detecting that a data quantity of the block of the digital data passing through said output line exceeds a fixed threshold value; and notifying means for notifying, in case said detecting unit detects that the data quantity of the block of the digital data passing through said output line exceeds the fixed threshold value, an occurrence of congestion to a transmitting party of the block of the digital data.

12. A digital switching equipment according to claim 11, further comprising:

an input trunk unit accommodating said input line;

an output trunk unit accommodating said output line; and a switch unit, connected to said input trunk unit and said output trunk unit, selectively transferring the block of the digital data by connecting or disconnecting said respective trunk units from each other.

13. A digital switching equipment according to claim 12, wherein said detection unit detects a data quantity of the block of the digital data passing through within said output line.

14. A digital switching equipment according to claim 12, wherein said notifying means is provided in said input trunk unit and writes an occurrence data about a state of congestion to the block of the digital data transmitted toward a transmitting party of the block of the digital data from said input trunk unit.

15. A digital switching equipment according to claim 12, wherein said notifying means is provided in said output trunk unit and writes an occurrence data about the state of congestion to the block of the digital data transmitted toward the transmitting party of the block of the digital data via said switch unit and said input trunk unit from said input trunk unit.

16. A digital switching equipment according to claim 14, wherein said notifying means generates the block of the digital data, to which the occurrence data about the state of congestion is written.

17. An ATM switching equipment, to which a plurality of lines are connected, for receiving an ATM cell from an input line and outputting the ATM cell to and output line, said ATM switching equipment comprising:

an input trunk unit accommodating said input line;

an output trunk unit accommodating said output line;

a switch unit, connected to said input trunk unit and said output trunk unit, selectively transferring the ATM cell by connecting or disconnecting said respective trunk units from each other;

a detection unit detecting that the number of ATM cells passing through said output trunk unit exceeds a fixed threshold value; and notifying means for notifying, in case said detection unit detects that the number of ATM cells passing through said output trunk unit exceeds the fixed threshold value, an occurrence of congestion to a transmitting party of the ATM cell via said input line.

18. An ATM switching equipment according to claim 17, wherein said detection unit includes a buffer to which the ATM cell transferred from said switch unit is temporarily written and from which the ATM cell is read for outputting to said output line, and wherein said detection unit detects, in case the number of the unread ATM cells accumulated in said buffer reaches a fixed threshold value, that the number of ATM cell passing through said output trunk unit exceeds a fixed threshold value.

19. An ATM switching equipment according to claim 17, wherein said notifying means writes an occurrence data about the state of congestion to the ATM cell sent to the transmitting party of the ATM cell passing through said input trunk unit from said output trunk unit.

20. An ATM switching equipment according to claim 19, wherein the ATM cell to which the occurrence data about the state of congestion is written is an ATM-OAM cell generated within said ATM switching equipment.

21. An inter ATM switching equipment relay system, having at least two sets of ATM switching equipments connected through a trunk line, for inputting an ATM cell from an input line of said first ATM switching equipment, transferring the ATM cell to said second ATM switching equipment via said trunk line and outputting the ATM cell from an output line of said second ATM switching equipment, said relay system comprising:

a backup trunk line arranged in parallel to said trunk line between said two sets of ATM switching equipments and having substantially the same capacity as that of said trunk line;

copying means, provided in said first ATM switching equipment, for copying the ATM cell;

transmitting means, provided in said first ATM switching equipment, for transmitting one of the copied ATM cells to said trunk line and also transmitting one other copied ATM cell to said backup trunk line;

outputting means, provided in said second digital switching equipment, for outputting, in a state where no fault happens in said trunk line, only the ATM cell transferred via said trunk line and outputting, in a state where the fault happens in said trunk line, only the ATM cell transferred via said backup trunk line from said backup line from said output line;

said transmitting means copies only some preselected cells: and said outputting means outputs, from said output line, the ATM cells exclusive of said preselected ATM cells transferred from said trunk line even in case the fault happens in said trunk line.

22. An inter ATM switching equipment relay system having at least two sets of ATM switching equipments connected through a trunk line, for inputting an ATM cell from an input line of said first ATM switching equipment, transferring the ATM cell to said second ATM switching equipment via said trunk line and outputting the ATM cell from an output line of said second ATM switching equipment, said relay system comprising:

a backup trunk line arranged in parallel to said trunk line between said two sets of ATM switching equipments and having substantially the same capacity as that of said trunk line;

outputting means, provided in said second ATM switching equipment, for outputting, to said output line, the ATM cell transferred via said trunk line and the ATM cell transferred via said backup trunk line within said second ATM switching equipment; and transferring means, provided in said first ATM switching equipment, for transferring, in a state where no fault happens in said trunk line, the ATM cell transferred via said input line only to said trunk line and transferring, in a state where the fault happens in said trunk line, the ATM cell transferred via said input line to only said backup trunk line;

wherein said outputting means outputs some preselected ATM cells from said output line even in the case of being transferred via said backup trunk line; and said transferring means transfers the ATM cells exclusive of said some preselected ATM cells to only said trunk line even in case the fault happens in said trunk line.

* * * * *